United States Patent
Singla et al.

(10) Patent No.: US 8,843,408 B2
(45) Date of Patent: Sep. 23, 2014

(54) METHOD AND SYSTEM FOR HIGH SPEED OPTIONS PRICING

(75) Inventors: Naveen Singla, St. Louis, MO (US);
Scott Parsons, St. Charles, MO (US);
Mark A. Franklin, St. Louis, MO (US);
David E. Taylor, St. Louis, MO (US)

(73) Assignee: IP Reservoir, LLC, St. Louis, MO (US)

( * ) Notice: Subject to any disclaimer, the term of this patent is extended or adjusted under 35 U.S.C. 154(b) by 823 days.

(21) Appl. No.: 12/912,354

(22) Filed: Oct. 26, 2010

(65) Prior Publication Data

US 2011/0040701 A1 Feb. 17, 2011

Related U.S. Application Data

(62) Division of application No. 11/760,211, filed on Jun. 8, 2007, now Pat. No. 7,840,482.

(60) Provisional application No. 60/814,796, filed on Jun. 19, 2006.

(51) Int. Cl.
*G06Q 40/00* (2012.01)
*G06Q 40/04* (2012.01)
*G06Q 40/06* (2012.01)

(52) U.S. Cl.
CPC ............... *G06Q 40/04* (2013.01); *G06Q 40/06* (2013.01)
USPC ......................................... 705/37; 705/36 R

(58) Field of Classification Search
USPC ................................. 705/36 R, 37
See application file for complete search history.

(56) References Cited

U.S. PATENT DOCUMENTS

| | | | |
|---|---|---|---|
| 2,046,381 A | 7/1936 | Hicks et al. |
| 3,082,402 A | 3/1963 | Scantlin |
| 3,296,597 A | 1/1967 | Scantlin et al. |
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,044,334 A | 8/1977 | Bachman et al. |
| 4,081,607 A | 3/1978 | Vitols et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Brodie et al., "Dynamic Reconfigurable Computing", in Proc. of 9th Military and Aerospace Programmable Logic Devices International Conference, Sep. 2006.

(Continued)

*Primary Examiner* — Sara C Hamilton
(74) *Attorney, Agent, or Firm* — Thompson Coburn LLP; Benjamin L. Volk, Jr.

(57) ABSTRACT

A high speed technique for options pricing in the financial industry is disclosed that can provide both high throughput and low latency. Parallel/pipelined architectures are disclosed for computing an option's theoretical fair price. Preferably these parallel/pipelined architectures are deployed in hardware, and more preferably reconfigurable logic such as Field Programmable Gate Arrays (FPGAs) to accelerate the options pricing operations relative to conventional software-based options pricing operations.

45 Claims, 32 Drawing Sheets

(56) References Cited

U.S. PATENT DOCUMENTS

| | | |
|---|---|---|
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,823,306 A | 4/1989 | Barbic et al. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,418,951 A | 5/1995 | Damashek |
| 5,432,822 A | 7/1995 | Kaewell, Jr. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,544,352 A | 8/1996 | Egger |
| 5,546,578 A | 8/1996 | Takada et al. |
| 5,651,125 A | 7/1997 | Witt et al. |
| 5,684,980 A | 11/1997 | Casselman |
| 5,701,464 A | 12/1997 | Aucsmith |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,196 A | 9/1999 | Pyreddy et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,890 A | 11/2000 | Kawana et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,336,150 B1 | 1/2002 | Ellis et al. |
| 6,370,645 B1 | 4/2002 | Lee |
| 6,377,942 B1 | 4/2002 | Hinsley et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,578,147 B1 | 6/2003 | Shanklin et al. |
| 6,594,643 B1 | 7/2003 | Freeny, Jr. |
| 6,597,812 B1 | 7/2003 | Fallon et al. |
| 6,601,104 B1 | 7/2003 | Fallon |
| 6,604,158 B1 | 8/2003 | Fallon |
| 6,624,761 B2 | 9/2003 | Fallon |
| 6,691,301 B2 | 2/2004 | Bowen |
| 6,704,816 B1 | 3/2004 | Burke |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |

(56) References Cited

U.S. PATENT DOCUMENTS

| | | |
|---|---|---|
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,024,384 B2 | 4/2006 | Daughtery, III |
| 7,046,848 B1 | 5/2006 | Olcott |
| 7,058,735 B2 | 6/2006 | Spencer |
| 7,065,475 B1 | 6/2006 | Brundobler |
| 7,089,206 B2 | 8/2006 | Martin |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,277,887 B1 | 10/2007 | Burrows et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,356,498 B2 | 4/2008 | Kaminsky et al. |
| 7,378,992 B2 | 5/2008 | Fallon |
| 7,386,046 B2 | 6/2008 | Fallon et al. |
| 7,406,444 B2 | 7/2008 | Eng et al. |
| 7,411,957 B2 | 8/2008 | Stacy et al. |
| 7,417,568 B2 | 8/2008 | Fallon et al. |
| 7,457,834 B2 | 11/2008 | Jung et al. |
| 7,461,064 B2 | 12/2008 | Fontoura et al. |
| 7,558,753 B2 | 7/2009 | Neubert et al. |
| 7,565,525 B2 | 7/2009 | Vorbach et al. |
| 7,603,303 B1 | 10/2009 | Kraus et al. |
| 7,606,968 B2 | 10/2009 | Branscome et al. |
| 7,660,761 B2 | 2/2010 | Zhou et al. |
| 7,668,849 B1 | 2/2010 | Narancic et al. |
| 7,714,747 B2 | 5/2010 | Fallon |
| 7,761,459 B1 | 7/2010 | Zhang et al. |
| 7,788,293 B2 | 8/2010 | Pasztor et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,213 B2 | 3/2011 | Monroe et al. |
| 7,908,259 B2 | 3/2011 | Branscome et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 8,015,099 B2 | 9/2011 | Reid |
| 8,024,253 B2 | 9/2011 | Peterffy et al. |
| 8,027,893 B1 | 9/2011 | Burrows et al. |
| 8,046,283 B2 | 10/2011 | Burns et al. |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,140,416 B2 | 3/2012 | Borkovec et al. |
| 8,156,101 B2 | 4/2012 | Indeck et al. |
| 8,224,800 B2 | 7/2012 | Branscome et al. |
| 8,229,918 B2 | 7/2012 | Branscome et al. |
| 8,234,267 B2 | 7/2012 | Branscome et al. |
| 8,244,718 B2 | 8/2012 | Chamdani et al. |
| 8,326,819 B2 | 12/2012 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 2001/0042040 A1 | 11/2001 | Keith |
| 2001/0047473 A1 | 11/2001 | Fallon |
| 2001/0056547 A1 | 12/2001 | Dixon |
| 2002/0010825 A1 | 1/2002 | Wilson |
| 2002/0019812 A1 | 2/2002 | Board et al. |
| 2002/0023010 A1 | 2/2002 | Rittmaster et al. |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0147670 A1 | 10/2002 | Lange |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0180742 A1 | 12/2002 | Hamid |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Applcby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0078865 A1 | 4/2003 | Lee |
| 2003/0079060 A1 | 4/2003 | Dunlop |
| 2003/0093343 A1 | 5/2003 | Huttenlocher et al. |
| 2003/0093347 A1 | 5/2003 | Gray |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0117971 A1 | 6/2003 | Aubury |
| 2003/0120460 A1 | 6/2003 | Aubury |

(56) References Cited

U.S. PATENT DOCUMENTS

| | | |
|---|---|---|
| 2003/0121010 A1 | 6/2003 | Aubury |
| 2003/0126065 A1 | 7/2003 | Eng et al. |
| 2003/0140337 A1 | 7/2003 | Aubury |
| 2003/0154368 A1 | 8/2003 | Stevens et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0221013 A1 | 11/2003 | Lockwood et al. |
| 2003/0233302 A1 | 12/2003 | Weber et al. |
| 2004/0015502 A1 | 1/2004 | Alexander et al. |
| 2004/0015633 A1 | 1/2004 | Smith |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0162826 A1 | 8/2004 | Wyschogrod et al. |
| 2004/0170070 A1 | 9/2004 | Rapp et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0199452 A1 | 10/2004 | Johnston et al. |
| 2004/0205149 A1 | 10/2004 | Dillon et al. |
| 2005/0005145 A1 | 1/2005 | Teixeira |
| 2005/0033672 A1 | 2/2005 | Lasry et al. |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0240510 A1 | 10/2005 | Schweickert et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0020715 A1 | 1/2006 | Jungck |
| 2006/0026090 A1 | 2/2006 | Balabon |
| 2006/0031154 A1 | 2/2006 | Noviello et al. |
| 2006/0031156 A1 | 2/2006 | Noviello et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0129745 A1 | 6/2006 | Thiel et al. |
| 2006/0143099 A1 | 6/2006 | Partlow et al. |
| 2006/0242123 A1 | 10/2006 | Williams, Jr. |
| 2006/0259417 A1 | 11/2006 | Marynowski et al. |
| 2006/0269148 A1 | 11/2006 | Farber et al. |
| 2006/0282369 A1 | 12/2006 | White |
| 2006/0294059 A1 | 12/2006 | Chamberlain et al. |
| 2007/0011183 A1 | 1/2007 | Langseth et al. |
| 2007/0061231 A1 | 3/2007 | Kim-E |
| 2007/0061241 A1 | 3/2007 | Jovanovic et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112837 A1 | 5/2007 | Houh et al. |
| 2007/0118453 A1 | 5/2007 | Bauerschmidt et al. |
| 2007/0118457 A1 | 5/2007 | Peterffy et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0208657 A1 | 9/2007 | Petrino |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0260814 A1 | 11/2007 | Branscome et al. |
| 2007/0277036 A1 | 11/2007 | Chamberlain et al. |
| 2007/0294157 A1 | 12/2007 | Singla et al. |
| 2007/0294162 A1 | 12/2007 | Borkovec |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0097893 A1 | 4/2008 | Walsky et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0183688 A1 | 7/2008 | Chamdani et al. |
| 2008/0189251 A1 | 8/2008 | Branscome et al. |
| 2008/0189252 A1 | 8/2008 | Branscome et al. |
| 2008/0243675 A1 | 10/2008 | Parsons et al. |
| 2008/0275805 A1 | 11/2008 | Hecht |
| 2009/0182683 A1 | 7/2009 | Taylor et al. |
| 2009/0287628 A1 | 11/2009 | Indeck et al. |
| 2010/0005036 A1 | 1/2010 | Kraus et al. |
| 2010/0082895 A1 | 4/2010 | Branscome et al. |
| 2010/0287294 A1 | 11/2010 | Battyani et al. |
| 2011/0010287 A1 | 1/2011 | Mittal et al. |
| 2011/0066832 A1 | 3/2011 | Casselman et al. |
| 2011/0125960 A1 | 5/2011 | Casselman |
| 2011/0145130 A1 | 6/2011 | Glodjo et al. |
| 2011/0167083 A1 | 7/2011 | Branscome et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0218987 A1 | 9/2011 | Branscome et al. |
| 2011/0231446 A1 | 9/2011 | Buhler et al. |
| 2011/0246353 A1 | 10/2011 | Kraus et al. |
| 2011/0295967 A1 | 12/2011 | Wang et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0130922 A1 | 5/2012 | Indeck et al. |
| 2012/0179590 A1 | 7/2012 | Borkovec et al. |
| 2012/0215801 A1 | 8/2012 | Indeck et al. |
| 2012/0246052 A1 | 9/2012 | Taylor et al. |
| 2013/0007000 A1 | 1/2013 | Indeck et al. |
| 2013/0086096 A1 | 4/2013 | Indeck et al. |
| 2013/0159449 A1 | 6/2013 | Taylor et al. |
| 2013/0262287 A1 | 10/2013 | Parsons et al. |
| 2013/0290163 A1 | 10/2013 | Parsons et al. |
| 2014/0025656 A1 | 1/2014 | Indeck et al. |
| 2014/0040109 A1 | 2/2014 | Parsons et al. |

FOREIGN PATENT DOCUMENTS

| | | |
|---|---|---|
| EP | 0851358 A | 7/1998 |
| EP | 0887723 | 12/1998 |

(56) References Cited

FOREIGN PATENT DOCUMENTS

| | | | |
|---|---|---|---|
| EP | 0911738 A | 4/1999 |
| JP | 11-259559 A | 9/1999 |
| JP | 11282912 | 10/1999 |
| JP | 2001283000 A | 10/2001 |
| JP | 2002269343 A | 9/2002 |
| JP | 2003-036360 A | 2/2003 |
| JP | 2003256660 A | 9/2003 |
| JP | 2006059203 A | 3/2006 |
| JP | 4180644 B1 | 11/2008 |
| WO | 9010910 | 9/1990 |
| WO | 9409443 A1 | 4/1994 |
| WO | 9737735 | 10/1997 |
| WO | 0122425 A | 3/2001 |
| WO | 0135216 A2 | 5/2001 |
| WO | 0172106 A2 | 10/2001 |
| WO | 0180082 A2 | 10/2001 |
| WO | 0180558 | 10/2001 |
| WO | 0190890 A1 | 11/2001 |
| WO | 02061525 | 8/2002 |
| WO | 03100650 | 4/2003 |
| WO | 03036845 | 5/2003 |
| WO | 03100662 | 12/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 A | 2/2005 |
| WO | 2005026925 | 3/2005 |
| WO | 2005048134 A | 5/2005 |
| WO | 2006023948 | 3/2006 |
| WO | 2006096324 | 9/2006 |
| WO | 2007064685 | 6/2007 |
| WO | 2007/074903 A1 | 7/2007 |
| WO | 2007087507 | 8/2007 |
| WO | 2007/127336 A2 | 11/2007 |
| WO | 2008022036 | 2/2008 |
| WO | 2009089467 A2 | 7/2009 |
| WO | 2010077829 | 7/2010 |

OTHER PUBLICATIONS

Forgy, "RETE: A Fast Algorithm for the Many Pattern/Many Object Pattern Matching Problem", Artificial Intelligence, 1982, pp. 17-37, vol. 19.
Google Search Results Page for "field programmable gate array financial calculation stock markert" over dates of Jan. 1, 1990-May 21, 2002, 1 page.
Gupta et al., "High-Speed Implementations of Rule-Based Systems," ACM Transactions on Computer Systems, May 1989, pp. 119-146, vol. 7, Issue 2.
Gupta et al., "PMM: A Parallel Architecture for Production Systems," Proceedings of the IEEE, Apr. 1992, pp. 693-696, vol. 2.
Notice of Allowance for U.S. Appl. No. 11/561,615 dated Sep. 12, 2011.
Prosecution History for U.S. Appl. No. 11/760,211, filed Jun. 8, 2007 (Singla et al.).
Sachin Tandon, "A Programmable Architecture for Real-Time Derivative Trading", Master's Thesis, University of Edinburgh, 2003.
U.S. Appl. No. 61/421,545, filed Dec. 9, 2010 (Taylor et al.).
Ziv et al., "A Universal Algorithm for Sequential Data Compression", IEEE Trans. Inform. Theory, IT-23(3): 337-343 (1997).
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Gavrila et al., "Multi-feature Hierarchical Template Matching Using Distance Transforms", IEEE, Aug. 16-20, 1998, vol. 1, pp. 439-444.
Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.
Halaas et al., "A Recursive MISD Architecture for Pattern Matching", IEEE Transactions on Very Large Scale Integration, vol. 12, No. 7, pp. 727-734, Jul. 2004.
Harris, "Pete's Blog: Can FPGAs Overcome the FUD?", Low-Latency.com, May 14, 2007, URL: http://www.a-teamgroup.com/article/pete-blog-can-fpgas-overcome-the-fud/.
Hauck et al., "Software Technologies for Reconfigurable Systems", Northwestern University, Dept. of ECE, Technical Report, 1996.
Hayes, "Computer Architecture and Organization", Second Edition, 1988, pp. 448-459, McGraw-Hill, Inc.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hirsch, "Tech Predictions for 2008", Reconfigurable Computing, Jan. 16, 2008, URL: http://fpgacomputing.blogspot.com/2008_01_01_archive.html.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Hutchings et al., "Assisting Network Intrusion Detection with Reconfigurable Hardware", FCCM 2002: 10th Annual IEEE Symposium on Field-Programmable Custom Computing Machines, 2002.
International Preliminary Report on Patentability (Chapter I) for PCT/US2008/065955 issued Dec. 23, 2009.
International Preliminary Report on Patentability (Chapter I) for PCT/US2008/066929 dated Jan. 7, 2010.
International Search Report and Written Opinion for PCT/US2009/030623 dated May 5, 2009.
International Search Report for PCT/US2001/011255 dated Jul. 10, 2003.
International Search Report for PCT/US2002/033286 dated Jan. 22, 2003.
International Search Report for PCT/US2003/015638 dated May 6, 2004.
International Search Report for PCT/US2004/016021 dated Aug. 18, 2005.
International Search Report for PCT/US2004/016398 dated Apr. 12, 2005.
International Search Report for PCT/US2005/030046; Sep. 25, 2006.
International Search Report for PCT/US2006/006105 dated Oct. 31, 2006.
International Search Report for PCT/US2006/045653 dated Jul. 8, 2008.
International Search Report for PCT/US2007/060835 dated Jul. 9, 2007.
International Search Report for PCT/US2007/084466 dated Jul. 23, 2008.
International Search Report for PCT/US2008/065955 dated Aug. 22, 2008.
International Search Report for PCT/US2008/066929 dated Aug. 29, 2008.
Invitation to Pay Additional Fees and Annex to Form PCT/ISA/206 Communication Relating to the Results of the Partial International Search for International Application PCT/US2003/015638 dated Feb. 3, 2004.
Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.
Jones et al., "A Probabilistic Model of Information Retrieval: Development and Status", Information Processing and Management, Aug. 1998, 76 pages.
Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

(56) References Cited

OTHER PUBLICATIONS

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.
Lin et al., "Real-Time Image Template Matching Based on Systolic Array Processor", International Journal of Electronics; Dec. 1, 1992; pp. 1165-1176; vol. 73, No. 6; London, Great Britain.
Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.
Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.
Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Dehon, "DPGA-coupled microprocessors: commodity ICs for the early 21st Century", FPGAS for Custom Computing Machines, 1994, Proceedings. IEEE Workshop on Napa Valley, CA, pp. 31-39, Los Alamitos, CA.
Gokhale et al., "Reconfigurable Computing: Accelerating Computation with Field-Programmable Gate Arrays", Springer, 2005, pp. 1-36.
Ibrahim et al., "Lecture Notes in Computer Science: Database and Expert Systems Applications", 2000, p. 769, vol. 1873, Springer.
Mueller, "Upgrading and Repairing PCs, 15th Anniversary Edition", 2004, pp. 63-66, 188, Que.
Office Action for EP Application 08756734.3 dated Jun. 4, 2012.
Office Action for JP Application 2010-511331 dated Apr. 23, 2013.
Office Action for U.S. Appl. No. 13/301,340 dated Jun. 6, 2013.
Office Action for U.S. Appl. No. 13/301,340 dated May 9, 2012.
Office Action for U.S. Appl. No. 13/301,387 dated Jun. 6, 2012.
Office Action for U.S. Appl. No. 13/301,387 dated May 31, 2013.
Worboys, "GIS: A Computing Perspective", 1995, pp. 245-247, 287, Taylor & Francis Ltd.
"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20 Waterman%20Whitepaper.pdf.
"ACTIV Financial Announces Hardware Based Market Data Feed Processing Strategy", for Release on Apr. 2, 2007, 2 pages.

"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.
"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.
"The Field-Programmable Port Extender (FPX)", downloaded from http://www.arl.wustl.edu/arl/in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Anerousis et al., "Using the At&T Labs PacketScope for Internet Measurement, Design, and Performance Analysis", Network and Distributed Systems Research Laboratory, At&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.
Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Commnications Systems, ANCS 2005: Proceedings of the 2005 Symposium on Architecture for Networking and Communications Systems, p. 193-202, ACM Press, 2005.
Barone-Adesi et al., "Efficient Analytic Approximation of American Option Values", Journal of Finance, vol. 42, No. 2 (Jun. 1987), pp. 301-320.
Behrens et al., "BLASTN Redundancy Filter in Reprogrammable Hardware," Final Project Submission, Fall 2003, Department of Computer Science and Engineering, Washington University.
Berk, "JLex: A lexical analyzer generator for Java™", downloaded from http://www.cs.princeton.edu/~appel/modern/java/Jlex/in Jan. 2002, pp. 1-18.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Cavnar et al., "N-Gram-Based Text Categorization", Proceedings of SDAIR-94, 3rd Annual Symposium on Document Analysis and Information Retrieval, Las Vegas, pp. 161-175, 1994.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

(56) References Cited

OTHER PUBLICATIONS

Cho et al., "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, 1999, Champaign, IL.

Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Cong et al., "An Optional Technology Mapping Algorithm for Delay Optimization in Lookup-Table Based FPGA Designs", IEEE, 1992, pp. 48-53.

Crosman, "Who Will Cure Your Data Latency?", Storage & Servers, Jun. 20, 2007, URL: http:// www.networkcomputing.com/article/printFullArticleSrc.jhtml?article ID=199905630.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters," IEEE Micro, Jan.-Feb. 2004, vol. 24, Issue: 1, pp. 52-61.

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Dharmapurikar, "Fast and Scalable Pattern Matching for Content Filtering", ACM, ANCS 05, 2005, pp. 183-192.

Ebeling et al., "RaPiD—Reconfigurable Pipelined Datapath", University of Washington, Dept. of Computer Science and Engineering, Sep. 23, 1996, Seattle, WA.

Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.

Exegy Inc., "First Exegy Ticker Plant Deployed", Release Date: Oct. 17, 2006, downloaded from http:// news.thomasnet.com/companystory/496530 on Jun. 19, 2007, 5 pages.

Feldman, "High Frequency Traders Get Boost From FPGA Acceleration", Jun. 8, 2007, downloaded from http://www.hpcwire.com/hpc.1600113.html on Jun. 19, 2007, 4 pages.

Forgy, "RETE: A fast algorithm for the many pattern/many object pattern matching problem", Artificial Intelligence, 19, pp. 17-37, 1982.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Navarro, "A Guided Tour to Approximate String Matching", ACM Computing Surveys, vol. 33, No. 1, Mar. 2001, pp. 31-88.

Nunez et al., "The X-MatchLITE FPGA-Based Data Compressor", Euromicro Conference 1999, Proceedings, Italy, Sep. 8-10, 1999, pp. 126-132, Los Alamitos, CA.

Office Action for U.S. Appl. No. 11/561,615 dated Sep. 28, 2009.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ratha et al., "Convolution on Splash 2", Proceedings of IEEE Symposium on FPGAS for Custom Computing Machines, Apr. 19, 1995, pp. 204-213, Los Alamitos, California.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

(56) References Cited

OTHER PUBLICATIONS

Schuehler et al., "Architecture for a Hardware Based, TCP/IP Content Scanning System", IEEE Micro, 24(1):62-69, Jan-Feb. 2004, USA.

Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.

Shah, "Understanding Network Processors", Version 1.0, University of California-Berkeley, Sep. 4, 2001.

Shalunov et al., "Bulk TCP Use and Performance on Internet 2", ACM SIGCOMM Internet Measurement Workshop, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan et al., "A High Throughput String Matching Architecture for Intrusion Detection and Prevention", ISCA 2005: 32nd Annual International Symposium on Computer Architecture, pp. 112-122, 2005.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Wooster et al., "HTTDUMP Network HTTP Packet Snooper", Apr. 25, 1996.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Patent for Automatic Securities Trading Based on Term Matches in News or Information Awarded to News Technologies, LLC, Oct. 3, 2011, downloaded Jan. 20, 2012 from www.triggernews.com/news_trading_body.php, 1 p.

Celko, "Joe Celko's Data & Databases: Concepts in Practice", 1999, pp. 72-74, Morgan Kaufmann Publishers.

Gokhale et al., "Reconfigurable Computing", 2005, pp. 3, 7, 11-15 and 92-93, Springer.

Gokhale et al., "Reconfigurable Computing: Accelerating Computation With Field-Programmable Gate Arrays", 2005, pp. 12-15, Springer.

Motwani et al., "Randomized Algorithms", 1995, pp. 215-216, Cambridge University Press.

Office Action for U.S. Appl. No. 12/013,302 dated Nov. 2, 2011.
Office Action for U.S. Appl. No. 13/076,906 dated Mar. 5, 2012.
Office Action for U.S. Appl. No. 13/076,929 dated Mar. 2, 2012.
Office Action for U.S. Appl. No. 13/076,951 dated Feb. 29, 2012.
Office Action for U.S. Appl. No. 13/077,036 dated Mar. 16, 2012.

Russ et al., Non-Intrusive Built-In Self-Test for FPGA and MCM Applications, Aug. 8-10, 1995, IEEE, 480-485.

Shasha et al., "Database Tuning", 2003, pp. 280-284, Morgan Kaufmann Publishers.

Skiena et al., "Programming Challenges: The Programming Contest Training Manual", 2003, pp. 30-31, Springer.

U.S. Appl. No. 13/301,340, filed Nov. 21, 2011 (Indeck et al.).
U.S. Appl. No. 13/301,387, filed Nov. 21, 2011 (Indeck et al.).
U.S. Appl. No. 13/316,332, filed Dec. 9, 2011 (Taylor et al.).
U.S. Appl. No. 13/344,986, filed Jan. 6, 2012 (Chamberlain et al.).
U.S. Appl. No. 13/345,011, filed Jan. 6, 2012 (Chamberlain et al.).
U.S. Appl. No. 61/570,670, filed Dec. 14, 2011 (Taylor et al.).

Adachi, "Yoku Wakaru Kinyu Sakimono Torihiki" (guidance for financial futures trading), Nippon Jitsugyo Publishing, Aug. 30, 1997, pp. 113-115 and pp. 221-227.

Baker et al., "Time and Area Efficient Pattern Matching on FPGAs", ACM, Feb. 22-24, 2004, pp. 223-232.

Batory, "Modeling the Storage Architectures of Commercial Database Systems", ACM Transactions on Database Systems, Dec. 1985, pp. 463-528, vol. 10, issue 4.

Gokhale et al, "Reconfigurable Computing: Accelerating Computation with Field-Programmable Gate Arrays", Springer, 2005, pp. 1-54, 92-96.

Howe, Data Analysis for Database Design Third Edition, 2001, 335 pages, Butterworth-Heinemann.

NVidia Developer Zone, "GPU Gems 2—Chapter 45, Options Pricing on the GPU"; Mar. 7-11, 2005, 20 pages.

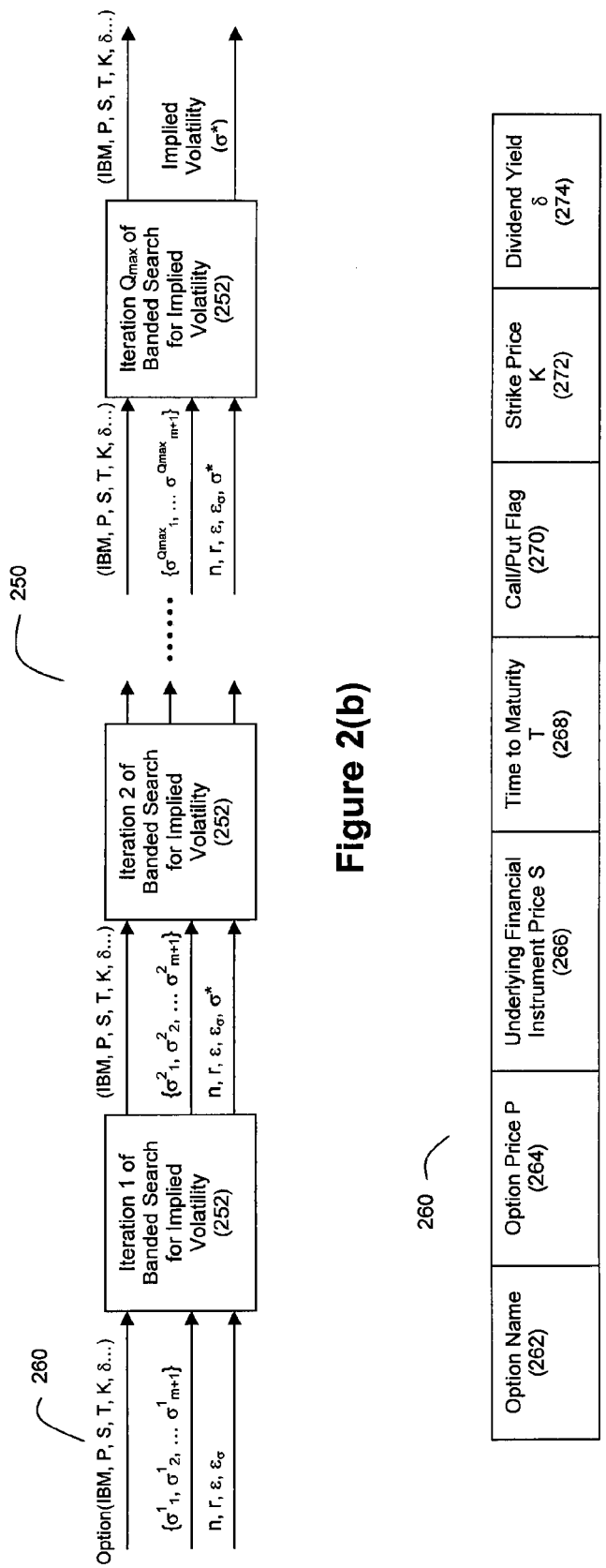

The retrieved values for A and B are used in the computation of $P^{th}(S,K)$:

$$P^{th}(S,K) = \sum_j A_j \max(SB_j - K, 0)$$

The retrieved values for A and B are used in the computation of $P^{th}(S,K)$:

$$P^{th}(S,K) = \sum_j A_j \max(SB_j - K, 0)$$

METHOD AND SYSTEM FOR HIGH SPEED OPTIONS PRICING

CROSS-REFERENCE AND PRIORITY CLAIM TO RELATED PATENT APPLICATIONS

This patent application is a divisional of U.S. patent application Ser. No. 11/760,211, filed Jun. 8, 2007, and entitled "Method and System for High Speed Options Pricing", now U.S. Pat. No. 7,840,482, which claims priority to provisional U.S. patent application 60/814,796, filed Jun. 19, 2006, and entitled "High Speed Processing of Financial Information Using FPGA Devices", the entire disclosures of each of which are incorporated herein by reference.

This patent application is related to the following patent applications: U.S. patent application Ser. No. 09/545,472 (filed Apr. 7, 2000, and entitled "Associative Database Scanning and Information Retrieval", now U.S. Pat. No. 6,711,558), U.S. patent application Ser. No. 10/153,151 (filed May 21, 2002, and entitled "Associative Database Scanning and Information Retrieval using FPGA Devices", now U.S. Pat. No. 7,139,743), U.S. patent application Ser. No. 11/561,615 (filed Nov. 20, 2006, entitled "Method and Apparatus for Processing Financial Information at Hardware Speeds Using FPGA Devices", and published as 2007/0078837), published PCT applications WO 05/048134 and WO 05/026925 (both filed May 21, 2004, and entitled "Intelligent Data Storage and Processing Using FPGA Devices"), U.S. provisional patent application 60/658,418 (filed Mar. 3, 2005, and entitled "Biosequence Similarity Searching Using FPGA Devices"), U.S. provisional patent application 60/736,081 (filed Nov. 11, 2005, and entitled "Method and Apparatus for Performing Biosequence Similarity Searching"), PCT patent application PCT/US2006/006105 (filed Feb. 22, 2006, and entitled Method and Apparatus for Performing Biosequence Similarity Searching), U.S. patent application Ser. No. 11/293,619 (filed Dec. 2, 2005, and entitled "Method and Device for High Performance Regular Expression Pattern Matching"), U.S. patent application Ser. No. 11/339,892 (filed Jan. 26, 2006, and entitled "Firmware Socket Module for FPGA-Based Pipeline Processing"), and U.S. patent application Ser. No. 11/381,214 (filed May 2, 2006, and entitled "Method and Apparatus for Approximate Pattern Matching"), the entire disclosures of each of which are incorporated herein by reference.

FIELD OF THE INVENTION

The present invention relates to the field of processing financial market data, particularly the field of performing options pricing operations on financial market data.

BACKGROUND AND SUMMARY OF THE INVENTION

Speed of information delivery is a valuable dimension to the financial instrument trading and brokerage industry. The ability of a trader to obtain analytical information (e.g., pricing, trade volume, trends, etc.) about financial instruments such as stocks, bonds and particularly options as quickly as possible cannot be overstated; reductions in information delivery delay on the order of fractions of a second can provide important value to traders. However, conventional techniques in the art which rely on software executed on a general purpose processor (GPP) to compute analytical information for financial instruments generally suffer latency issues due to the computation intensive nature of many financial instrument analytics models.

Options pricing is a function that particularly suffers from computational latency in a conventional GPP-based platform. An "option" is a derivative financial instrument that is related to an underlying financial instrument. An option is a contract that allows the option holder to trade in shares of the underlying financial instrument at a specific price at some time in the future. This future time is related to the option's lifetime (also referred to as the option's "time to maturity"), which is the amount of time after which the option to buy/sell cannot be exercised. The specific time in the future that the option-holder can exercise his/her choice depends on the type of the option; e.g., an American option can be exercised at any time during the option's lifetime while a European option can only be exercised at the end of the option's lifetime and yet other classes of options can be exercised only at certain pre-determined times during their lifetime.

In the parlance of the financial market, an option to buy shares is referred to as a "call option" (or "call" for short), and an option to sell shares is referred to as a "put option" (or "put" for short). The inventors herein note that the teachings of the present invention are equally applicable to both call options and put options.

Within a financial market data stream, an offer to buy or sell an option is defined by the following characteristics: the identity of the financial instrument underlying the option (e.g., IBM stock), the number of shares of the underlying financial instrument that are covered by the option, the purchase price for the option (P), the lifetime for the option (T), the current price of the underlying financial instrument (S), and the fixed price (K) at which the option-holder has the choice to buy or sell the shares of the underlying financial instrument in the future (which is also known as the "strike price"). An option may additionally include a dividend yield ($\delta$). Another parameter to be included in the trading of options, not directly related to the option but to the market, is the risk-free interest rate (r) at which the potential option-holder can borrow or lend money. The modifier risk-free is used to signify that this is the rate of return one could expect on an investment that has zero risk involved with it. Further options characteristics that affect option pricing include whether the option is a call or put and whether the option is an American or European option, as explained above.

Based on knowledge of the values for these option characteristics and the risk-free interest rate, a trader may then assess whether the purchase price P for the option represents a good deal for the trader. While what constitutes a "good deal" will almost assuredly vary for different traders, it is expected that most traders will have an interest in buying or selling an option if the price P for the option is deemed favorable in view of the other option characteristics. Among the challenges in making this assessment as to an option's desirability is the complexity of factors that affect option price and option desirability.

One important consideration in making such an assessment of an option is an estimate of how much the price of the underlying financial instrument can fluctuate in the future. This fluctuation in the price of the underlying financial instrument is commonly referred to as the "volatility" of the financial instrument. One measure of this volatility is to observe the historical trend of the price of the financial instrument and extrapolate the volatility from the historical trend. Another measure of the volatility can be obtained by approximating (within some degree of tolerance) the purchase price for the option (P) with a theoretical fair market option price ($P^{th}$) that depends on the volatility. The volatility so obtained is termed the "implied volatility" since it is representative of the volatility of the underlying financial instrument implied by the option. Such a theoretical fair market option price ($P^{th}$) can be calculated using an option pricing model. Various option pricing models are known in the art or used in a proprietary manner for computing theoretical option prices. Prominent among these models are the Black-Scholes option pricing model and the Cox, Ross, and Rubinstein (CRR) option pricing model, both of which are well-known in the art.

As indicated above, the downside of using some of these option pricing models to evaluate whether a buy/sell offer for an option represents a desirable transaction is that these option pricing models are very computation intensive. Because of their computation intensive nature, a delay is introduced between the time that the data regarding the option reaches a trader and the time when the trader has access to the pricing information computed from the option data (e.g., the option's implied volatility and/or the option's theoretical fair market price). This delay may be costly to the trader in that another party may have already bought the offered option while the trader was awaiting the results of the option pricing model. For example, consider the following exemplary scenario. Suppose there is an outstanding "bid" on an option for stock X that is a firm quote to sell an option to buy 100 shares of Stock X at an option price (P) of $10.00 per share, and wherein the current market price (S) for Stock X is $25 per share, and wherein the option further has values defined for K, T, and $\delta$, and wherein r is known. Also suppose there are two traders, A and B, each wanting to buy a call option on 100 shares of stock X, but before doing so would like to know whether the option price P of $10.00 per share represents a good deal given the other option characteristics (S, K, T, and $\delta$) and the risk-free interest rate (r). To aid this evaluation process, Trader A and Trader B both have their own implementations of an option pricing model; and they each would typically apply the values of these option characteristics to their respective implementations of an option pricing model to obtain information that is indicative of whether the call option offer represents a desirable transaction. For the purposes of this example, it will be presumed that this offer to sell the call option does in fact represent a good deal to both traders. The trader whose implementation of an option pricing model operates the fastest will have a decided market and investment advantage as he will be able to make an informed investment decision to purchase the call option before the other trader since the "winning" trader will be informed of the option's desirability while the "losing" trader is still awaiting the output from his/her respective implementation of the option pricing model. Accordingly, the "losing" trader will miss out on the desirable option because the "winning" trader will have taken that option offer off the market before the "losing" trader realized that he/she wanted to buy it. Thus, it can be seen that the speed of a trader's option pricing engine inevitably translates into a trading advantage, which even in a single large volume opportunity can amount to significant sums of money. Over time this market advantage can even lead to the success or failure of a trader to attract and keep customers and stay in business.

The ability of a computational engine that implements an option pricing model to quickly produce its output is even more significant when "black box" trading is taken into consideration. With such black box trading, the trader does not eyeball offers to buy/sell financial instruments as they tick across a trading screen to decide whether or not he/she will buy/sell a financial instrument. Instead, the trader defines the conditions under which he/she will buy/sell various financial instruments via a computer implemented algorithm. This algorithm then traverses the offers to buy/sell various financial instruments within a market data feed to identify which offers meet the specified conditions. Upon finding a "hit" on an offer within the feed, the algorithm operates to automatically execute a specified trade on the offer (without further trader intervention). Thus, returning to the above example, such an algorithm may have a specified condition to the effect of "buy a call option on X shares of ABC stock if the implied volatility for the call option is less than or equal to Z". Another exemplary algorithmic condition could be "buy a call option on Y shares of ABC stock if the computed theoretical fair market price for that option is greater than the actual price for the option by at least Z cents". Thus, before the algorithm can make a decision as to whether a given call option offer will be purchased, the implied volatility and/or theoretical fair market price for the option offer will need to be computed via some form of an option pricing model. As explained above, with such black box trading, the computation latency for computing the implied volatility and/or theoretical fair market price is highly important as delays on the order of fractions of a second will be critical in determining which trader is able to strike first to buy or sell options at a desirable price. Given that the inventors envision that black box trading will continue to grow in prominence in future years (for example, it is estimated that currently greater than 50% of trades are performed automatically via computer-generated "black box" transactions), it is believed that high performance computation engines for option pricing will become ever more important to the financial instrument trading industry.

Use of the CRR option pricing model for the analytics discussed above is especially computation intensive, as it is both an iterative model and a binomial model. Using the CRR option pricing model, an option's theoretical fair market price ($P^{th}$) can be computed as a function of the following inputs: P, S, K, T, $\delta$, r, a volatility value $\sigma$, and n, wherein n represents a number of discrete time steps within the option's lifetime that the underlying financial instrument's price may fluctuate. The parameter n is specified by the user of the CRR option pricing algorithm. By iteratively updating the volatility value $\sigma$ until the theoretical fair market price $P^{th}$ for that option approaches the option's actual market price (P), an option's "implied volatility" ($\sigma^*$) can be computed. The "implied volatility", which represents the volatility of the underlying financial instrument at which the option's theoretical fair market price ($P^{th}$) is within some specified tolerance s of the option's actual purchase price (P), is an important characteristic of an option that is used by traders to decide whether a given option should be bought or not. However, because of the iterative nature of the implied volatility computation and the binomial nature of the theoretical fair market price computation, the calculation of implied volatility using the CRR option pricing model is highly computation intensive, as noted above. Conventional implementations of the CRR option pricing model to compute implied volatility in software on GPPs are believed by the inventors to be unsatisfactory because of the processing delays experienced while computing the implied volatility.

Based on the foregoing, the inventors herein believe that a need in the art exists for accelerating the speed by which option pricing models can be used to evaluate option prices.

As further background, the inventors note that, in an attempt to promptly deliver financial information to interested parties such as traders, a variety of market data platforms have been developed for the purpose of ostensible "real time" delivery of streaming bid, offer, and trade information for financial instruments to traders. FIG. 12 illustrates an exemplary platform that is currently known in the art and used by traders to support their trading activities, including options trading. As shown in FIG. 12, the market data platform 1200 comprises a plurality of functional units 1202 that are configured to carry out data processing operations such as the ones depicted in units 1202 (including options pricing), whereby traders at workstations 1204 have access to financial data of interest and whereby trade information can be sent to various exchanges or other outside systems via output path 1212. The purpose and details of the functions performed by functional units 1202 are well-known in the art. A stream 1206 of financial data arrives at the system 1200 from an external source such as the exchanges themselves (e.g., NYSE, NASDAQ, etc.) over private data communication lines or from extranet providers such as Savvis or BT Radians. The financial data source stream 1206 comprises a series of messages that individually represent a new offer to buy or sell a financial instrument, an indication of a completed sale of a financial instrument, notifications of corrections to previously-reported sales of a financial instrument, administrative messages related to such transactions, and the like. As used herein, a "financial instrument" refers to a contract representing equity ownership, debt or credit, typically in relation to a corporate of governmental entity, wherein the contract is saleable. Examples of "financial instruments" include stocks, bonds, options, commodities, currency traded on currency markets, etc. but would not include cash or checks in the sense of how those items are used outside financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

Functional units 1202 of the system then operate on stream 1206 or data derived therefrom to carry out a variety of financial processing tasks. As used herein, the term "financial market data" refers to the data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. The term "financial market source data" refers to a feed of financial market data received directly from a data source such as an exchange itself or a third party provider (e.g., a Savvis or BT Radians provider). The term "financial market secondary data" refers to financial market data that has been derived from financial market source data, such as data produced by a feed compression operation, a feed handling operation, an option pricing operation, etc.

Because of the massive computations required to support such a platform, current implementations known to the inventors herein typically deploy these functions across a number of individual computer systems that are networked together, to thereby achieve the appropriate processing scale for information delivery to traders with an acceptable degree of latency. This distribution process involves partitioning a given function into multiple logical units and implementing each logical unit in software on its own computer system/server. The particular partitioning scheme that is used is dependent on the particular function and the nature of the data with which that function works. The inventors believe that a number of different partitioning schemes for market data platforms have been developed over the years. For large market data platforms, the scale of deployment across multiple computer systems and servers can be physically massive, often filling entire rooms with computer systems and servers, thereby contributing to expensive and complex purchasing, maintenance, and service issues.

This partitioning approach is shown by FIG. 12 wherein each functional unit 1202 can be thought of as its own computer system or server. Buses 1208 and 1210 can be used to network different functional units 1202 together. For many functions, redundancy and scale can be provided by parallel computer systems/servers such as those shown in connection with options pricing and others. To the inventors' knowledge, these functions are deployed in software that is executed by the conventional GPPs resident on the computer systems/servers 1202. The nature of GPPs and software systems in the current state of the art known to the inventors herein imposes constraints that limit the performance of these functions. Performance is typically measured as some number of units of computational work that can be performed per unit time on a system (commonly called "throughput"), and the time required to perform each individual unit of computational work from start to finish (commonly called "latency" or delay). Also, because of the many physical machines required by system 1200, communication latencies are introduced into the data processing operations because of the processing overhead involved in transmitting messages to and from different machines.

Despite the improvements to the industry that these systems have provided, the inventors herein believe that significant further improvements can be made. In doing so, the inventors herein disclose that the underlying technology disclosed in the related and incorporated patents and patent applications identified above can be harnessed in a novel and non-obvious way to fundamentally change the system architecture in which market data platforms are deployed.

In above-referenced related U.S. Pat. No. 7,139,743, it was first disclosed that reconfigurable logic, such as Field Programmable Gate Arrays (FPGAs), can be deployed to process streaming financial information at hardware speeds. As examples, the '743 patent disclosed the use of FPGAs to perform data reduction operations on streaming financial information, with specific examples of such data reduction operations being a minimum price function, a maximum price function, and a latest price function.

Since that time, the inventors herein have greatly expanded the scope of functionality for processing streams of financial information with reconfigurable logic.

In accordance with one embodiment of the invention described herein, options pricing can be performed at hardware speeds via reconfigurable logic deployed in hardware appliances to greatly accelerate the speed by which option pricing operations can be performed, thereby providing important competitive advantages to traders. Thus, in accordance with this embodiment of the invention, it is disclosed that the options pricing functionality 1202 that is performed in software on conventional platforms can be replaced with reconfigurable logic that is configured as an options pricing engine. Such an options pricing engine can perform a number of computations related to options to aid in the evaluation of whether a given option represents a desirable transaction. For example, such an options pricing engine can be configured to compute an implied volatility for an option or a theoretical fair market price for an option. The inventors further disclose that in addition to options pricing, other functions of a conventional market data platform can be deployed in reconfigurable logic, thereby greatly consolidating the distributed nature of the conventional market data platform into fewer and much smaller appliances while still providing acceleration with respect to latency and throughput.

As used herein, the term "general-purpose processor" (or GPP) refers to a hardware device that fetches instructions and executes those instructions (for example, an Intel Xeon processor or an AMD Opteron processor). The term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. The term "software" will refer to data processing functionality that is deployed on a GPP. The term "firmware" will refer to data processing functionality that is deployed on reconfigurable logic.

According to another aspect of the invention, the inventors herein have streamlined the manner in which an option's implied volatility and fair market price can be computed, thereby providing acceleration independently of whether such functionality is deployed in hardware or software. While it is preferred that the implied volatility and fair market price computations disclosed herein be performed via firmware pipelines deployed in reconfigurable logic, the inventors herein further note that the architectural improvements with respect to how the implied volatility and/or fair market prices can be computed can also provide acceleration when performed in hardware on custom Application Specific Integrated Circuits (ASICs), in software on other platforms such as superscalar processors, multi-core processors, graphics processor units (GPUs), physical processor units (PPUs), chip multi-processors, and GPPs, or in a hybrid system involving exploitation of hardware, including reconfigurable hardware, and software techniques executing on a variety of platforms.

With respect to computing an option's implied volatility, the inventors disclose that an iterative banded m-ary search within the option's volatility space can be performed to identify the volatility value for which the option's theoretical fair market price, computed according to an option pricing model, approximates the option's actual purchase price to within a predetermined tolerance. This identified volatility value for which the option's computed theoretical fair market price approximates the option's actual purchase price to within a predetermined tolerance can then be used as the option's implied volatility.

With this iterative banded m-ary approach, a plurality m+1 theoretical fair market prices are preferably computed in parallel for different volatility values within the volatility space for a given iteration, thereby providing acceleration with respect to the computation of the implied volatility. At least one, and preferably a plurality of conditions are tested to determine whether an additional iteration is needed to find the implied volatility. As explained hereinafter, a theoretical fair market price convergence property (c) is preferably used as one of these conditions. Also as explained hereinafter, a volatility convergence property ($\delta_o$) is preferably used as another of these conditions.

Preferably, the option pricing model that is used to compute the option's theoretical fair market price is the CRR option pricing model. To accelerate the computation of the option's theoretical fair market price according to the CRR model, disclosed herein is a technique for parallelizing and pipelining the computation of the intermediate prices at different time steps within the CRR binomial tree, thereby providing acceleration with respect to the computation of the theoretical fair market price according to the CRR option pricing model.

In accordance with another embodiment of the invention, disclosed herein is a technique employing a lookup table to retrieve precomputed terms that are used in the computation of a European option's theoretical fair market price. Optionally, the theoretical fair market option price can then be used to drive a computation of the implied volatility as described above. Preferably, this lookup table is indexed by the European option's volatility and time to maturity. Furthermore, in an embodiment wherein the lookup table is used to compute a European option's theoretical fair market price but not its implied volatility, it is preferred that an additional lookup table of volatility values indexed by financial instruments be employed to identify a volatility value applicable to the underlying financial instrument of the subject European option. The lookup table terms retrieved from the table and indexed by the option's volatility and time to maturity can be fed to a combinatorial logic stage that is configured to accelerate the computation of the theoretical fair market price by parallelizing the computation of the constituent components of a summation formula for determining the option's theoretical fair market price.

In accordance with yet another embodiment of the invention, disclosed herein is a technique for directly computing the terms that are used in the computation of the option's theoretical fair market price. With this technique, a plurality of parallel computation modules are preferably employed to compute each term in parallel, thereby accelerating the overall computation of the option's theoretical fair market price.

Further still, to better map these computational modules onto available processing resources, a partitioning scheme can optionally be employed to distribute portions of the term computations across different processing resources.

As noted above, these parallel/pipelined architectures for computing an option's implied volatility and/or theoretical fair market price are preferably deployed in reconfigurable logic, thereby providing not only data processing at hardware speeds but also providing flexibility with respect to the parameters and models used in the computations. Preferably, a firmware pipeline is deployed on the reconfigurable logic to accelerate at least a portion of these parallel/pipelined architectures, as explained in greater detail hereinafter. However, as stated above, it should be noted that processing resources other than reconfigurable logic can be used to implement the streamlined options pricing architectures described herein.

These and other features and advantages of the present invention will be understood by those having ordinary skill in the art upon review of the description and figures hereinafter.

BRIEF DESCRIPTION OF THE DRAWINGS

FIG. 2(b) depicts an exemplary embodiment of a computational pipeline for computing an option's implied volatility;

FIG. 2(c) depicts an exemplary option message that can be processed by the present invention;

DETAILED DESCRIPTION OF THE PREFERRED EMBODIMENTS

Figure 1A:
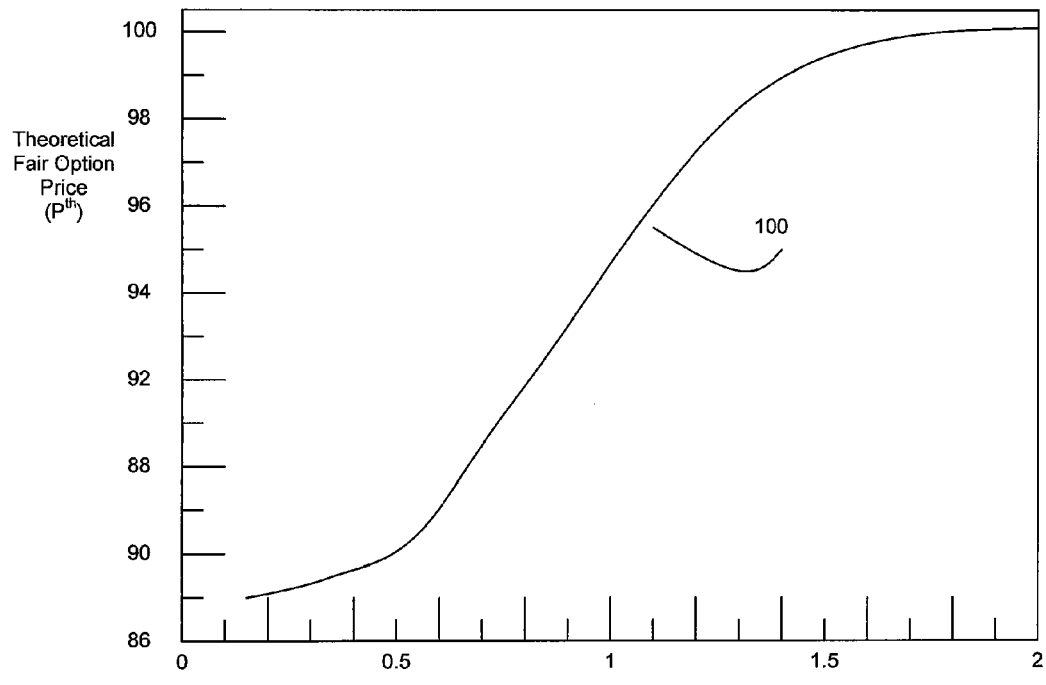
FIGS. 1(a) and (b) depict an exemplary plot of a theoretical fair market price for an option calculated using the CRR option pricing model versus the option's volatility.

In accordance with an embodiment of the present invention, it is desired to efficiently compute an option's implied volatility $\sigma^*$. FIG. 1(a) is an exemplary plot 100 that illustrates how an option's theoretical fair market option price, computed using the CRR option pricing model, varies as a function of volatility. Theoretical fair market price refers to the price that should be assigned to the option to prevent riskless arbitrage opportunities, i.e., the option should be priced so that the potential option-holder cannot make a profit on it without taking any risk. Any of a number of option pricing models can be used to determine an option's theoretical fair market price, including but not limited to the CRR option pricing model, the Black-Scholes option pricing model, and other option pricing models, both those well-known to the public and those that are proprietary to traders and brokerage businesses. In this exemplary embodiment of the invention, the CRR option pricing model will be used; however it should be noted that a practitioner of the present invention can choose to deploy other option pricing models when computing an option's implied volatility.

Also, in this example, it is assumed that the stock price S for the stock underlying the option is 100, the strike price K for the option is 100, the time to maturity T for the option is 10 months, the interest rate r applicable to the option is 100, compounded annually, the dividend yield $\delta$ for the option is 0, and the number of time steps n for the CRR option pricing model is 100. It should be noted that the scale and values shown in this plot are exemplary only, as other values and scales may readily be used. For example, volatility is typically expressed in terms of standard deviation of the underlying financial instrument price around a mean value for the underlying financial instrument price. With such a scale, the volatility values would, by definition, always be positive. Given that the range of volatility values for most financial instruments will not exceed 2 standard deviations, for the purposes of explanation herein, it is helpful to illustrate a volatility range of 0 to 2. However, it should be noted that other ranges and scales could be used to express a financial instrument's volatility space.

Plot 100 shows that the option price is a monotonically increasing function of volatility. As used herein, monotonically increasing refers to a function wherein the first derivative thereof is always a non-negative number. With plot 100, as the volatility increases, the curve approaches the value S of the stock price (which has been assumed to be 100 in this example).

Figure 1B:
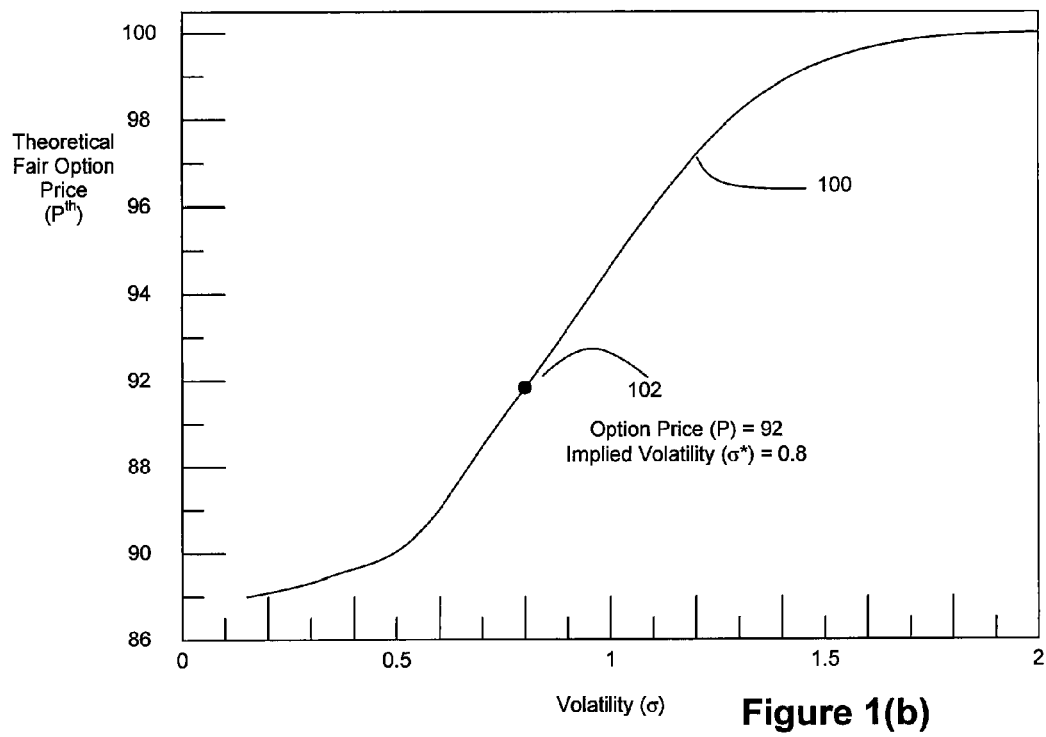
FIGS. 1(c)-(e) depict an iterative banded approach to the computation of an option's implied volatility for the plot of FIGS. 1(a) and (b)

The problem of interest then is that given a purchase price for an option, one needs to calculate the volatility value for the option at that purchase price. It should be recalled that the implied volatility $\sigma^*$ is the volatility value for which the option's theoretical fair market price approximates the option's actual purchase price P to within some tolerance. In this example, we will assume that the option's actual purchase price P is 92, which results in the option's implied volatility $\sigma^*$ being 0.8, as shown by point 102 on plot 100 of FIG. 1(b). Because the dependence of the theoretical fair market option price on volatility does not have a closed-form, an analytic expression cannot readily be used to directly compute the volatility as a function of the theoretical fair market option price. One solution to this problem is an iterative method that iteratively computes the theoretical fair market option price from a given volatility value and iteratively adjusts the volatility value used in the computation until a theoretical fair market option price is computed that is within some tolerance of the actual option purchase price P.

Figure 1C:
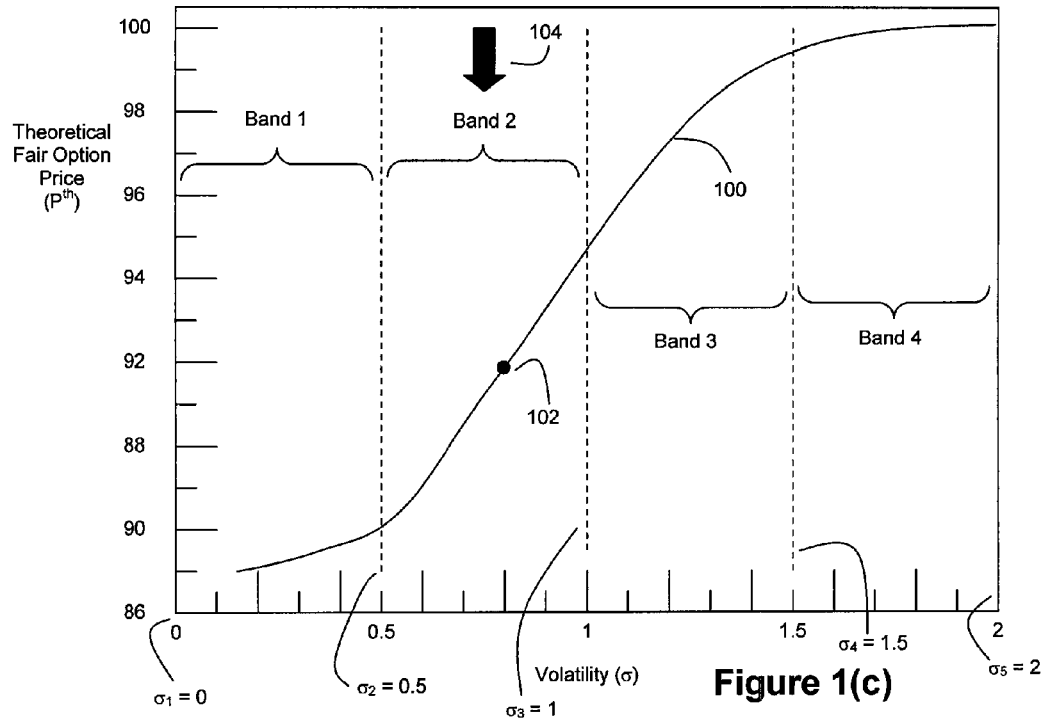

To speed this process, parallelism is preferably applied, preferably in a banded iterative approach. With the banded iterative approach, multiple starting points for volatility values are chosen such that the volatility range is subdivided into a plurality m of bands, as shown in FIG. 1(c). At each iteration, the theoretical fair market option price for each of a plurality of volatility values (preferably m+1 volatility values ($\sigma_1, \sigma_2, \ldots \sigma_{m+1}$) that define the boundaries of each volatility band) are computed. As noted, these computations are preferably performed in parallel. In the example of FIG. 1(c), wherein m is 4, an initial volatility range of 0 to 2 has been subdivided into 4 bands, whose boundary volatility values are $\sigma_1=0$, $\sigma_2=0.5$, $\sigma_3=1.0$, $\sigma_4=1.5$ and $\sigma_5=2.0$. The theoretical fair market purchase prices ($P^{th}(\sigma_1)$, $P^{th}(\sigma_2)$, $P^{th}(\sigma^3)$, $P^{th}(\sigma_4)$ and $P^{th}(\sigma_5)$) are computed for each of these volatility boundary values. After computation of these theoretical fair market option prices, the algorithm checks whether any of the computed theoretical fair market option prices are within some tolerance $\epsilon$ of the actual option purchase price P. If one of the theoretical purchase prices $P^{th}(\sigma_k)$ is within $\epsilon$ of P, then the implied volatility $\sigma^*$ is determined to be equal to $\sigma_k$. If none of the computed theoretical purchase prices are within $\epsilon$ of P, then another iteration of the algorithm is needed. Thus, the tolerance $\epsilon$ serves as a theoretical fair market price convergence property. As explained below, two other conditions—a iteration maximum and a volatility convergence property—can also optionally be tested to determine whether another iteration is needed.

To intelligently narrow the volatility band within which the algorithm searches for the implied volatility, the algorithm determines the volatility band within which the implied volatility resides. Because the theoretical fair market option price is a monotonically increasing function of volatility, the volatility band within which the implied volatility resides can be quickly determined by identifying the volatility band for which the theoretical fair market option prices at its boundaries encompass the actual option purchase price P. In the example of FIG. 1(c), the volatility band within which the implied volatility resides is labeled as 104. As can be seen, the volatility value at the lower boundary of band 104 is 0.5, for which the theoretical fair market option price is approximately 90, and the volatility value at the upper boundary of band 104 is 1.0, for which the theoretical fair market option price is approximately 95. Because the actual option purchase price of 92 falls between these two computed theoretical purchase price values, band 104 is identified as the volatility band within which the implied volatility resides.

Figure 1D:
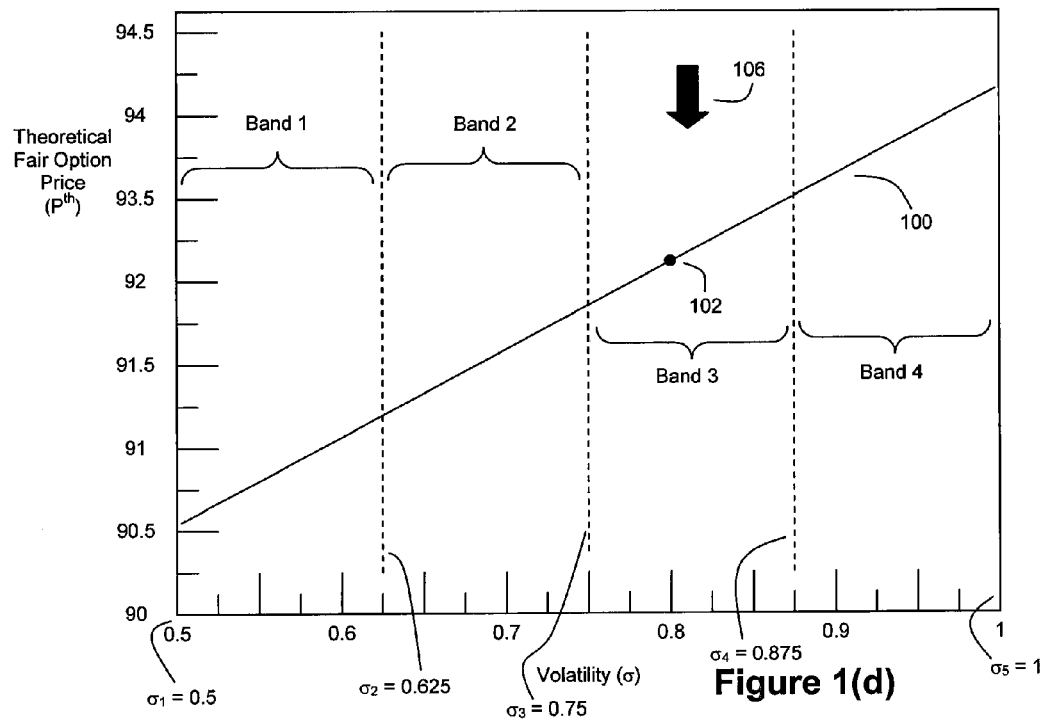
Figure 1E:
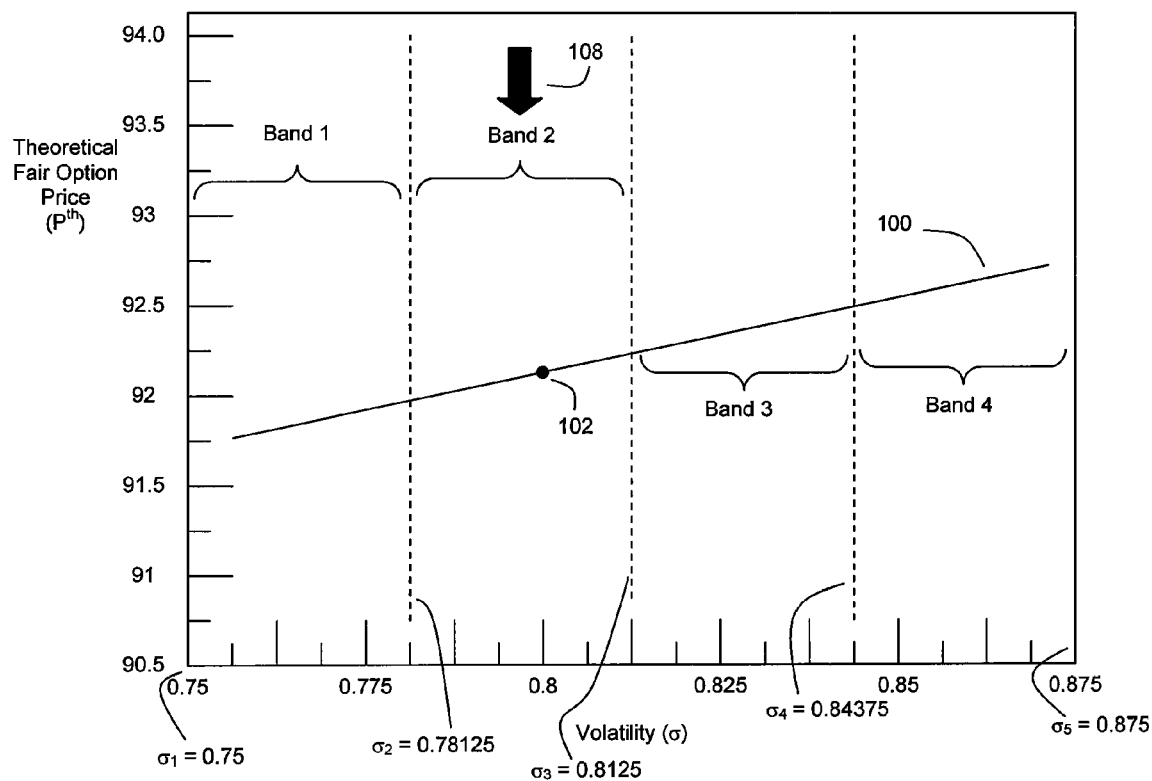

Thus, during the next iteration, band 104 from the first iteration is subdivided into another plurality m of bands, as shown in FIG. 1(d). Thus, in the example of FIG. 1(d), the volatility band boundary values for the second iteration are $\sigma_1=0.5$, $\sigma_2=0.625$, $\sigma_3=0.75$, $\sigma_4=0.875$ and $\sigma_5=1.0$. The theoretical fair market purchase prices are then computed for each of these volatility boundary values, and a check is once again performed to assess whether the implied volatility has been found by determining whether any of the computed theoretical fair market option prices are within $\epsilon$ of P. If the implied volatility has not been found, then the band 106 within which the implied volatility resides is once again identified. The identified band 106, is then further subdivided into a plurality m of bands during a next iteration, as shown in FIG. 1(e). During this next iteration, the parallel computation of theoretical fair market option prices is once again performed with a check to determine whether the implied volatility has been found. Presuming that it has not, the algorithm operates to identify band 108 for subdivision during the next iteration. Such iterative narrowing of the volatility band within which the implied volatility resides then continues until the algorithm determines that is has found the implied volatility within a sufficient degree of precision or any one of the other conditions for halting the process are satisfied.

While the example of FIG. 1(a)-(e) has used a value of m=4 as an example, it should be noted that other values of m could readily be used in this iterative banded search for the implied volatility. Also, while the same value of m has been used for each iteration in the examples of FIGS. 1(a)-(e), it should be noted that the value of m could be different for each iteration if so desired by a practitioner of this embodiment of the present invention. Further still, in the examples of FIGS. 1(a)-(e), each volatility band has been equally sized by essentially dividing the volatility range of interest by m. It should be noted that the volatility bands used in each iteration need not be equally sized. Moreover, it this example, the initial volatility range was set equal to a range of 0-2 (or a full range of volatility). It should be noted that other initial volatility ranges can be used. For example, a practitioner of this embodiment of the invention may find it more efficient to intelligently select the initial volatility range. With such intelligent selection, the initial volatility range can be selected based on historical volatility values for the option's underlying financial instrument. For example, the lowest recorded volatility value for the financial instrument in the past 12 months (optionally minus some tolerance) can be used as the lower bound of the initial volatility space, and the highest recorded volatility value for the financial instrument in the past 12 months (optionally plus some tolerance) can be used as the upper bound of the initial volatility space.

Figure 2A:
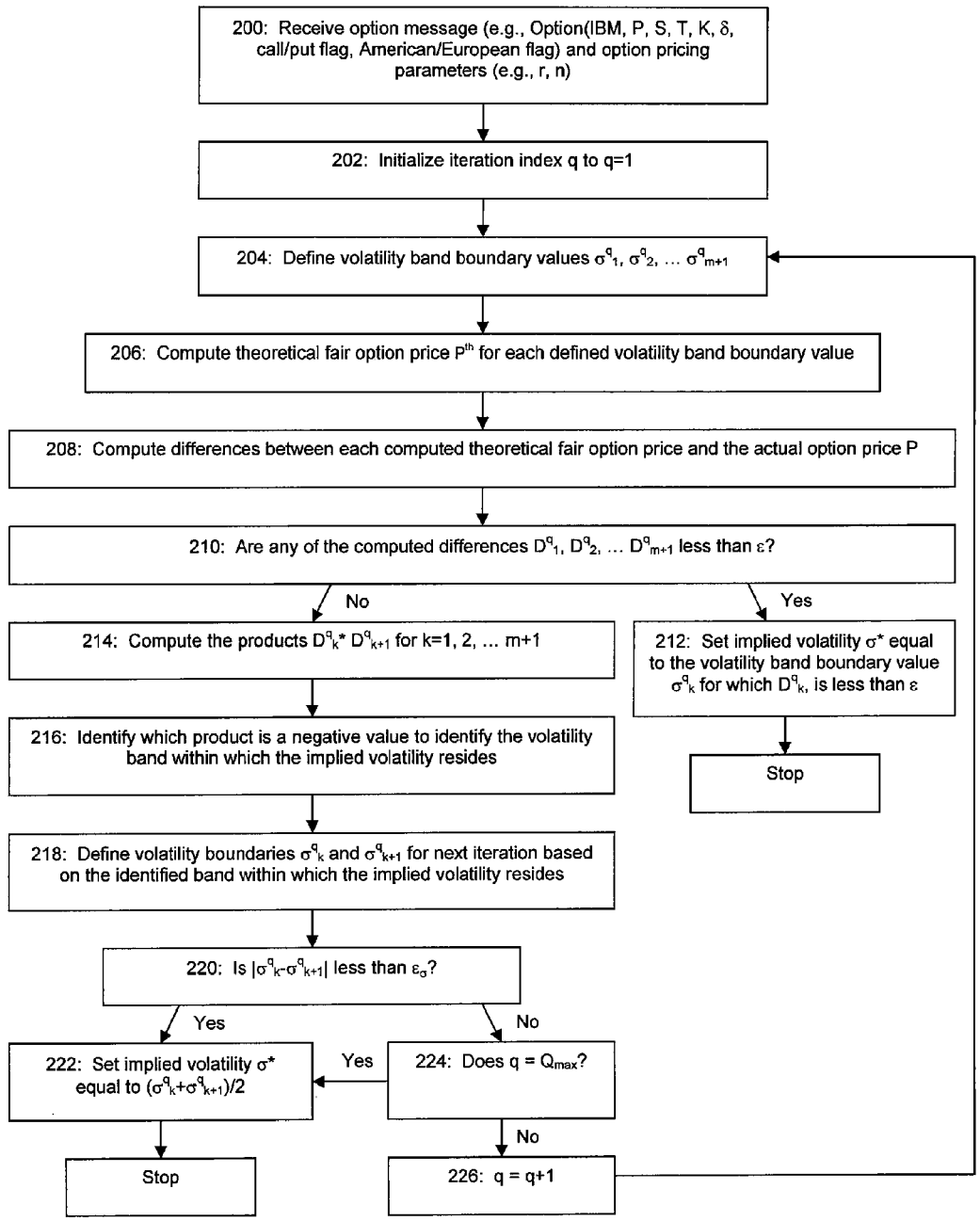
FIG. 2(a) depicts an exemplary flowchart for the iterative banded approach for computing an option's implied volatility.

FIG. 2(a) illustrates an exemplary flowchart for an iterative banded search for implied volatility. At step 200, the algorithm receives a message regarding an option that is available on the market as well as other option pricing parameters. As shown in FIG. 2(c), this option message 260 preferably identifies the financial instrument underlying the option (e.g., IBM stock) (field 262), the number of shares covered by the option, and the P, S, K, T, and $\delta$ values for the option (fields 264, 266, 272, 268, and 274 respectively). As shown in FIG. 2(c), the option message 260 also preferably includes a field 270 that identifies whether the option is a call or put (the C/P flag). It should be noted that the name of the option itself in field 262 encodes whether the option is a European option or an American option. As such, the question of whether a given option is European and American can be resolved by analysis of the name field 262. Examples of option pricing parameters that are also preferably received at step 200 include the risk-free interest rate r and the number of time steps n to be used in the option pricing model. At step 202, the algorithm initializes its iteration index q to q=1. Then, at step 204, the algorithm defines the volatility band boundary values $\sigma^q_1$, $\sigma^q_2, \ldots \sigma^q_{m+1}$, for the first iteration.

Next at step 206, the algorithm computes the theoretical fair market option price $P^{th}$ for each of the volatility band boundary values defined at step 204. Preferably, these computations are performed in parallel as described hereinafter. At step 208, the algorithm computes the differences $D^q_1$, $D^q_2, \ldots D^q_{m+1}$ between each computed theoretical fair market option price and the actual option purchase price P, wherein $D^q_k = P^{th,\,q}(\sigma_k) - P$. As with step 206, the computations of step 208 are preferably performed in parallel. Next, at step 210, the algorithm checks whether the absolute value of any of the computed differences $D^q_1, D^q_2, \ldots D^q_{m+1}$ is less than $\epsilon$. If the absolute values of one of the computed differences $D^q_k$ is less than $\epsilon$, then at step 212, the algorithm sets the implied volatility $\sigma^*$ equal to the volatility value $\sigma^q_k$ for which the computed $D^q_k$ is less than E. The algorithm can then stop and output the determined implied volatility.

However, if none of the differences $D^q_k$ are less than c, then the algorithm proceeds to steps 214 and 216. Steps 214 and 216 operate to identify the volatility band within which the implied volatility resides. At step 214, the algorithm computes the products $D^q_k * D^q_{k+1}$ for k=1, 2, ... m+1. Because of the monotonically increasing characteristic of the theoretical fair market option price with respect to volatility, there will only be one product that is a negative number because there will only be one band where the actual purchase price falls between the band's theoretical fair market option price boundary values. Thus, at step 216, the algorithm will identify the band within which the implied volatility resides by determining which product is a negative number. The volatility boundary values $\sigma^q_k$ and $\sigma^q_{k+1}$ for which the product of $D^q_k * D^q_{k+1}$ is negative will then be used to define the volatility range to be subdivided during the next iteration (step 218).

Preferably, the algorithm also uses two other parameters to control the number of iterations that the algorithm will perform—$Q_{max}$ and $\epsilon_\sigma$. $Q_{max}$ defines the maximum number of iterations that the algorithm will perform, and $\epsilon_\sigma$ describes a volatility convergence property that, when met, will cause the algorithm to stop and output an implied volatility value. The $Q_{max}$ condition operates to decrease the latency of computation by preventing the occurrence of an excessive number of iterations. The $\epsilon_\sigma$ condition also operates to decrease computational latency in cases where the volatility band search space around the implied volatility is very small, but because of a steep slope of the theoretical fair market price curve 100 within that volatility space, the theoretical fair market price convergence condition $\epsilon$ has not been satisfied. Accordingly, the theoretical fair market prices for the different volatility values within the volatility band may possess differences in value that exceed $\epsilon$ while the differences between the different volatility values may be virtually negligible. In such instances, the average volatility value of the narrow volatility band in question is preferably output as the implied volatility. To control the algorithm, using these two parameters, steps 220, 222 and 224 operate as follows. At step 220, the algorithm computes the difference $|\sigma^q_k - \sigma^q_{k+1}|$ for the volatility boundary values defined at step 218, and then compares this difference with $\epsilon_\sigma$. If the difference $|\sigma^q_k - \sigma^q_{k+1}|$ is less than $\epsilon_\sigma$, then the algorithm determines that the defined volatility boundaries and the implied volatility have sufficiently converged, and at step 222, the algorithm outputs the implied volatility as the average of $\sigma^q_k$ and $\sigma^q_{k+1}$ ($\sigma^* = (\sigma^q_k + \sigma^q_{k+1})/2$). If volatility convergence has not been achieved, then the algorithm proceeds to step 224, wherein it checks whether the current iteration q is equal to $Q_{max}$. If q does equal $Q_{max}$, then the algorithm returns to step 222 to output the implied volatility as the average of $\sigma^q_k$ and $\sigma^q_{k+1}$. If q is less than $Q_{max}$ then the algorithm increments the iteration index q at step 226. Thereafter, the algorithm returns to step 204 for the next iteration, wherein the m+1 volatility band boundary values are defined starting from the volatility range defined at step 218.

The algorithm of FIG. 2(a) can be deployed in either hardware or software (or a combination thereof). If deployed in software, preferably a plurality of parallel co-processors or a multi-core processor is used to parallelize and accelerate at least step 206. However, for greater acceleration, preferably at least a portion of the algorithm of FIG. 2(a) (and more preferably the full algorithm of FIG. 2(a)) is deployed in hardware. Preferably, this hardware is reconfigurable logic, as explained hereinafter.

FIG. 2(b) depicts a computational pipeline 250 for realizing the algorithm of FIG. 2(a). The pipeline 250 preferably comprises a plurality of computational modules 252 that are sequenced together to form the pipeline 250. Each computational module 252 is preferably configured to perform the computations for one iteration of the algorithm of FIG. 2(a). As such, it is preferred that the number of computational modules 252 in the pipeline 250 be $Q_{max}$. The first computational module 252 in the pipeline preferably receives the option message 260 as an input (e.g., an option on IBM stock with various defined values for P, S, T, K and $\delta$). The computational module 252 for the first iteration is preferably also initialized with m+1 volatility band boundary values ($\sigma^1_1, \sigma^1_2, \ldots \sigma^1_{m+1}$). The computational module 252 for the first iteration is also preferably initialized with values for n, r, $\epsilon$ and $\epsilon_\sigma$. The computational modules 252 are then configured to execute steps 204-222 of the algorithm. The output of the first computational module 252 for receipt by the computational module 252 of the second iteration would then comprise the same option message parameters, the volatility band boundary values for the second iteration as defined by step 204, and the n, r, $\epsilon$ and $\epsilon_\sigma$ parameters used during the first iteration. The computational modules 252 will also preferably output an implied volatility value $\sigma^*$ if applicable. Due to the pipelined nature of the computational modules 252, the computational module 252 for iteration 1 can be working on a given option message at the same time that computational module 252 for iteration 2 is working on another different option message, and so on. As such, a high throughput of option messages can be streamed through the pipeline, all the while decreasing the latency with which the implied volatility for each option message is determined.

Figure 3:
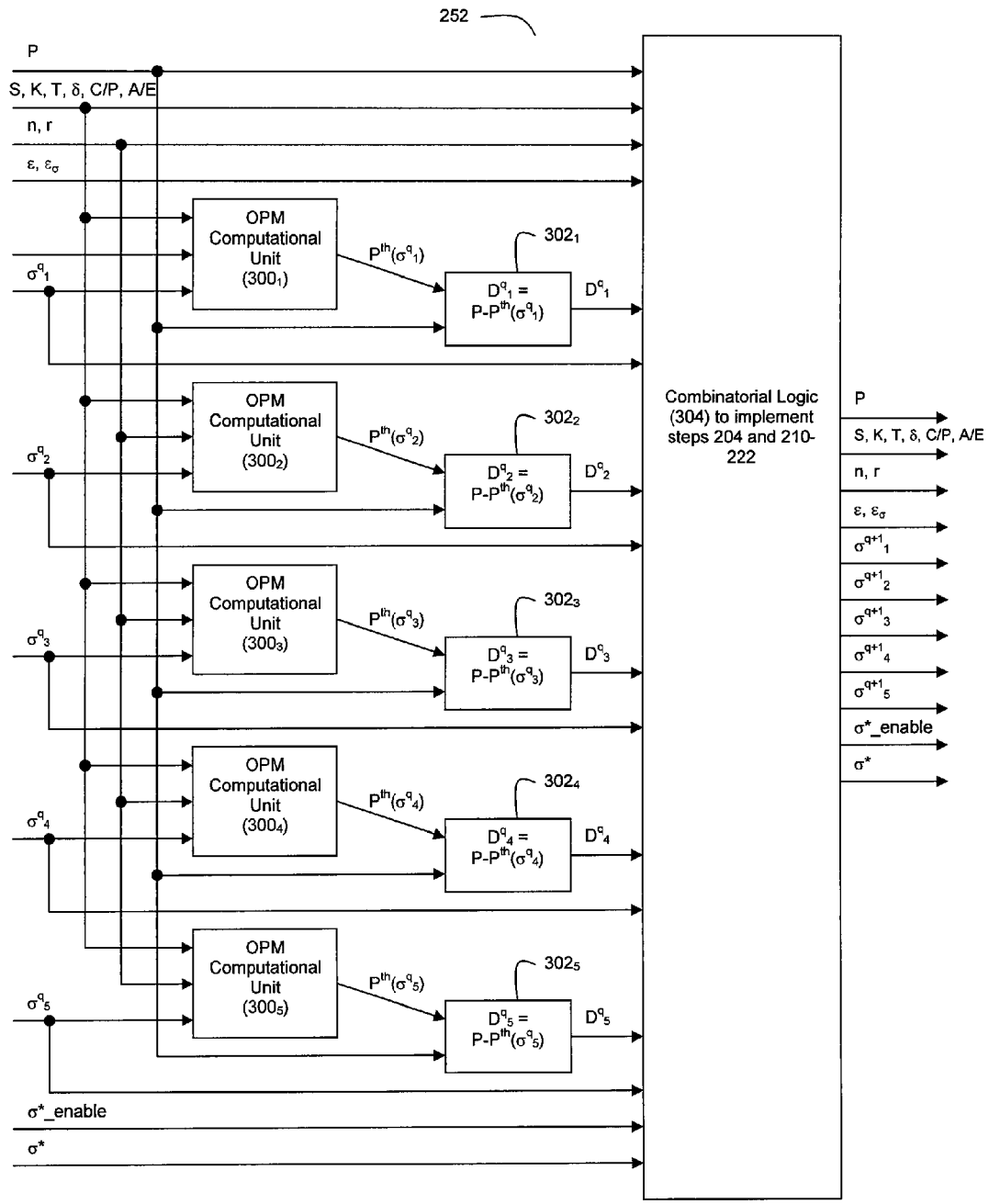
FIG. 3 depicts an exemplary embodiment of a computational pipeline for an iterative stage of the pipeline of FIG. 2(b)

FIG. 3 provides an exploded view of a computational module 252. Preferably, each computational module comprises a plurality m+1 of parallel option pricing model (OPM) computational units 300. In the example of FIG. 3, it can be seen that m is 4; however it should be understood that other values of m could readily be used. Each OPM computational unit 300 is configured to compute a theoretical fair market option price for an input volatility value. The output of each OPM computational unit 300 is fed to a computational unit 302 that computes the difference value $D^q_k$. Thus, the plurality of parallel OPM computational units 300 and difference computational units 302 perform steps 206 and 208 for the algorithm of FIG. 2(a). A combinatorial logic stage 304 of the computational module 252 then receives the outputs from all of the difference computational units 302 and the various parameters P, S, K, T, $\delta$, n, r, $\epsilon$, $\epsilon_\sigma$, and $\sigma^q_1, \sigma^q_2, \ldots \sigma^q_{m+1}$ to perform steps 210-222 of the algorithm.

Each computational module 252 also preferably receives as an input a $\sigma^*\_enable$ signal that indicates whether the implied volatility a* for that option message has been found as well as a $\sigma^*$ signal that identifies the value of the determined implied volatility (although the computational module 252 for the first iteration need not receive these signals as inputs). Combinatorial logic stage 304 preferably sets the $\sigma^*\_enable$ signal high if it has found the implied volatility for the option message and then outputs the implied volatility $\sigma^*$. Preferably, a control unit such as the firmware socket module 1420 described hereinafter with respect to a reconfigurable logic device embodiment of this aspect of the invention operates to read the $\sigma^*\_enable$ and $\sigma^*$ outputs from each computational module 252 to halt the pipelined processing for any message whose implied volatility has already been found.

With such control, when an option's implied volatility has been found at iteration 3, the pipeline 250 need not wait until the final $Q_{max}$ iteration of the pipeline before outputting the implied volatility for the option, thereby eliminating unnecessary latency. The combinatorial logic stage 304 also preferably outputs the P, S, K, T, δ, n, ε, . . . , $ε_o$, and $σ^{q+1}{}_1$, $σ^{q+1}{}_2$, . . . $σ^{q+1}{}_{m+1}$ parameters for use by the next downstream computational module 252 in the pipeline 250.

As noted above, any of a variety of OPMs can be used by the OPM computational units 300 to compute the option's theoretical fair market price. However, it is preferred that an OPM based on the CRR OPM be used. Cox, Ross and Rubinstein showed that in order to calculate the theoretical fair market price of an option, one needs to know only the strike price K, the price S of the financial instrument underlying the option, the range of movement of S (i.e., the volatility), the time to maturity T for the option, the interest rate r, and the dividend yield δ for the option. The CRR binomial model divides the lifetime T of the option into n discrete steps, and assumes that at each step, the stock price S can either go up by a fixed multiplicative factor u or go down by a fixed multiplicative factor d. The factors u and d depend on the volatility σ of the stock, the time to maturity of the options, and the number of discrete steps n. The upward and downward movement factors can be calculated as follows:

$$u = e^{\sigma\sqrt{T/n}} \quad (1)$$

$$d = \frac{1}{u} \quad (2)$$

These particular forms for u and d are chosen to ensure that, as the number of time steps n approaches infinity, the movement of the stock price according to the binomial model approximates the distribution of stock prices that was proposed by Black and Scholes. It should be noted that there are other formulations for u and d for which the movement of the stock price according to the binomial model approximates the distribution of stock prices that was proposed by Black and Scholes. Also, the binomial model preferably assumes that the interest rate r and the dividend yield δ remain constant over the lifetime of the option.

Figure 4:
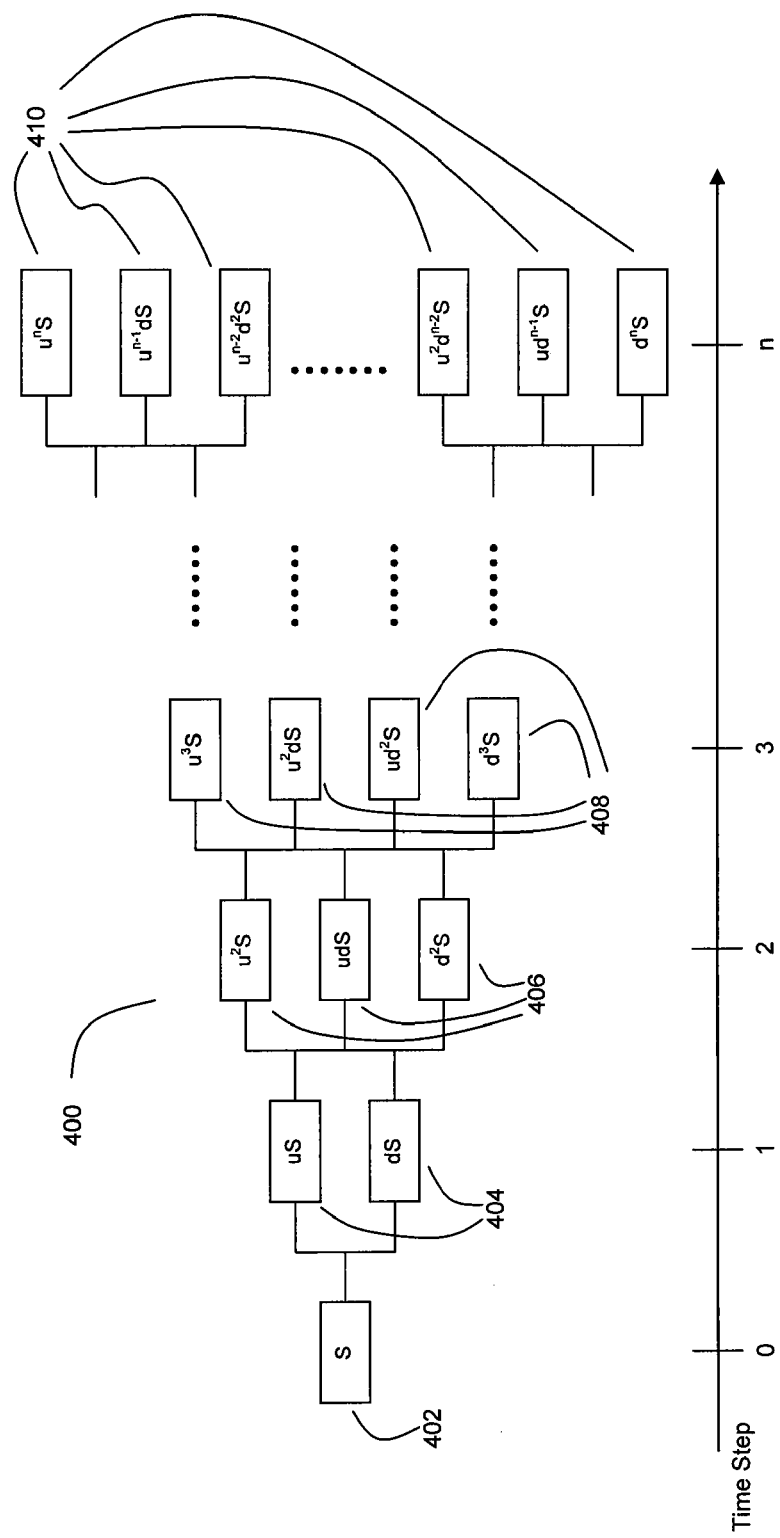
FIG. 4 depicts an exemplary embodiment of a binomial tree of depth n for computing a theoretical fair market option price based on the CRR option pricing model.

Under the assumption that the stock price changes multiplicatively, a binomial tree can be constructed that, at each time step, represents the possible values of the stock price. FIG. 4 illustrates such a binomial tree 400. Note that at time step i, the stock price can take one of i+1 values $u^j d^{i-j}S$, for j=0, 1, . . . , i. Thus, starting from the root node 402 of S, the nodes 404 at time step 1 of the tree 400 exhibit values of uS and dS. At time step 2 of tree 400, the leaves 406 exhibit values of $u^2S$, udS and $d^2S$. At time step 3, the leaves 408 exhibit values of $u^3S$, $u^2 dS$, $ud^2S$ and $d^3S$, and so on until time step n, wherein the leaves 410 exhibit values of $u^nS$, $u^{n-1}dS$, $u^{n-1}d^2S$ . . . $u^2d^{n-2}S$, $ud^{n-1}S$ and $d^nS$.

The theoretical fair market price of the option can then be obtained by working backward through tree 400 from the leaves 410 at time step n through the root 402. Let C(n,i,j) denote the price of the option at the $j^{th}$ node at time step n−i for a binomial tree of depth n. Then, C(n,i,j) can be calculated as:

$$C(n,i,j)=\max[R(pC(n,i-1,j+1)+(1-p)C(n,i-1,j)), Su^j d^{i-j}-K] \quad (3)$$

wherein R represents the normalized interest rate, wherein $$R = e^{-rT/n} \quad (4)$$

and wherein:

$$p = \frac{(e^{(r-\delta)T/n} - d)}{(u-d)} \quad (5)$$

The computation of C(n,i,j) is performed for j=0, 1, . . . , n−i, and then the computation moves on to time step n−i−1. The computation is initialized at time step n by noting that, at the expiration of the option, the payoff at node j at time step n is max(0, $u^j d^{n-j}$S−K). This then should be the price of the option at that node so that riskless profitable arbitrage is not possible. Thus, at time step n, the computations are initialized as follows:

$$C(n,0,j)=\max(0, u^j d^{n-j}S-K), \text{ for } j=0,1, \ldots, n \quad (6)$$

It should be noted that formulas other than formula (3) for C(n,i,j) can be used in the practice of this embodiment of the present invention, as would be understood by those having ordinary skill in the art upon review of the teachings herein.

It should also be noted that formula 3 is directed toward the theoretical fair market price of call options. For put options, the theoretical fair market price can be computed as $$C(n,i,j)=\max[R(pC(n,i-1,j+1)+(1-p)C(n,i-1,j)), K-Su^j d^{i-j}] \quad (3a)$$

which initializes at time step n as follows:

$$C(n,i,j)=\max(0, K-u^j d^{n-j}S), \text{ for } j=0,1, \ldots, n \quad (6a)$$

Further still, it should be noted that formulas 3 and 3a can be used to compute the theoretical fair market prices for both American and European options.

Figure 5A:
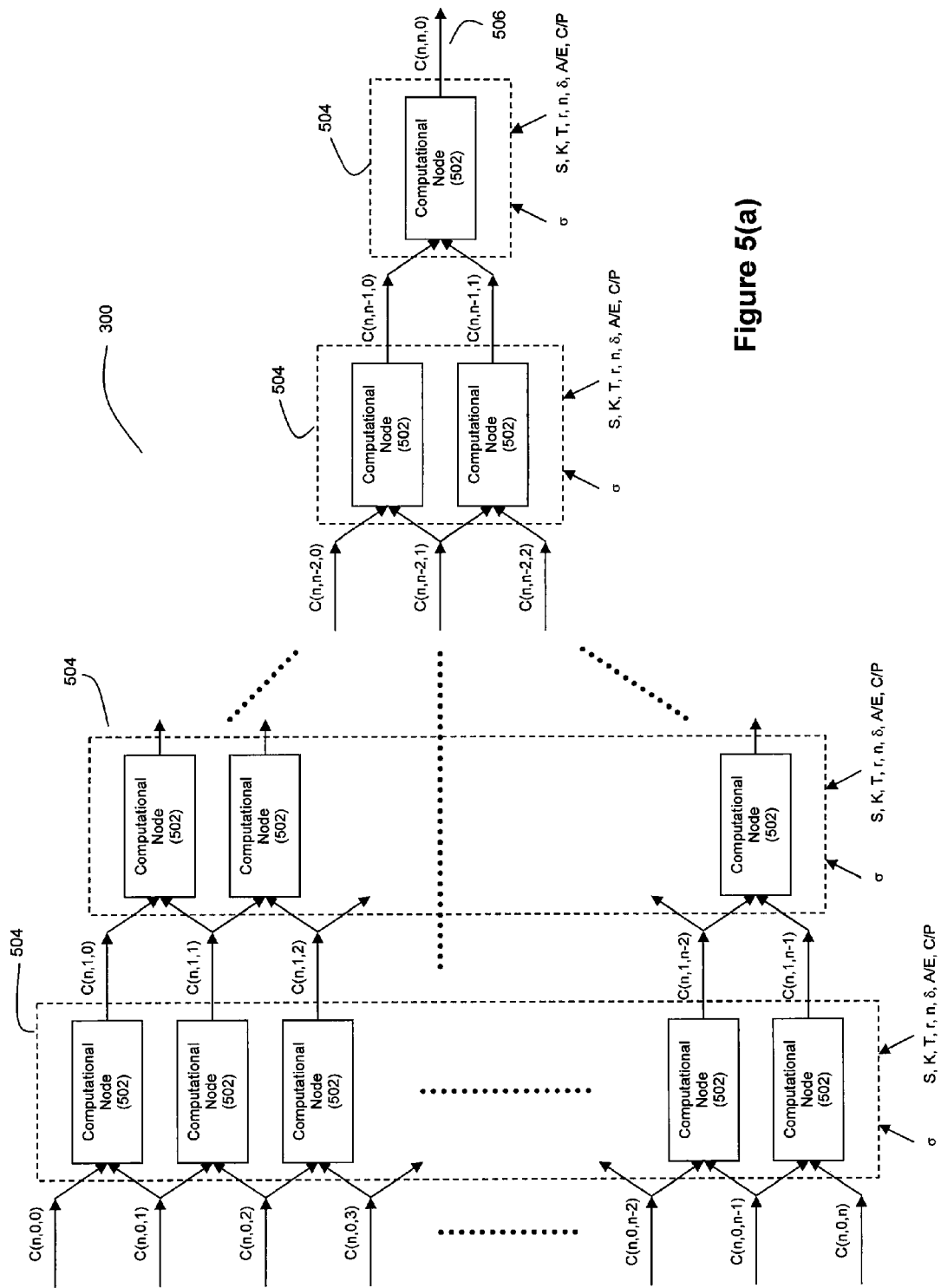
FIG. 5(a) depicts an exemplary embodiment of a computational binomial tree for computing a theoretical fair market option price based on the CRR option pricing model.

Preferably the computations for C(n,i,j) are implemented in a parallel pipeline architecture, as shown in FIG. 5(a). FIG. 5(a) depicts an exploded view of the OPM computational unit 300 of FIG. 3. OPM computational unit 300 can be realized via a plurality of pipeline stages 504, wherein each pipeline stage 504 comprises at least one computational node 502. Each pipeline stage is configured to perform the C(n,i,j) computations for a given time step. The computational nodes 502 in the first pipeline stage 504 are preferably initialized with the C(n,0,j) values as determined by formula (6) for call options and by formula (6a) for put options. Each computational node 502 also preferably receives as inputs the parameters σ, S, K, T, r, n, δ as well as the value of the C/P flag that identifies whether the pertinent option is a call or a put. Each computational node 502 is configured to perform the computation defined by formula (3) for C(n,i,j) if the option is a call option and the computation defined by formula (3a) for C(n,i,j) if the option is a put option, as defined by the option's C/P flag. In a reconfigurable logic implementation of computational node 252, each node 252 can include parallel computational paths—one path for formula (3) and the other path for formula (3a), wherein control logic can be deployed to route pertinent input values to the appropriate computational path based on the option's call/put status. As such, each computed value for C(n,i,j) is fed to two downstream computational nodes 502 in the next pipeline stage 504 for use in the computation defined by formulas (3) and (3a).

The parallel pipelined nature of the computations performed by the OPM computational unit 300 of FIG. 5(a) significantly accelerates the option pricing computations relative to conventional designs. Assume that it takes $f_l$ clock cycles to perform the computations at each leaf node 410 of the binomial tree 400 and $f_i$ clock cycles to perform the computations at each internal node, including the root. For a tree 400 of depth n, there are n+1 leaf nodes 410 and n(n+1)/2 internal nodes (including the root). The total number of clock cycles to compute the option price on a sequential machine would be $(n+1)f_j+0.5n(n+1)f_i$. On the other hand, using a parallel architecture such as that shown in FIG. 5(a), all of the computations at each time step can be performed concurrently; thus reducing the number of clock cycles to $(n+1)f_j+nf_i$. The complexity for the parallel pipelined architecture then becomes linear in the depth of the tree, as opposed to being quadratic in the depth of the tree as it is for a sequential machine. This aspect of the FIG. 5(a) embodiment provides practitioners of the present invention with improved flexibility when designing and using an option pricing engine. A practitioner can use larger values of n relative to what he/she could use in a sequential machine for more accurate option price modeling without sacrificing latency, or a practitioner can price an option at much higher speeds, i.e., achieve a higher throughput, by using the same or similar values for n that he/she would have used for a sequential machine.

Figure 5B:
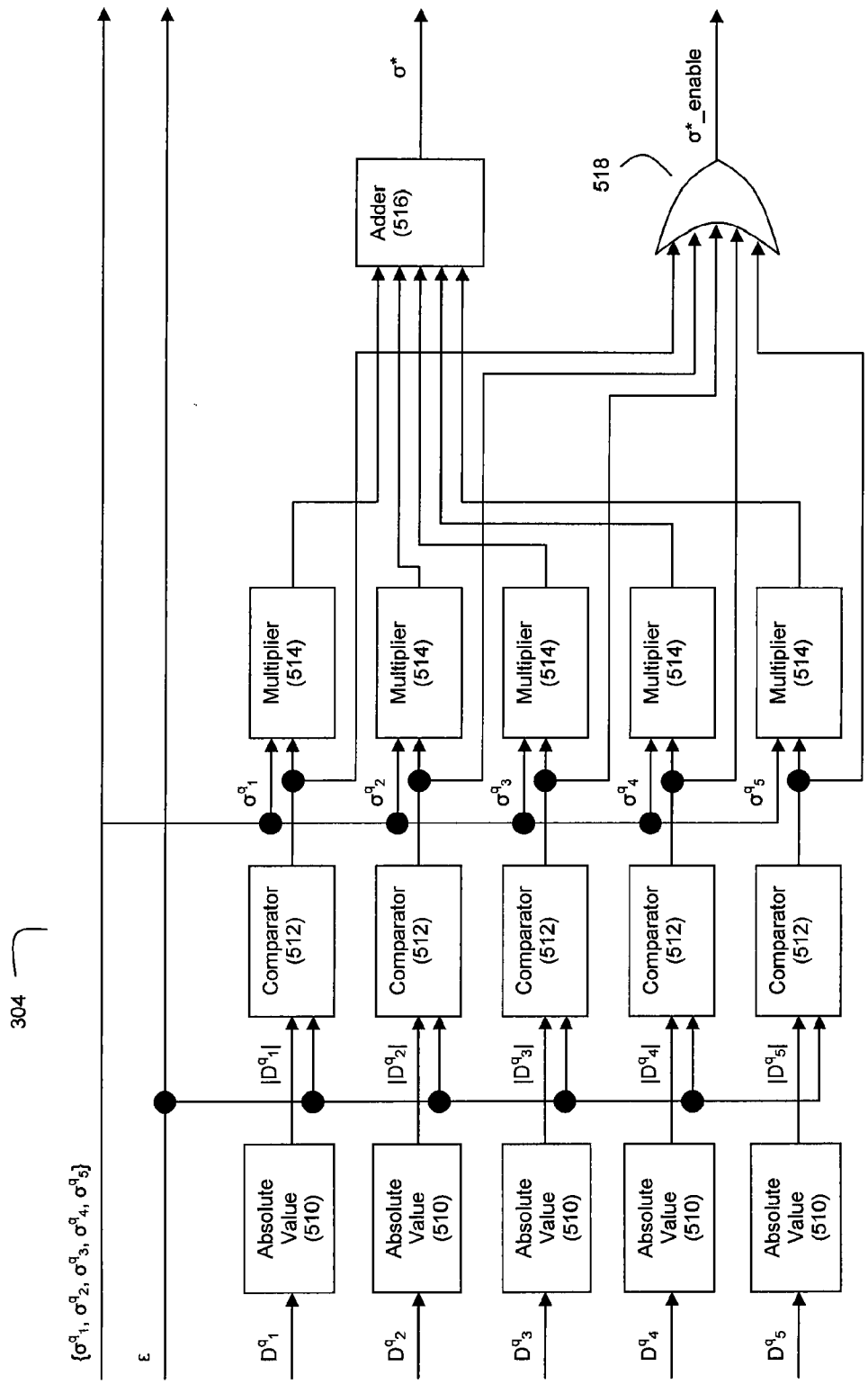
FIGS. 5(b)-(d) depict an exemplary embodiment of combinatorial logic stage for computing a theoretical fair market option price based on the CRR option pricing model.
Figure 5C:
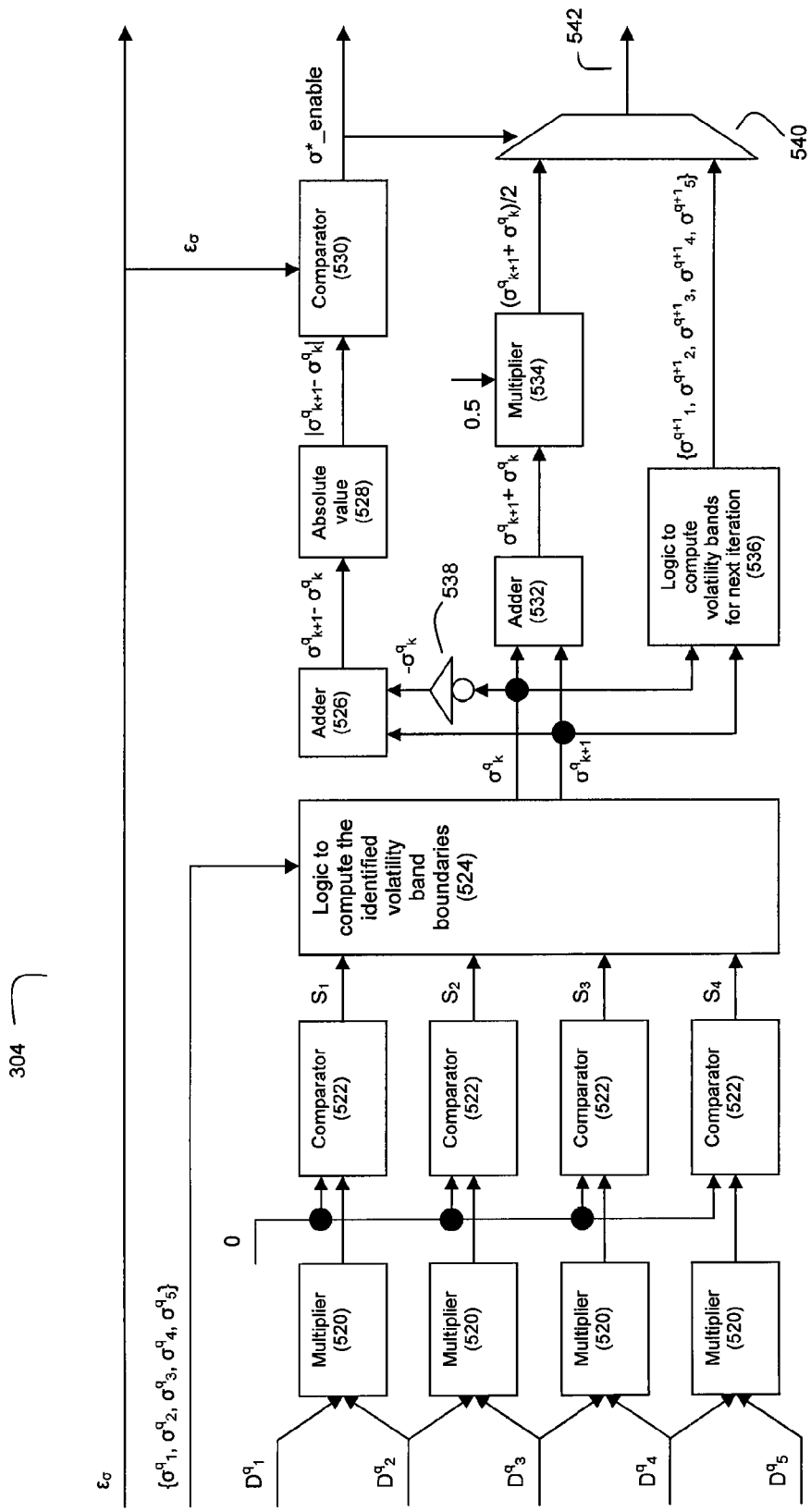
Figure 5D:
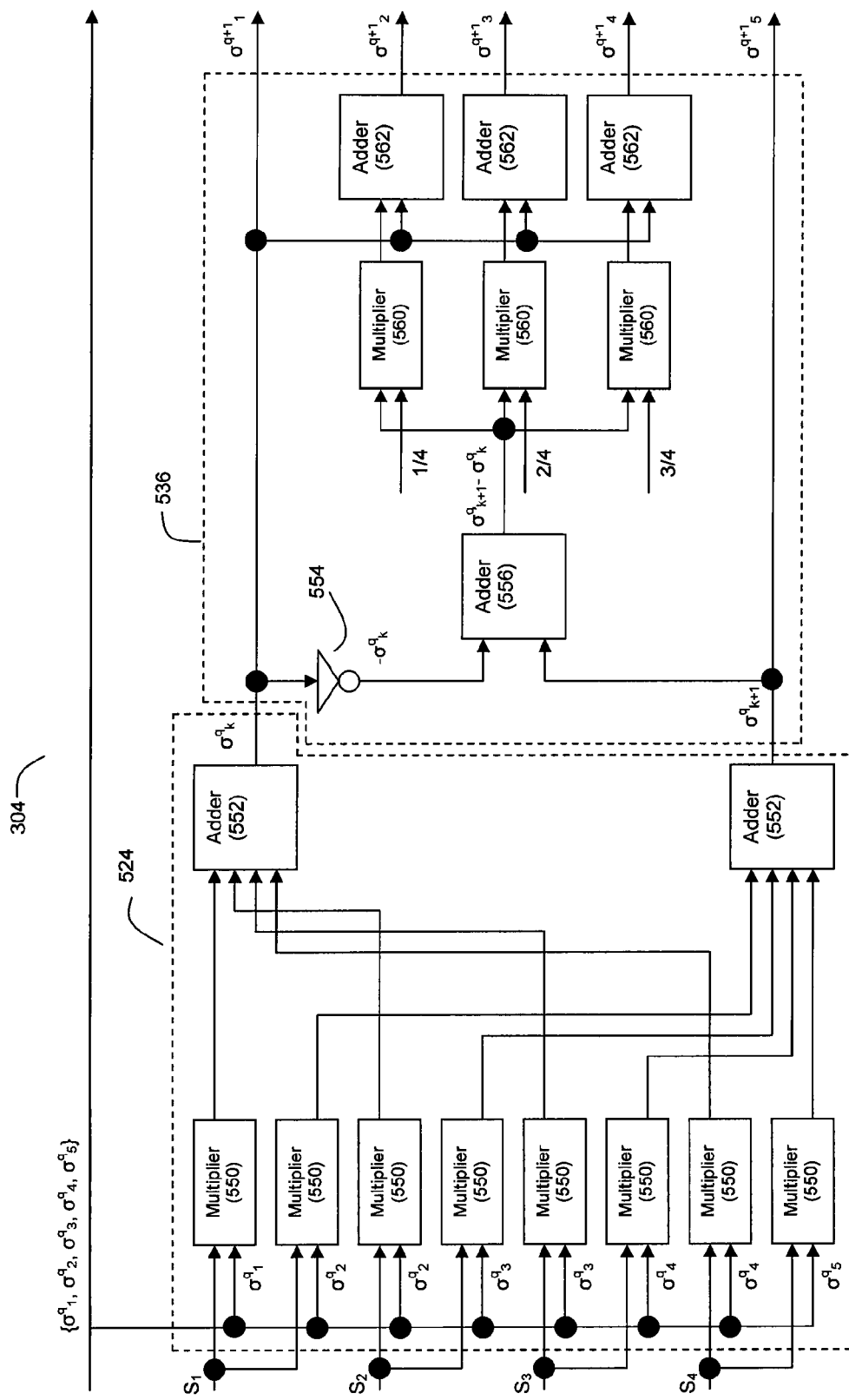

FIGS. 5(b)-(d) depict an exemplary embodiment for the combinatorial logic stage 304 of FIG. 3. FIG. 5(b) depicts a portion of stage 304 that is configured to perform steps 210 and 212 from FIG. 2(a). As shown in FIG. 5(b), m+1 parallel absolute value units 510 operate to find the absolute values of each input value for D. The computed absolute values $|D^q_i|$ are then fed to the m+1 parallel comparators 512, whereat each value of $|D^q_i|$ is compared with the theoretical fair market price convergence property $\epsilon$. It should be noted that the comparators 512 are preferably be configured to output a value of 1 if $|D^q_i|$ satisfies the fair market price convergence property and output a value of 0 otherwise. If one of the differences $|D^q_i|$ satisfies the $\epsilon$ condition, then the corresponding multiplier 514 will multiply a value of 1 times $\sigma^q_i$ to produce the implied volatility value $\sigma^*$, which in turn is summed by adder 516 with the other 0 values produced by the other multipliers. The OR gate 518 will operate to set the $\sigma^*$_enable signal high by detecting when one of the multipliers 514 produces an output of 1. Multipliers 514, adder 516, and OR gate 518 thus operate to output appropriate values of $\sigma^*$ and $\sigma^*$_enable.

FIG. 5(c) depicts a portion of stage 304 that is configured to perform steps 214, 216, 218, 220, 222 and 204 from FIG. 2(a). A plurality m of parallel multipliers 520 operate to multiply each successive difference $D^q_i$ and $D^q_{i+1}$ with each other. Only one of these multiplication products will be negative because there will only be one volatility band where the option's actual purchase price is greater than the theoretical fair market price at one volatility band boundary and less than the theoretical fair market price at the other volatility boundary for that band. Comparators 522 then operate to identify which of the multipliers 520 produces a negative product. Preferably, the output $S_i$ of each comparator 522 is configured to go high only if the input product $D^q_i*D^q_{i+1}$ is negative. A logic stage 524 then operates to compute the boundary values $\sigma^q_k$ and $\sigma^q_{k+1}$ of the volatility band within which the implied volatility resides. Adder 526, absolute value operator 528 and comparator 530 operate to test the identified volatility band defined by $\sigma^q_k$ and $\sigma^q_{k+1}$ against the volatility convergence property $\epsilon_\sigma$. If the volatility convergence property is satisfied, then comparator 530 asserts $\sigma^*$_enable. Adder 532 and multiplier 534 operate to average the identified volatility band boundaries together; this average serves as the implied volatility if the volatility convergence property is satisfied. A logic stage 536 operates to compute the volatility boundary values $\sigma^{q+1}_1, \sigma^{q+1}_2, \ldots \sigma^{q+1}_m$ for the next iteration. Depending on whether the volatility convergence property is satisfied, multiplexer 542 passes either the implied volatility or next iteration volatility values as output 542. It should be noted that in the final iteration module 252 in pipeline 250, the combinatorial logic stage 304 need not include logic 536 or multiplexer 540 since there will not be a need to compute a next iteration's volatility values. Similarly, the combinatorial logic stage 304 of the final iteration module 252 in pipeline need not test the identified volatility band boundaries against the volatility convergence property.

It should also be noted that the combinatorial logic stage 304 can include control logic to reconcile situations where both the theoretical fair market price convergence property defined by E and the volatility convergence property defined by $\epsilon_\sigma$ are met. In such instances, appropriate control logic can be included to pass the desired implied volatility as an output. If it is preferred that the implied volatility as determined by $\epsilon$ be used, then the control logic can be configured to pass the $\sigma^*$ value identified at step 212 as the output. If it is preferred that the implied volatility as determined by $\epsilon_\sigma$ be used, then the control logic can be configured to pass the $\sigma^*$ value identified at step 222 as the output. Alternatively, the control logic can be configured to pass the average of the two $\sigma^*$ values identified at steps 212 and 222 as the output. Further still, the control logic can be configured to pass one of the $\sigma^*$ values as an output based on which tolerance ($\epsilon$ or $\epsilon_\sigma$) satisfies one or more conditions.

FIG. 5(d) depicts the logic stages 524 and 536 in greater detail. Within logic stage 524, a plurality 2m of multipliers 550 operate to multiply each $S_i$ value by $\sigma^q_i$ and $\sigma^q_{i+1}$. The output of adders 552 will be the identified volatility band boundary values $\sigma^q_k$ and $\sigma^q_{k+1}$. Within logic stage 536, an inverter 554 and adder 556 operate to generate the sum $\sigma^q_k - \sigma^q_{k+1}$, which represents the width of the identified volatility band. Multipliers 560 operate to divide this bandwidth into m subbands of equal width, and adders 562 compute the resultant intermediate volatility values for the identified band to be used during the next iteration. It should be noted that logic stage 536 need not include a separate inverter 554 and adder 556; if desired, stage 536 can tap into the output of adder 526 shown in FIG. 5(c).

Thus, by determining an option's implied volatility via the parallelized pipelined architecture shown in FIGS. 2(b), 3 and 5(a)-(d), significant enhancements to latency and throughput can be provided, thereby providing practitioners of the present invention with an important competitive advantage in the financial marketplace.

It should be noted that the iterative banded m-ary search disclosed herein in connection with FIGS. 1(a)-5 has been described in the context of an option's theoretical fair market price that is a monotonically increasing function of the option's volatility. The inventors further note that the iterative banded m-ary search for a particular parameter of interest related to a financial instrument can be performed in connection with other plots where a first parameter related to a financial instrument is a monotonically increasing (or monotonically decreasing) function of a second parameter related to the financial instrument. Further still, the inventors note that the first financial parameter can also be a monotonically strictly increasing or a monotonically strictly decreasing function of the second financial parameter. As used herein, monotonically decreasing refers to a function wherein the first derivative thereof is always a non-positive number, monotonically strictly increasing refers to a function wherein the first derivative thereof is always a number greater than zero, and monotonically strictly decreasing refers to a function wherein the first derivative thereof is always a number less than zero.

In accordance with another embodiment of the present invention, it is desired to efficiently compute an option's theoretical fair market price. As previously noted, the quick computation of fair market prices for options is a high priority problem for traders, particularly for traders who perform trades using black box trading algorithms. If a trader or a trader's black box algorithm can detect a difference in the offered price P of an option and that option's theoretical fair market price (according to some option pricing model), then a trading opportunity may exist for that trader.

Figure 6A:
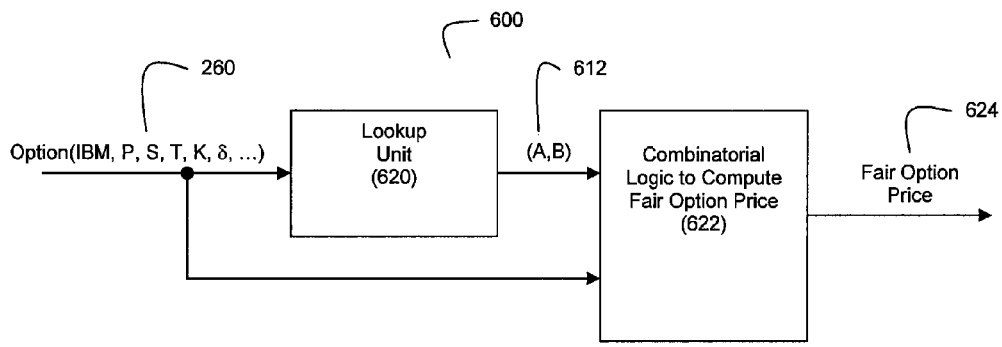
FIGS. 6(a) and (b) depict an exemplary technique for computing a European option's fair market price using lookup tables.

FIG. 6(a) illustrates an exemplary architecture for low latency computation of a theoretical fair market price 624 from an option message input 600. In the example of FIG. 6(a), it will be assumed that the option message pertains to a European call option, and it will further be assumed that the option pricing model employed by the architecture of FIG. 6(a) to compute a theoretical fair market price for the European call option according to the CRR model is as follows:

$$P^{th} = \sum_{j=0}^{n} p^j q^{n-j} b_j \max[Su^j d^{n-j} - K, 0] \qquad (7)$$

However, it should be noted that option pricing models other than formula (7) could be employed in the practice of this embodiment of the present invention.

With formula (7), the binomial coefficient, $b_j$, denotes the number of occurrences of j up states in n time steps, wherein:

$$b_j = \binom{n}{j} = \frac{n!}{j!(n-j)!} \qquad (8)$$

The variables u and d are the incremental up and down factors for the financial instrument price S for each time step as described by formulas (1) and (2) above. The variables p and q are interval prices for up states and down states, respectively, wherein:

$$p = \frac{R-d}{R(u-d)} \qquad (9)$$

$$q = \frac{1}{R} - p \qquad (10)$$

The variable R is the normalized interest rate, wherein:

$$R = e^{\frac{r \times T}{n}} \qquad (11)$$

If one examines each term in the summation of the binomial pricing model of formula (7), it is observed that the up/down factors (u,d) and the up/down state prices (p,q) are solely dependent on the number of time steps n, the risk-free interest rate r, and the volatility σ. Next, for purposes of this example, one makes the following assumptions: (1) an assumption (following from the Black-Scholes model) that the risk-free interest rate is constant over the life of the option, which helps simplify the options pricing algorithm, (2) an assumption that the number of time steps n in the model is the same for all financial instruments, which ensures that the computational complexity (and thus the latency) is constant for pricing different options, and (3) an assumption that the options share the same maturity dates. As such, one will assume that 3 month call options will mature on the same day, regardless of the underlying financial instrument. While not all options that share the same duration will share the same maturity date, one can further assume that the number of future maturity dates will be reasonably small (on the order of 10). This assumption is a reasonable one for European options since they can only be exercised at maturity; thus options maturing in a particular month will have very similar time to maturities, provided they all had a similar start date.

With the architecture 600 shown in FIGS. 6(a) and (b), the values of $p^j q^{j-n} b_j$ and $u^j d^{n-j}$ are precomputed for all values of j and stored in a lookup table 610 that is indexed by volatility σ and by time to maturity T. Thus, A(σ,T) will represent the array of n+1 values of $p^j q^{j-n} b_j$ for 0≤j≤n and for T, and B(σ,T) will represent the array of n+1 values of $u^j d^{n-j}$ for 0≤j≤n and for T. As such, formula (7) above can be represented as:

$$P^{th} = \sum_{j=0}^{n} A_j \max[SB_j - K, 0] \qquad (12)$$

While formulas (7) and (12) operate to determine a theoretical fair market price for a European call options, it should be noted that this the formula for computing the theoretical fair market price of a European put option can be expressed as:

$$P^{th} = \sum_{j=0}^{n} p^j q^{n-j} b_j \max[K - Su^j d^{n-j}, 0] \qquad (13)$$

which in turn reduces to:

$$P^{th} = \sum_{j=0}^{n} A_j \max[K - SB_j, 0] \qquad (14)$$

With the arrangements of both formulas (12) and (14), each entry 616 in table 610 will contain a pair 612 represented by (A(σ,T), B(σ,T)). The lookup table 610 of pairs 612 can be computed at scheduled intervals, for example nightly or on a more frequent basis, such as once every two seconds (helping increase the accuracy of the model in the event of changes in parameters such as the risk-free interest rate) throughout the trading day or other time intervals. The architecture can also be configured to update the lookup table entries in response to a trigger, such as a change in the risk-free interest rate during the trading day.

Figure 6B:
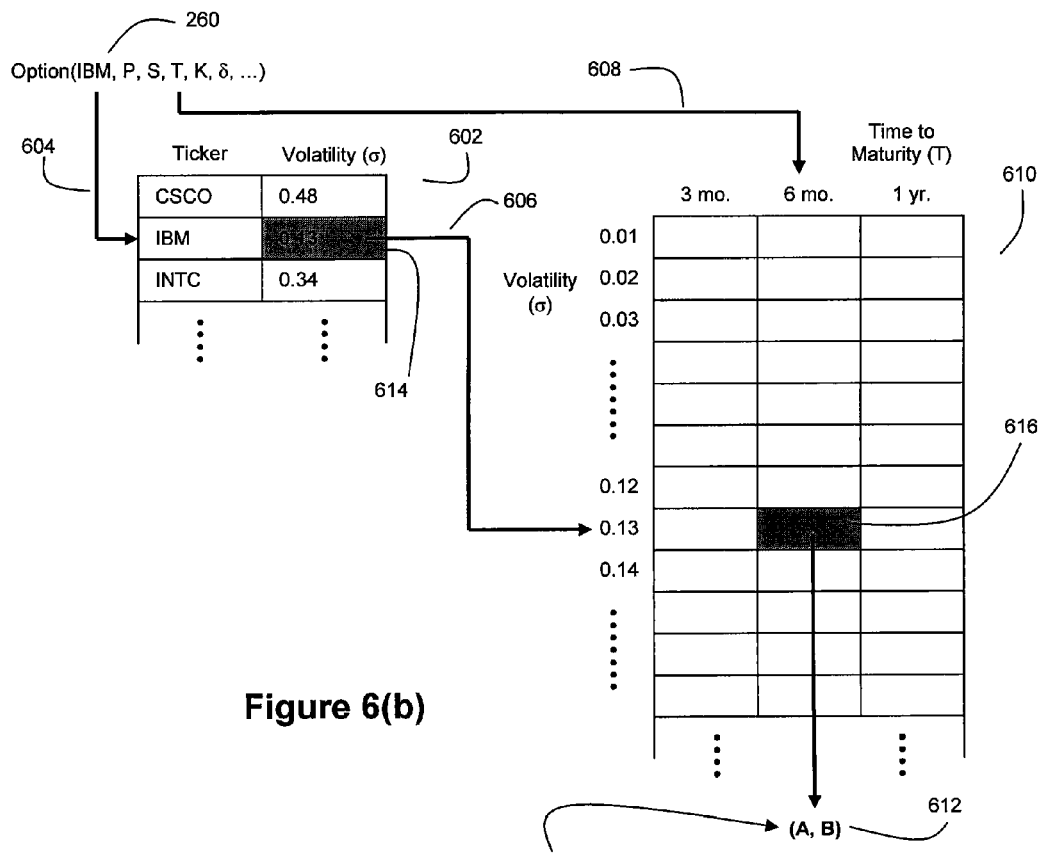
FIG. 6(c) depicts an exemplary embodiment of the combinatorial logic stage of FIG. 6(a)

Thus, with reference to FIGS. 6(a) and (b), given an option message 260, a lookup unit 620 preferably operates to parse the message 260 to ascertain the identity of the underlying financial instrument (from field 262 of the option message) and the time to maturity parameter therein (from field 268). A lookup table 602 accessible to unit 620 stores volatility values for various financial instruments. As shown by FIG. 6(b), lookup table 602 is preferably indexed by financial instrument such that the lookup unit 620 can retrieve the volatility measure 614 pertinent to option message 260 via a financial instrument index 604. The table 602 of volatility values can be computed on either a continuous basis, at scheduled intervals (e.g., nightly, hourly, etc.), and/or on a triggered basis. The volatility values in table 602 could be determined in a number of ways—they can be the underlying financial instruments' historical volatilities computed using historical volatility values for the underlying financial instrument or they can be previously-determined implied volatilities for the underlying financial instrument.

Upon retrieval of the volatility value from lookup table 602, lookup unit 620 then preferably accesses the lookup table 610 using volatility index 606 and time to maturity index 608 taken from message 260. Indices 606 and 608 identify an entry 616 within table 610 that contains an (A,B) pair 612. Lookup unit 620 then retrieves the identified (A,B) pair 612 and passes those values to a combinatorial logic stage 622 to compute the fair market option price 624 for the option message 260.

Figure 6C:
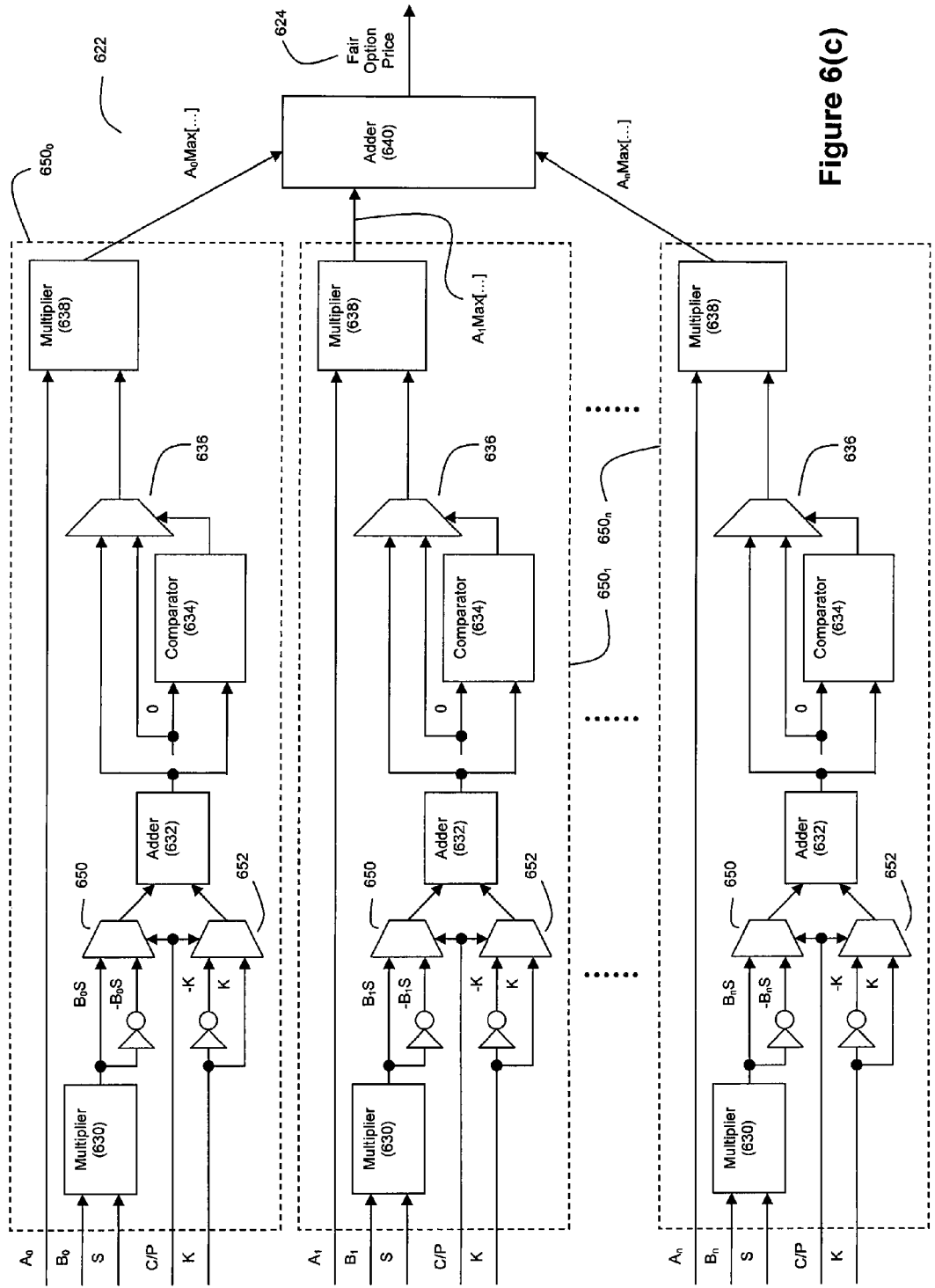

FIG. 6(c) illustrates an exemplary combinatorial logic stage 622 for realizing formulas (12) and (14) above. Preferably, combinatorial logic stage 622 utilizes a plurality n+1 of parallel computational pipelines $650_0$, $650_1$, . . . $650_n$. Each pipeline $650_j$ is fed by the following input parameters: $A_j$, $B_j$, S, K and the call/put flag C/P. The C/P flag controls whether formula (12) or formula (14) applies to the computation via multiplexers 650 and 652. To create the $B_jS$ term of formulas (12) and (14), multiplier 630 operates to multiply $B_j$ by S. To create the $B_jS$-K term of formula (12), adder 632 preferably adds an inverted K value to the $B_jS$ term. To create the K-$B_jS$ term of formula (14), adder 632 preferably adds the K value to an inverted value of the $B_jS$ term. Multiplexers 650 and 652 control which terms reach the adder 632 based on the value of the C/P flag. Next, comparator 634 and multiplexer 636 operate to perform the maximum operation between the terms $B_jS$-K and 0 for call options and the terms K-$B_jS$ and 0 for put options, wherein the maximum of these two values is fed to multiplier 638, whereat the maximum value passed by multiplexer 636 is multiplied by $A_j$. Thus, each pipeline $650_j$ preferably outputs the value of $A_j$max[$B_jS$-K,0] for call options or the value of $A_j$max[K-$B_jS$,0] for put options to adder 640, to thereby compute the theoretical fair market option price 624.

With the embodiment of FIG. 6(c), the computation of fair market option price 624 preferably utilizes 2(n+1) 32-bit floating point multiplications, (n+1) 32-bit floating point subtractions, (n+1) maximum computations, and n 32-bit floating point additions; a total of approximately 5n floating-point operations. For a software embodiment, if one assumes that each operation requires 5 cycles of a 2 GHz processor, then each operation requires 2.5 ns. If one further assumes that 255 time steps are sufficient to approximate the lognormal distribution, then a fair market option price 624 can be computed in 3.2 μs. Further assuming no overhead between fair market price calculations, then a single 2 GHz processor should be able to make 312,500 fair market option price calculations per second.

Turning to the amount of memory required for the tables 602 and 610, it is preferred that each element of the arrays A and B be represented as a 32-bit single-precision floating point number. Continuing with the assumption that n=255 is sufficient, then each entry 616 in table 610 will store 256 32-bit values for a total of 8192 bits or 1024 bytes.

If one also assumes that three significant digits are sufficient to accurately represent the volatility values, this will result in the volatility of any underlying financial instrument assuming one of 1000 possible values. If one further assumes that there are 10 possible maturity dates for all currently traded options (although other numbers of possible maturity dates could be used), then table 610 will contain 1000×10 entries, which results in a total table size of 102 Mbytes. It is expected that the size of the volatility table 602 will be on the order of 10 kbytes. These table sizes suggest that the lookup tables 602 and 610 can readily be stored in RAM and preferably in a high speed memory, either processor memory or off-chip memory (for any embodiments employing a hardware co-processor). However, it should also be noted that the lookup table(s) can also be stored in on-chip memory (such as SDRAM on an FPGA chip) if the available memory resources on the chip are sufficient.

As for the regularity with which the lookup tables are computed, it is believed that any of a variety of schemes could be employed depending upon the needs and desires of a practitioner of this embodiment of the invention. For example, in some situations, it may be sufficient to re-compute the tables prior to the beginning of each trading day, particularly if one assumes that the time to maturity of the option can be measured in days and the risk-free interest rate will not change significantly throughout the trading day.

If a more frequent updating of the lookup tables is desired, then it is helpful to estimate the rate at which the tables can be recomputed. In order to compute the entries in table 610, one must first compute the parameters u, d, p and q. It will be assumed that the value of 1/n will be constant. It will further be assumed that the volatility σ and the risk-free interest rate r can vary. Computation of u requires a floating point square root operation, multiplication operation and exponential operation. Once u is known, the value of d can be found by a single floating point divide operation. Computation of p requires a floating point divide operation, a multiplication operation and two subtraction operations. Once p is known, the value of q can be found via a single floating point subtraction operation. The inventors herein estimate that the computation of the u, d, p and q terms can be performed in approximately 200 cycles. If one maximizes the use of intermediate results by using the fully partitioned binomial tree technique exemplified in FIG. 10, then a forward pass through the binomial tree requires $n\lceil \log_2 n \rceil$ multiplication operations. Since two passes are required (once for the array of price factors and once for the array of probabilities), then $2n\lceil \log_2 n \rceil$ multiplication operations would be needed. Using the same assumptions mentioned above (n=256 with 2.5 ns required for each multiplication operation), the computation of a lookup table 610 with 1000×100 entries would require approximately 1.024 seconds. Accordingly, if a second processor with access to the same system memory is available for continually updating the tables, the inventors herein believe that the table 610 can be re-computed approximately every 2 seconds.

An alternative to the exemplary embodiment of FIGS. 6(a)-(c) for computing an option's theoretical fair market price is to directly compute the binomial tree used in the fair market price computation (rather than using a lookup table for the terms related to u, d, p and q).

One approach to such direct computation can utilize the architecture of FIG. 5(a). With such a direct computation embodiment, the volatility value used in the theoretical fair market price computation will need to be passed to the OPM computational unit 300, either from a lookup table of volatility values as shown in connection with FIG. 6(b) or otherwise.

Figure 7:
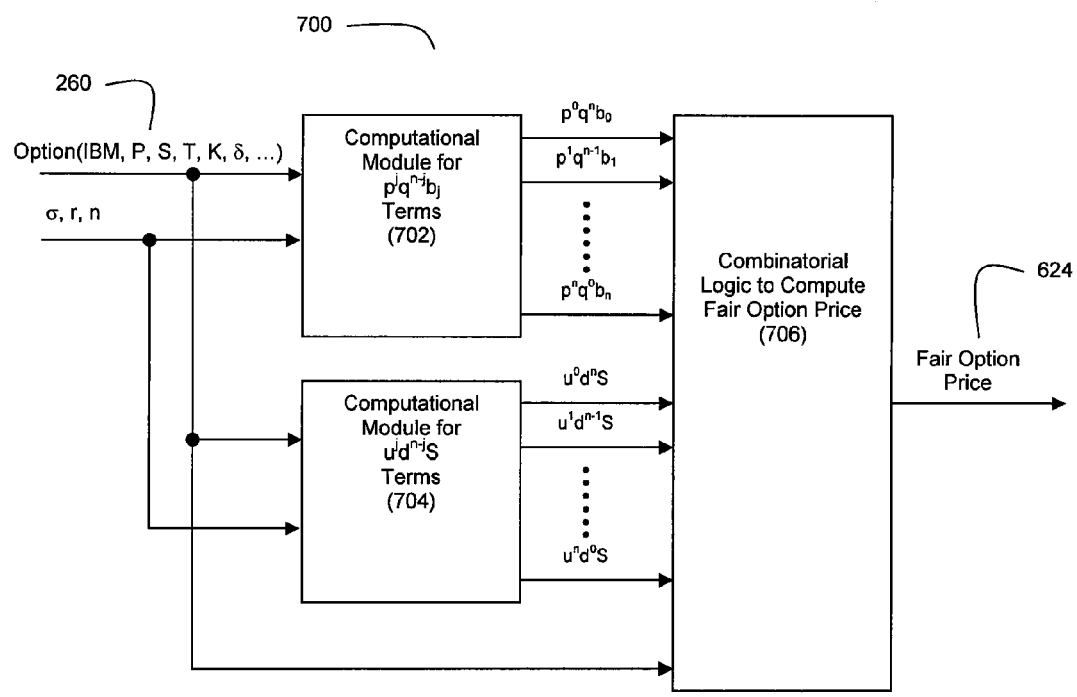
FIG. 7 depicts an exemplary embodiment for directly computing an option's fair market price.

FIG. 7 illustrates an exemplary architecture for another approach to the direct computation of a binomial tree for pricing an option. Once again, this example will be described in connection with a European call option, although it should be understood that other option types can readily be employed in the practice of this embodiment of the invention. As explained herein, the architecture of FIG. 7 seeks to take advantage of parallelism to accelerate the fair market price computation. With the architecture of FIG. 7, option message 260 is fed into two parallel computational modules 702 and 704. Computational modules 702 and 704 are configured to receive the option characteristics data from message 260 and other pricing parameters, namely σ, r and n so that it can perform the computations necessary for formulas (1), (2), and (8)-(11) to enable an ultimate computation in accordance with formula (7). The volatility input value can be determined from a lookup table such as that shown in FIG. 6(b) or otherwise. Computational module 702 is configured to compute the $p^j q^{n-j} b_j$ terms found in formula (7). Computational module 704 is configured to compute the $u^j d^{n-j} S$ terms found in formula (7). Downstream from modules 702 and 704 is a combinatorial logic stage 706 that operates on the outputs of modules 702 and 704 as well as the option message 260 to compute the fair market option price 624.

Figure 8A:
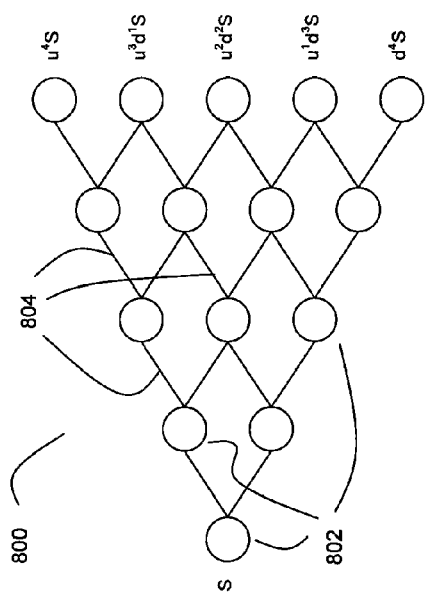
FIGS. 8(a)-(c) depict exemplary embodiments of binomial trees for a CRR option pricing model applied to European options, wherein the depth n of the tree is 4 and the number of operation needed to compute terminal option prices is minimized.

FIG. 8(a) illustrates an exemplary binomial tree representation 800 of the $u^j d^{n-j} S$ terms found in formula (7), wherein n=4. Each edge 804 in the tree 800 represents a multiplication operation, with each node 802 representing one of the $u^j d^{n-j} S$ terms. Due to the simplifying assumption that the up and down factors u and d for the financial instrument price remain constant over the life of the option, the binomial tree 800 creates a lattice where each node 804 has two "parent" edges 804. One can observe that the price at each node 802 is independent of the path traveled to reach that node. One can also observe that the terminal prices are the only prices included in the final weighted sum in formula (7). Therefore, one only needs to compute one path to each terminal price.

Figure 8C:
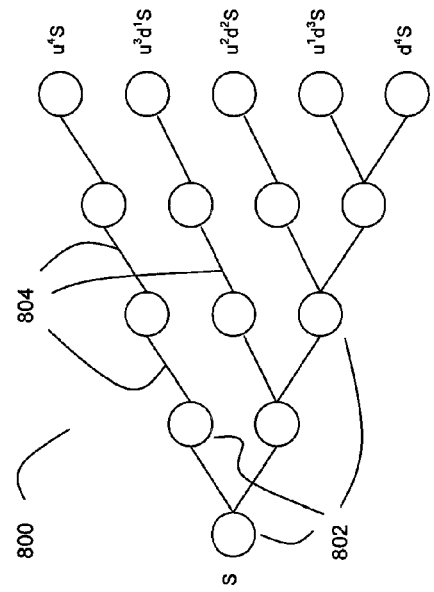
Figure 8B:
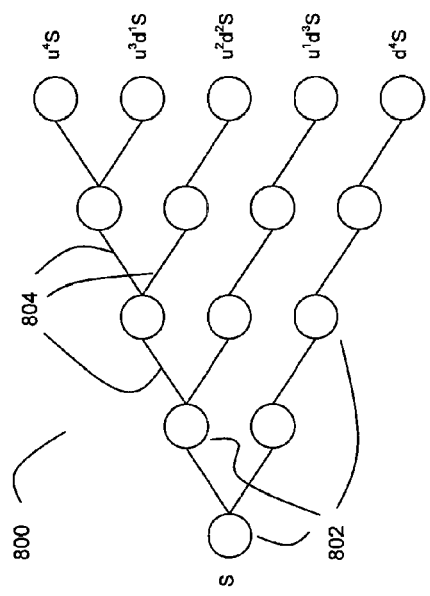
Figure 8D:
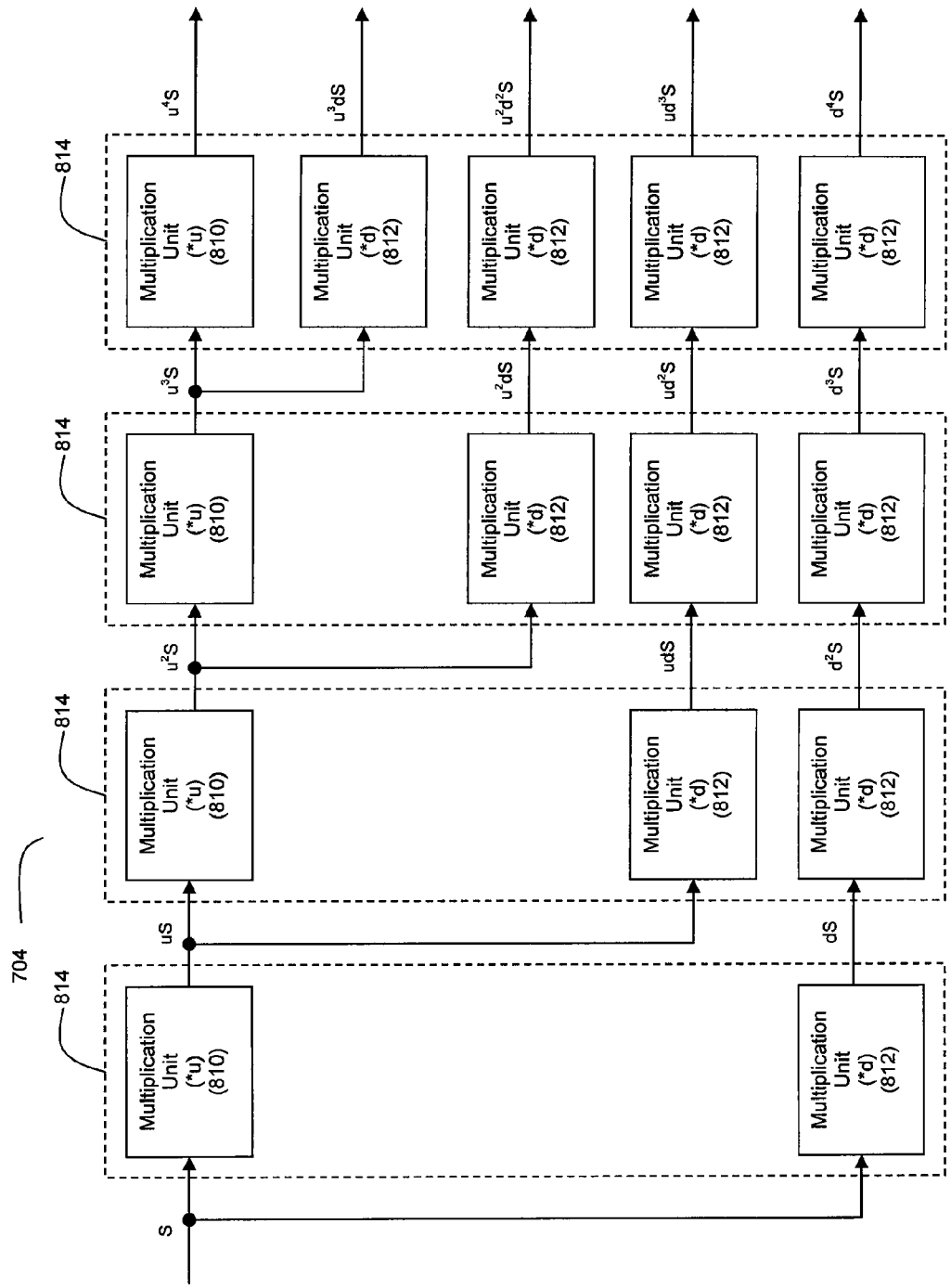
FIG. 8(d) depicts an exemplary embodiment of a computational pipeline for computing an option's fair market price for the binomial tree of FIG. 8(b)

FIG. 8(b) illustrates one technique for computing a single path to each terminal price, wherein this construction is particularly useful when only n+1 parallel multipliers are available. As shown in FIG. 8(d), the tree of FIG. 8(a) can be realized in computational module 704 using a plurality of pipelined stages 814. A first stage 814 is fed by the financial instrument price S and comprises two parallel multiplication units 810 and 812 to compute the terms uS and dS (the multipliers 810 and 812 of module 704 also receive the computed u and d values respectively for performance of the multiplication operations shown in FIG. 8(d)). The second stage 814 comprises three parallel multiplication units (a *u multiplication unit 810 and two *d multiplication units 812) to compute the $u^2 S$, udS, and $d^2 S$ terms. The third stage 814 comprises four parallel multiplication units (a *u multiplication unit 810 and three *d multiplication units 812) to compute the $u^3 S$, $u^2 dS$, $ud^2 S$, and $d^3 S$ terms. The final fourth stage 814 comprises five parallel multiplication units (a *u multiplication unit 810 and four *d multiplication units 812) to compute the terminal terms $u^4 S$, $u^3 dS$, $u^2 d^2 S$, $ud^3 S$, and $d^4 S$ terms. Thus, the computational module 704 of FIG. 8(d) uses a process of "spawning" new iterative multiplication operations using intermediate results until n+1 parallel multipliers in the final stage 814 compute the terminal financial instrument prices in the $n^{th}$ cycle.

Figure 8E:
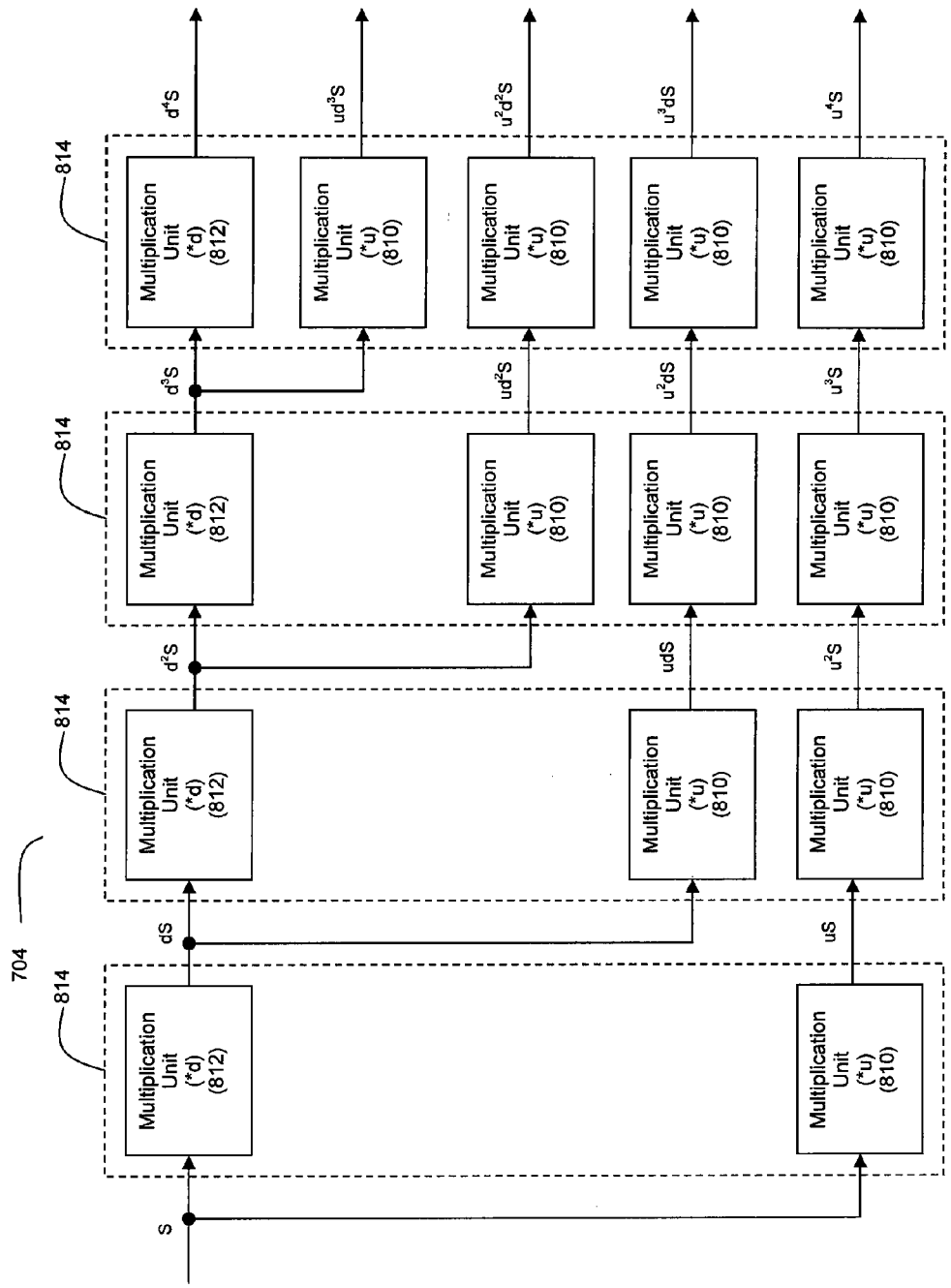
FIG. 8(e) depicts an exemplary embodiment of a computational pipeline for computing an option's fair market price for the binomial tree of FIG. 8(c)

FIGS. 8(c) and 8(e) illustrate an exemplary alternate technique for computing a single path to each terminal price, wherein the terminal price path is different than the path of FIGS. 8(b) and (d) (essentially the roles of multiplication units 810 and 812 have been reversed). Once again, as with the example of FIGS. 8(b) and (d), the example of FIGS. 8(c) and (e) uses a value of n equal to 4.

While the examples of FIGS. 8(a)-(e) have used a value of n=4, it should be understood that a practitioner of this embodiment of the invention can readily use other values of n. It should be noted that a practitioner of the present invention can select a value for n based on the speed and accuracy needs of a trader. Larger values of n will produce a higher degree of accuracy with respect to theoretical fair market price computations, but will increase the time needed to compute the theoretical fair market prices. As such, the value of n can be set and adjusted as needed to tailor the options pricing techniques described herein to the needs of a given application.

Figure 9A:
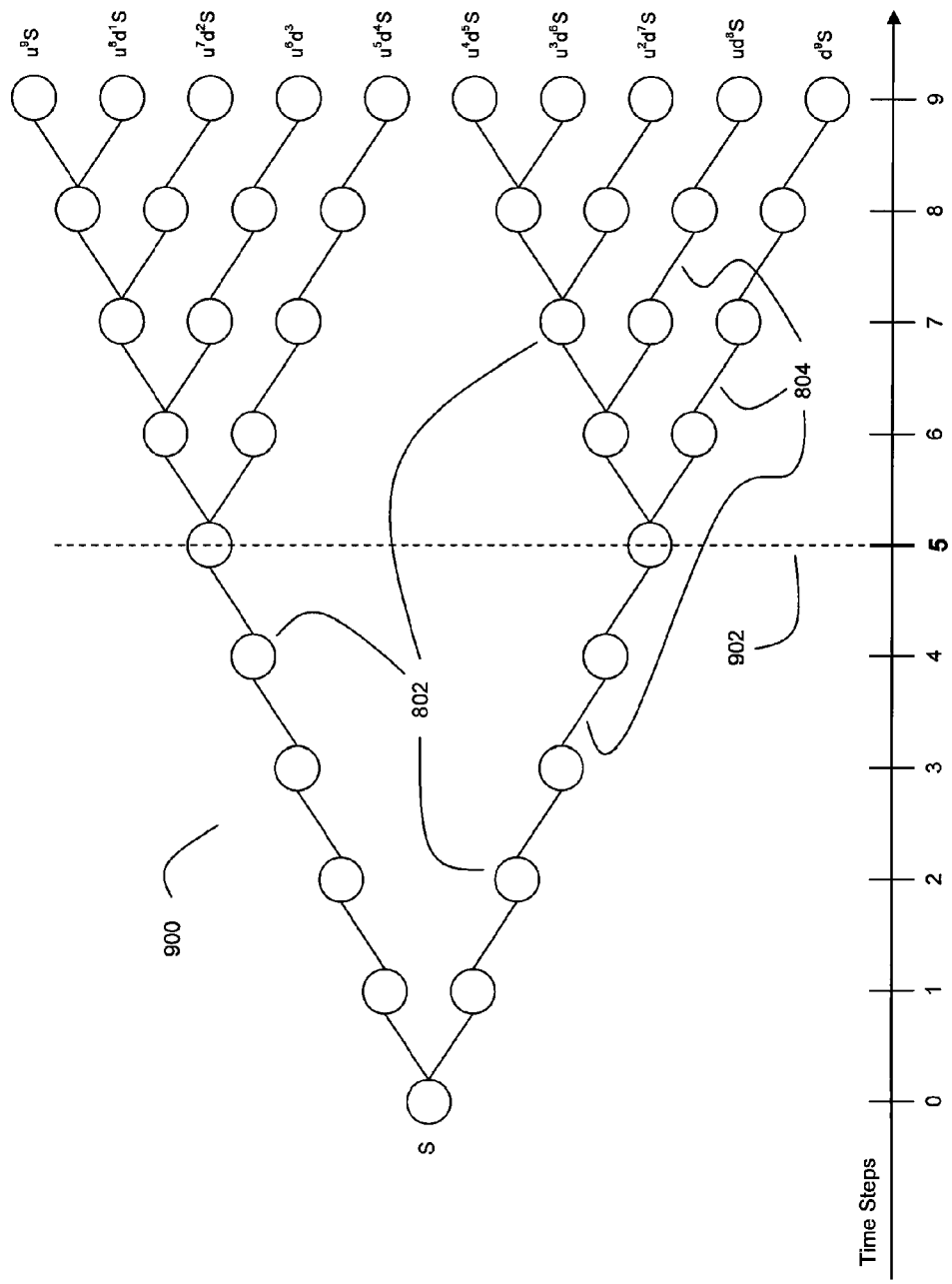
FIG. 9(a) depicts an exemplary embodiment of a binomial tree wherein partitioning is used.
Figure 9B:
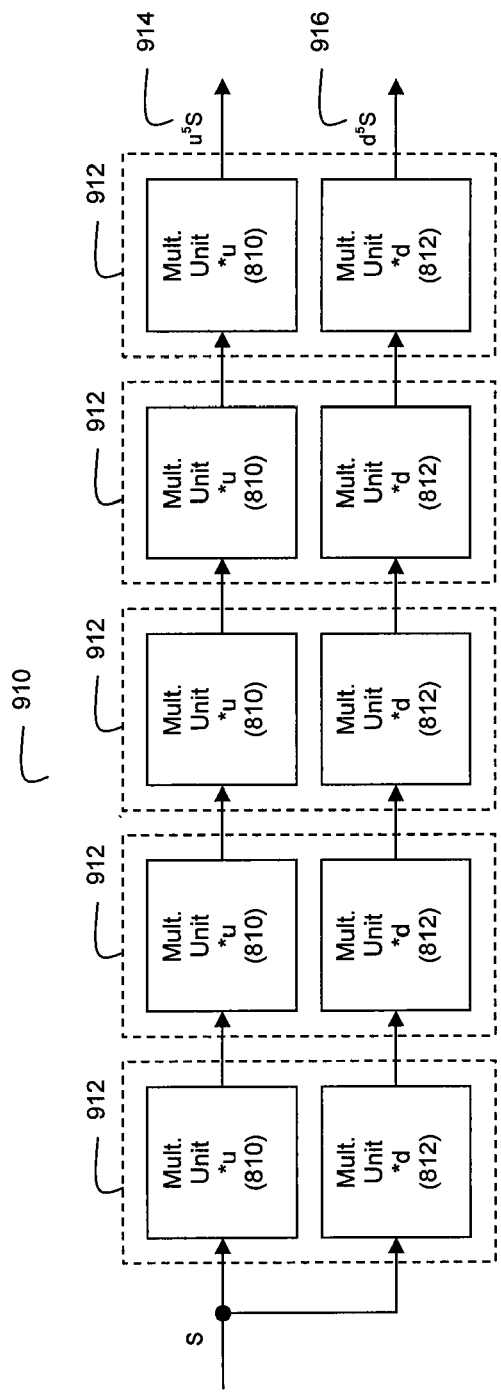
FIGS. 9(b)-(d) depict exemplary embodiments of partitioned computational pipelines for the computation of an option's fair market price for the binomial tree of FIG. 9(a)

If n+1 parallel multipliers are not available, and/or one wishes to balance the computational load of module 704 across superscalar processors and hardware co-processors, one can partition the binomial tree. One can partition any subtree of m steps at step $\lceil m/2 \rceil$. FIG. 9(a) depicts an example of partitioning a binomial tree 900 at step 5. It can be noted that the portion of the binomial tree 900 to the left of partition 902 requires only two paths to compute the terminal prices for the left half of tree 900. These left half computations can be performed sequentially or by parallel processors/threads. FIG. 9(b) illustrates an example of a module 910 for computing the terminal prices of the left subtree using parallel multipliers. As shown in FIG. 9(b), five pipelined stages 912 of two parallel multiplication units 810 and 812 can be used to compute the terminal $u^5 S$ and $d^5 S$ terms 914 and 916.

Figure 9C:
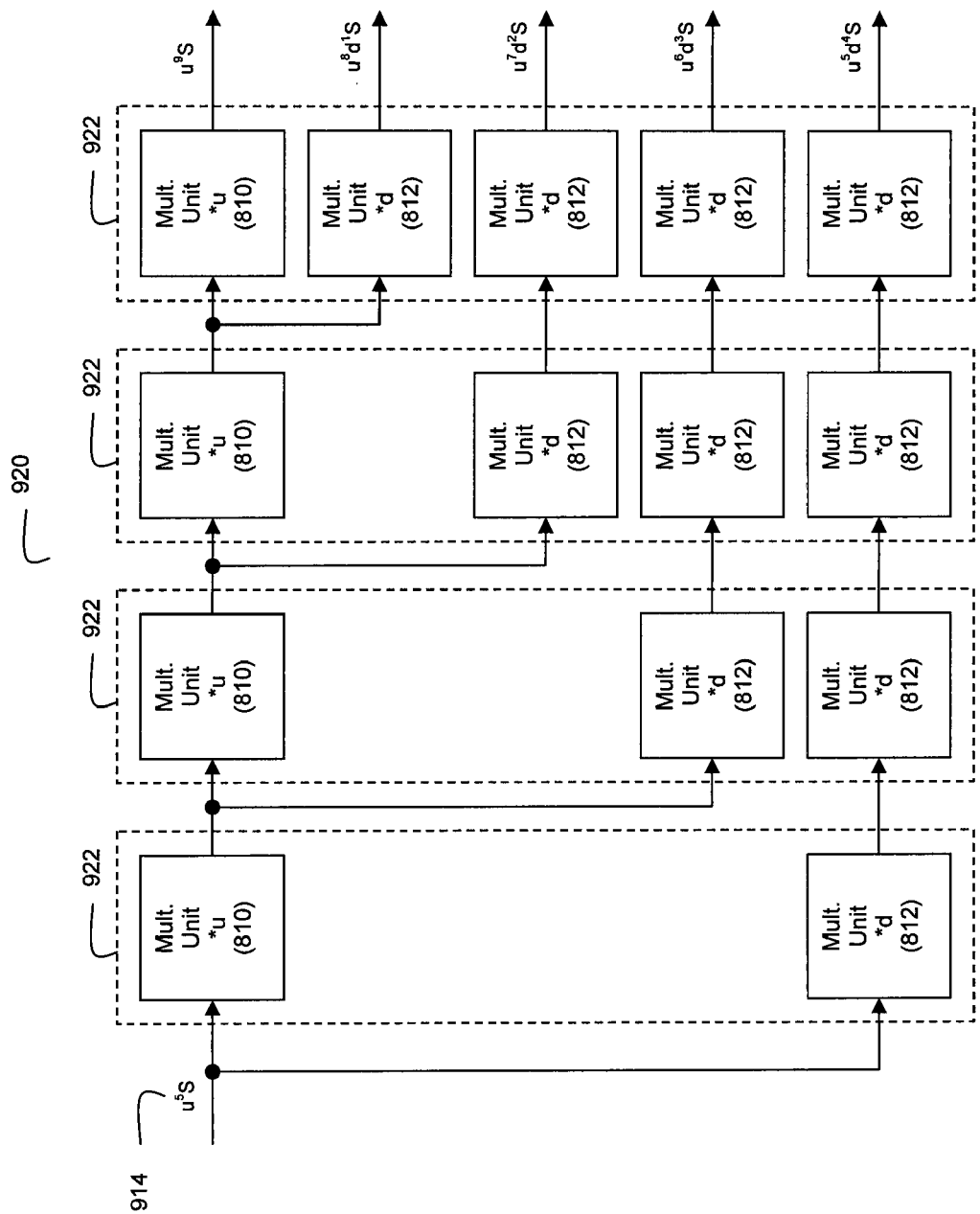
Figure 9D:
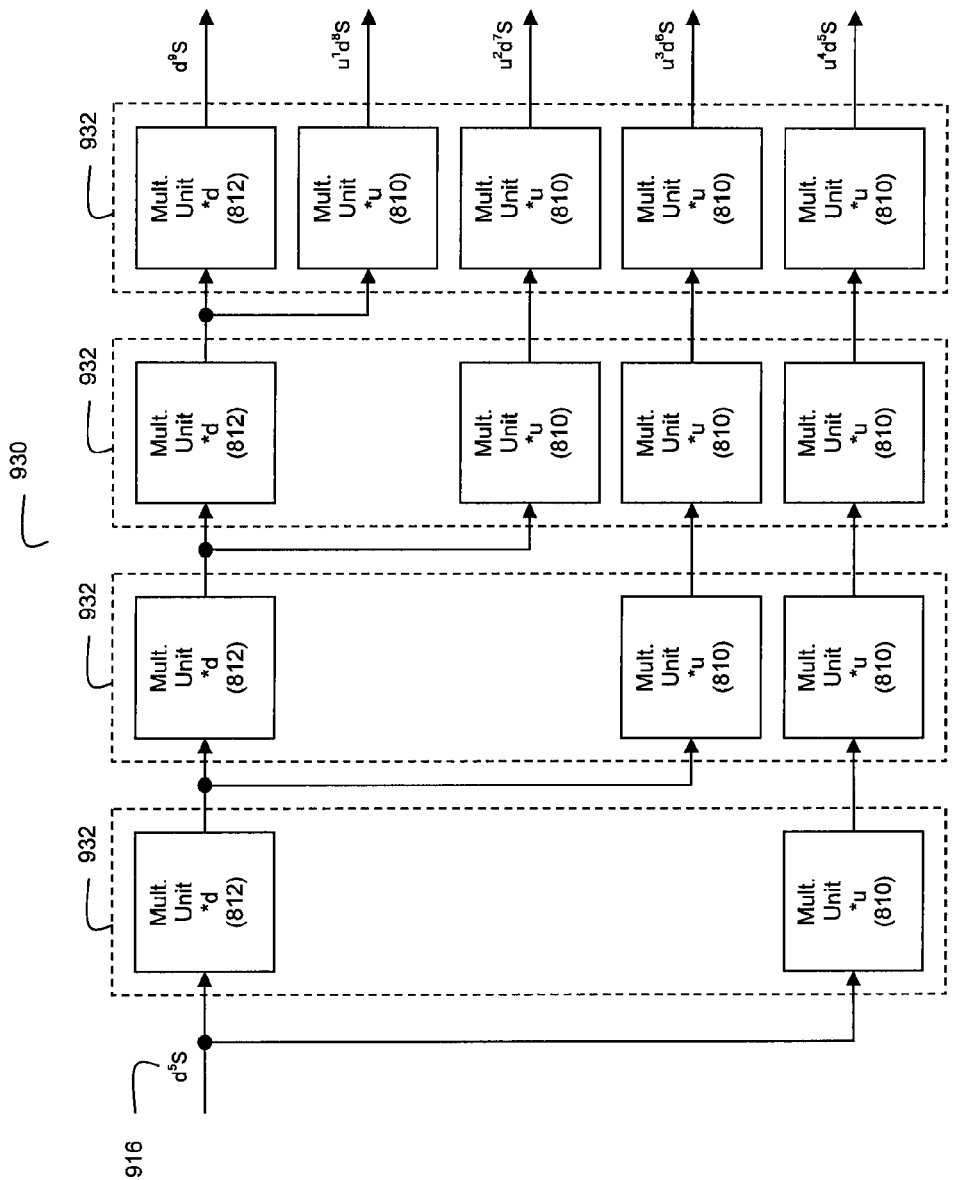

At time step 5, the terminal prices 914 and 916 from the left half of tree 900 can be fed to another module, preferably a hardware co-processor. If the hardware co-processor has 10 parallel multipliers available, then the terminal prices $u^9 S$, $u^8 dS$, $u^7 d^2 S$, $u^6 d^3 S$, $u^5 d^4 S$, $u^4 d^5 S$, $u^3 d^6 S$, $u^2 d^7 S$, $ud^8 S$ and $d^5 S$ can be computed in four time steps. Alternatively, two hardware co-processors with 5 parallel multipliers can be employed to compute those terms in parallel, as shown by modules 920 and 930 in FIGS. 9(c) and 9(d). In module 920 of FIG. 9(c), four pipelined stages 922 compute the terminal prices $u^9 S$, $u^8 dS$, $u^7 d^2 S$, $u^6 d^3 S$ and $u^5 d^4 S$ from the input $u^5 S$ price 914. In module 930 of FIG. 9(d), four pipelined stages 932 compute the terminal prices $u^4 d^5 S$, $u^3 d^6 S$, $u^2 d^7 S$, $ud^8 S$ and $d^9 S$ from the input $d^5 S$ price 916. Thus, with the example, computational module 704 can be readily formed from modules 910, 920 and 930. As another alternative, a hardware co-processor with 5 parallel multipliers can compute the terminal prices in 8 steps by sequentially computing each subtree to the right of partition 902 shown in FIG. 9(a). It should further be noted that superscalar microprocessor(s) can be used to perform other operations that may be needed for options pricing or for other analytical functions in parallel using available resources on the superscalar microprocessor(s).

Figure 10A:
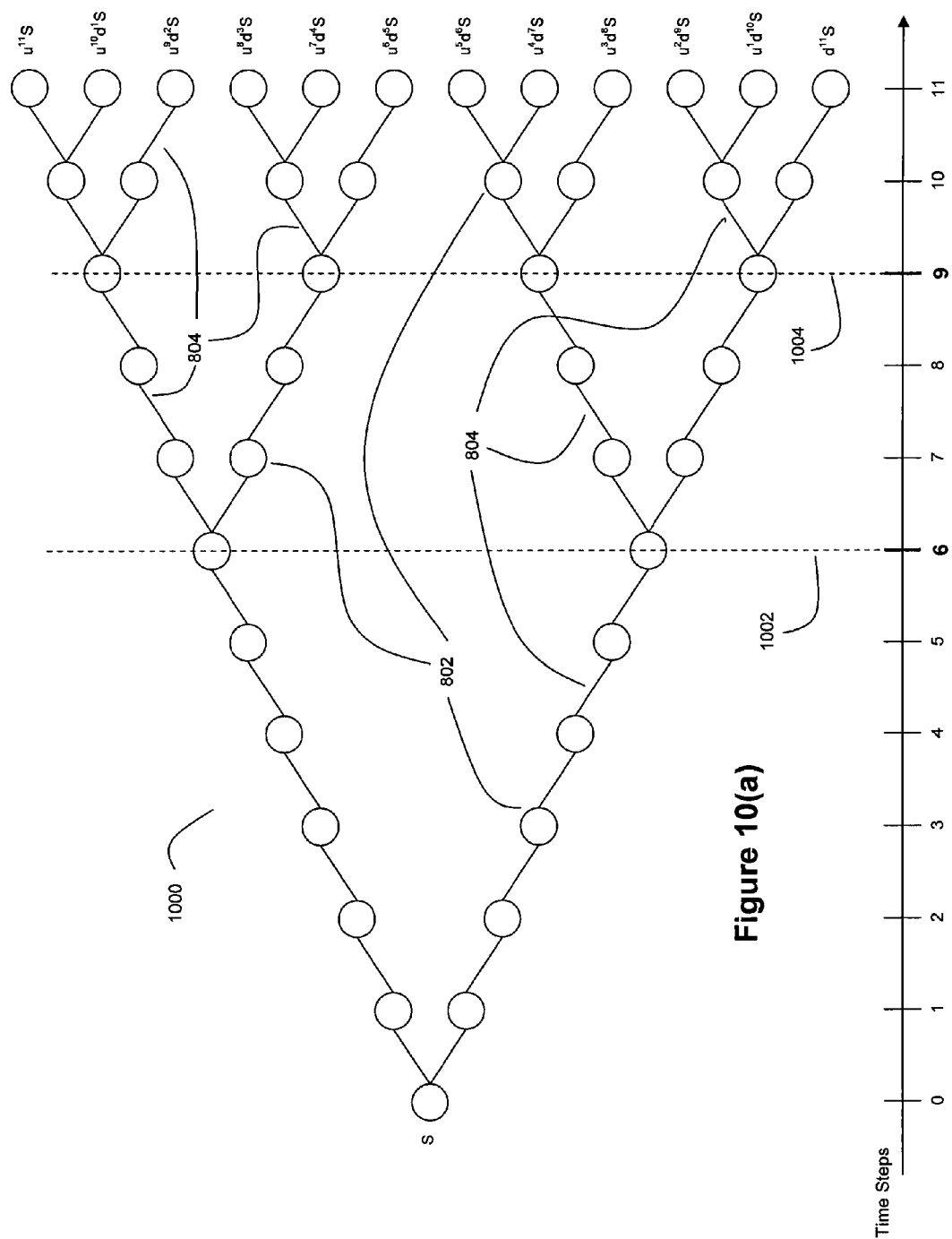
FIG. 10(a) depicts an exemplary embodiment of a binomial tree wherein double partitioning is used.
Figure 10B:
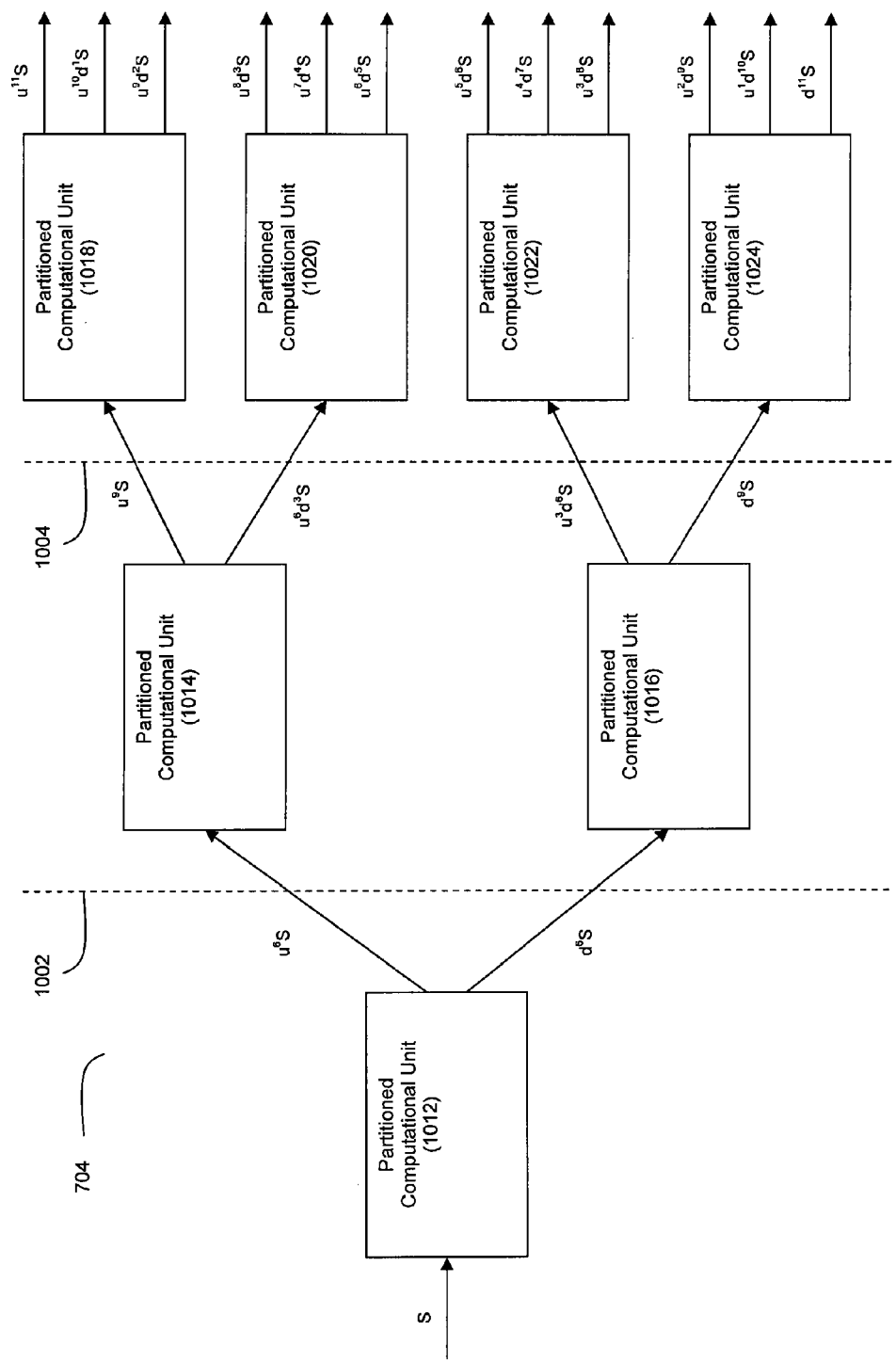
FIG. 10(b) depicts an exemplary embodiment of a double partitioned computational pipeline for the computation of an option's fair market price for the binomial tree of FIG. 10(a)

It should also be noted that the partitioning technique can be applied recursively to better map the computational load to the particular processing platform used in the practice of this embodiment of the invention. FIG. 10(a) depicts an exemplary 11 step binomial tree 1000 where double partitioning has been employed; with one partition 1002 at time step 6 and another partition 1004 at time step 9. In one embodiment, at time step 9, the four intermediate results produced at partition 1004 can be fed to a hardware co-processor, where the hardware co-processor is configured to compute one or more subtrees to the right of partition 1004 in parallel. In another exemplary embodiment drawing from the example of FIG. 10(a), module 704 can be realized as shown in FIG. 10(b). Partitioned computational unit 1012 outputs the prices $u^6 S$ and $d^6 S$ using two computational paths. The $u^6 S$ term can then be fed to partitioned computational unit 1014, to thereby compute the terms $u^9 S$ and $u^6 d^3 S$ using two computational paths. In parallel with partitioned computational unit 1014, partitioned computational unit 1016 can operate on the $d^6 S$ term from unit 1012 to thereby compute the terms $u^3 d^6 S$ and $d^9 S$ using two computational paths. Thereafter, the terms $u^9 S$, $u^6 d^3 S$, $u^3 d^6 S$ and $d^9 S$ can be fed to four parallel partitioned computational units 1018, 1020, 1022 and 1024 to compute the terminal prices shown in tree 1000 of FIG. 10(a).

Figure 11:
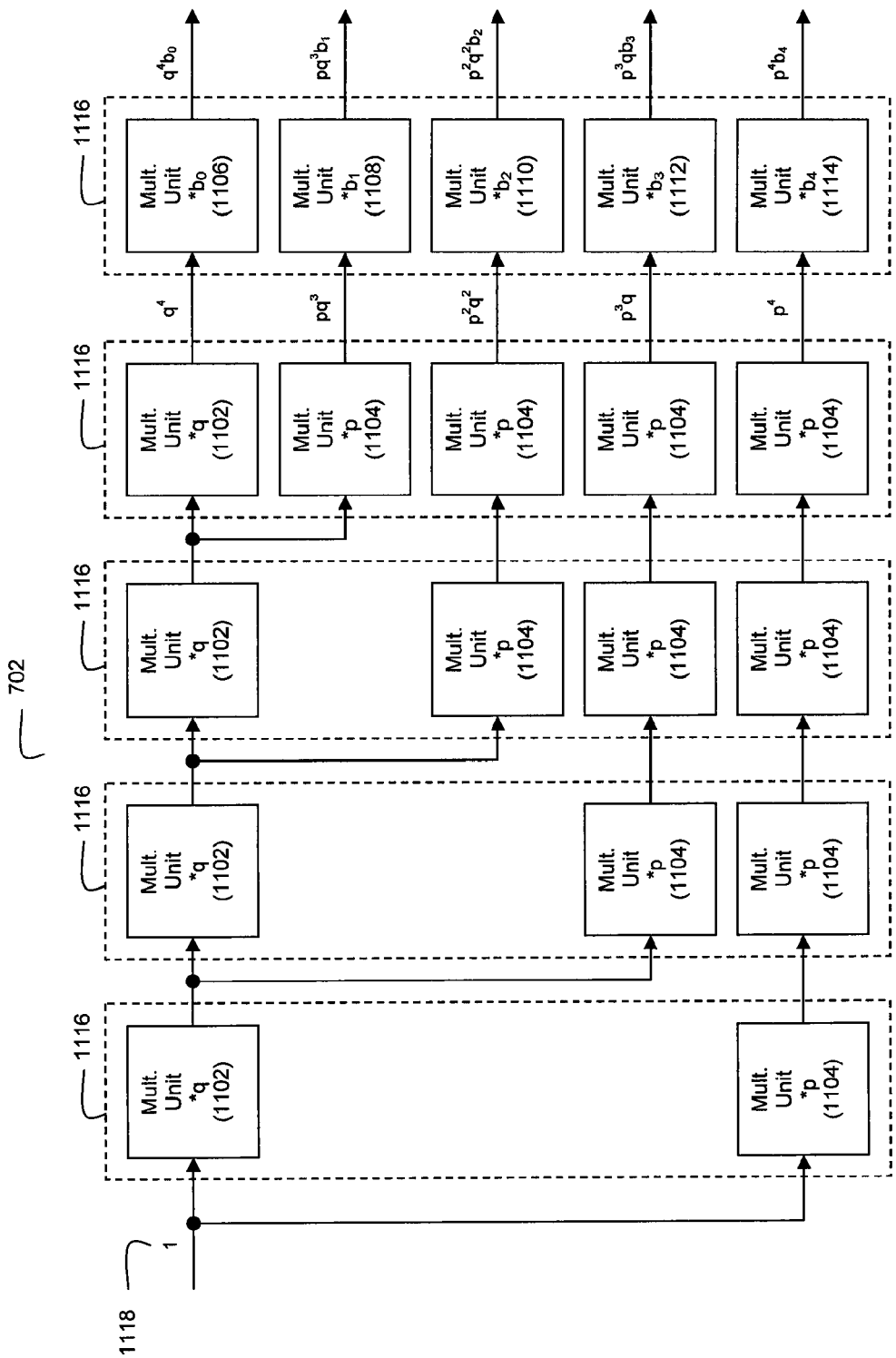
FIG. 11 depicts an exemplary embodiment of a computational pipeline for implementing the computational module 702 of FIG. 7.

It should be noted that the same techniques described in connection with FIGS. 8(a)-10(b) can be used to compute the $p^j q^{n-j} b_j$ terms via module 702. FIG. 11 depicts an exemplary embodiment of module 702 wherein no partitioning has been used and wherein the binomial tree is of depth n=4. Module 702 comprises n pipelined stages 1116 to compute the $p^j q^{n-j}$ terms via multiplication units 1102 and 1104 (multiplication units 1102 being *q multipliers and multiplication units 1104 being *p multipliers). An input value 1118 of 1 is fed into the first pipeline stage 1116. The final stage 1116 comprises n+1 parallel multiplication units 1106, 1108, 1110, 1112, and 1114 that perform the *$b_j$ multiplication operations. It should be noted that more complex implementations of modules 702 can be deployed in accordance with the teachings set forth herein in connection with FIGS. 8(*a*) through 10(*b*).

It should also be noted that the combinatorial logic stage 706 of architecture 700 of FIG. 7 can be constructed as shown in FIG. 6(*c*) for the lookup table embodiment, although the multipliers 630 would not be needed as the operations performed by multipliers 630 would be performed within module 704.

The inventors herein note that the options pricing techniques described in connection with FIGS. 1(*a*)-11 can be implemented on any of a number of platforms, in software, hardware, or a combination of hardware and software. As such, as previously explained, suitable platforms for deploying the options pricing techniques described herein can include reconfigurable logic devices (e.g., FPGAs), superscalar processors, multicore processors, ASICs, GPUs, PPUs, chip multi-processors, and GPPs.

Figure 12:
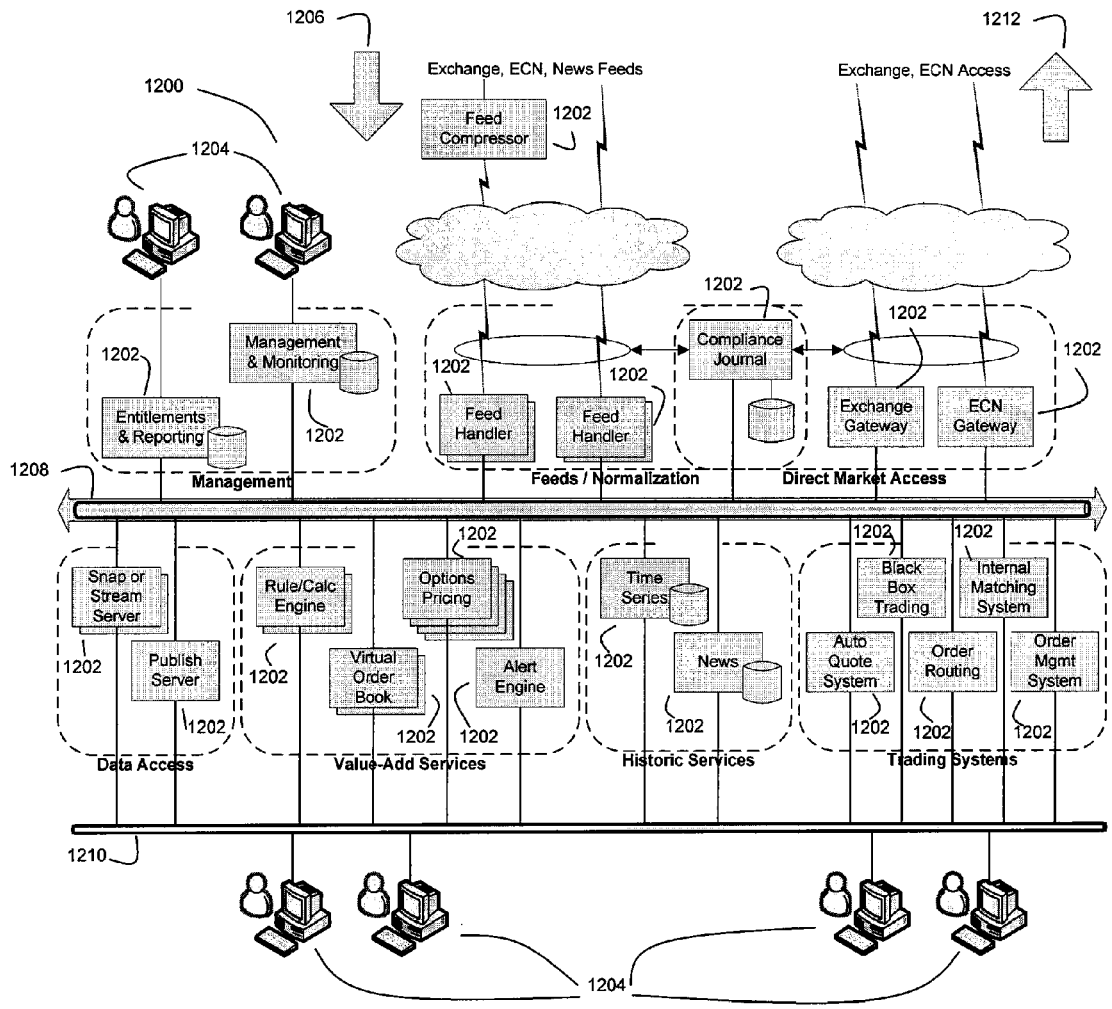
FIG. 12 depicts an exemplary system architecture for a conventional market data platform.
Figure 13:
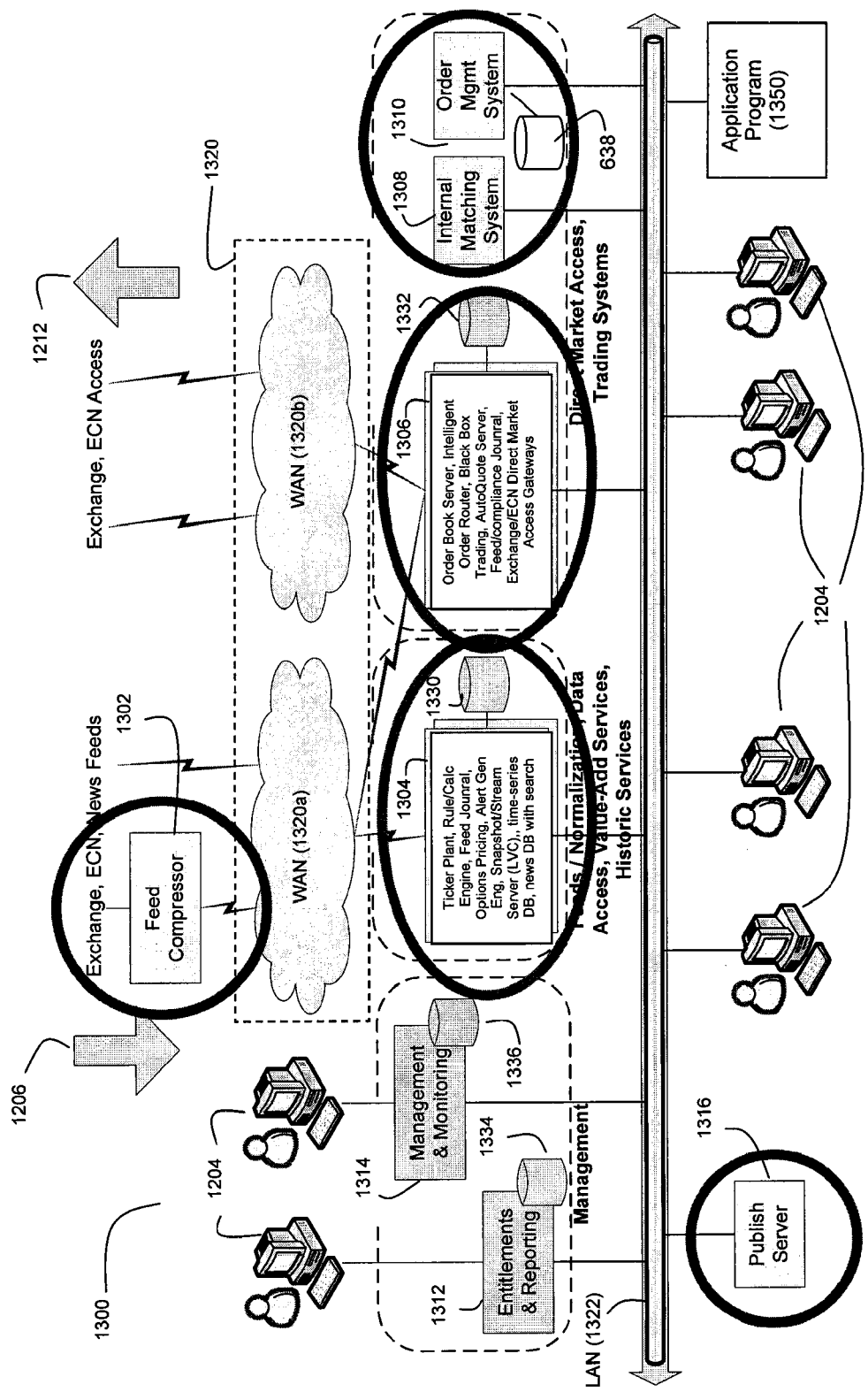
FIG. 13 depicts an exemplary architecture for a market data platform wherein at least portions of the functional units are deployed in hardware.

A preferred platform for the deployment of the options pricing techniques described herein is the market data platform described in the above-referenced and incorporated provisional U.S. patent application 60/814,796, an example of which is shown in FIG. 13. The market data platform 1300 shown in FIG. 13 consolidates the functional units 1202 shown in FIG. 12 into much fewer physical devices and also offloads much of the data processing performed by the GPPs of the functional units 1202 to hardware, preferably reconfigurable logic.

For example, with the architecture of FIG. 13, the feed compressor 1302 can be deployed in an appliance such as system 1400, described hereinafter with respect to FIG. 14. Feed compressor 1302 is used to compress the content of the financial data stream 1206 arriving from various individual sources. Examples of compression techniques that can be used include the open standard "glib" as well as any proprietary compression technique that may be used by a practitioner of the present invention.

Preferably, the feed compressor device 1302 is deployed in a physical location as close to the feed source 1206 as possible, to thereby reduce communication costs and latency. For example, it would be advantageous to deploy the feed compressor device 1302 in a data center of an extranet provider (e.g., Savvis, BT Radians, etc.) due to the data center's geographic proximity to the source of the financial market data 1206. Because the compression reduces message sizes within the feed stream 1206, it will be advantageous to perform the compression prior to the stream reaching wide area network (WAN) 1320a; thereby reducing communication latency through the network because of the smaller message sizes.

WAN 1320 preferably comprises an extranet infrastructure or private communication lines for connection, on the inbound side, to the feed handlers deployed in device 1304. On the outbound side, WAN 1320 preferably connects with device 1306, as explained below. It should be noted that WAN 1320 can comprise a single network or multiple networks 1320a and 1320b segmented by their inbound/outbound role in relation to platform 1300. It is also worth noting that a news feed with real-time news wire reports can also be fed into WAN 1320a for delivery to device 1304.

Device 1304 can be deployed in an appliance such as system 1400 described hereinafter with respect to FIG. 14. Whereas the conventional GPP-based system architecture shown in FIG. 12 deployed the functional units of feed handling/ticker plant, rule-based calculation engines, an alert generation engine, options pricing, last value cache (LVC) servers supplying snapshot and/or streaming interfaces, historical time-series oriented databases with analytics, and news databases with search capabilities in software on separate GPPs, the architecture of FIG. 13 can consolidate these functions, either partially or in total, in firmware resident on the reconfigurable logic (such as one or more FPGAs) of device 1304.

Feed handlers, LVCs, time series databases, and news databases can be implemented in device 1304 as described in connection with the above-referenced and incorporated 60/814,796 application.

The rule-based calculation engines, which are engines amenable to implementation in a firmware pipeline and that allow a user to create his/her own synthetic records whose field values are derived from calculations performed against information obtained from the LVC, information extracted from a stream of update messages generated from the LVC, or from alternate sources, can optionally employ at least in part the options pricing techniques described herein. It should also be noted that the rule-based calculation engine can be configured to create new synthetic fields that are included in existing records maintained by the LVC. The new values computed by the engine are computed by following a set of rules or formulas that have been specified for each synthetic field. Thus, for example, a rule-based calculation engine can be configured to compute an option's implied volatility and/ or theoretical fair market price using the techniques described in connection with FIGS. 1(*a*)-11 and include those values in existing records for the option maintained by the LVC.

The alert generation functionality within device 1304 can also be deployed in a firmware pipeline. Alert generation engines are similar to a rule-based calculation engine in that they monitor the current state of a financial instrument record (or set of financial instrument records), and the alert generation engine will trigger an alert when any of a set of specified conditions is met (e.g., when an option's actual price P is within some pre-specified tolerance of an option's theoretical fair market price). An indication is then delivered via a variety of means to consuming applications or end users that wish to be notified upon the occurrence of the alert. This embodiment of the present invention provides great value by providing a practitioner with the ability to tightly couple alert generation functionality with other applications that react to the alerts generated thereby and reduce the effective latency of data processing (e.g., a "black box" trading algorithm that may respond to an alert detected by the alert generation engine).

Options pricing can be implemented with a firmware pipeline in device 1304, via either the rule-based calculation engine functionality described above or via a specific options pricing engine. Thus, an option pricing engine that is part of device 1304 can be configured to perform a number of computations related to received options and their underlying instruments (e.g., the theoretical fair market value of an option or the implied volatility of the underlying instrument based upon the market price of the option as described in connection with FIGS. 1(*a*)-11). However, it should be noted that the options pricing engine need not be limited to the techniques described herein with respect to FIGS. 1(*a*)-11, as a wide array of computational rules can be used for pricing options, as is known in the art, which can be deployed in firmware for platform 1300. As explained above, most if not all industry-accepted techniques for options pricing are extremely computation intensive which introduces significant latency when the computations are performed in software. However, by implementing option pricing in a firmware pipeline, the market data platform 1300 can significantly accelerate the computation of option pricing, thereby providing in important edge to traders who use the present invention.

Traders at workstations 1204 (or application programs 1350 running on an entity's own trading platform) can then access the streaming financial data processed by device 1304 via a connection to local area network (LAN) 1322. Through this LAN connection, workstations 1204 (and application program 1350) also have access to the data produced by devices 1306, 1308, 1310, 1312, 1314, and 1316. Like devices 1302 and 1304, devices 1306, 1308, 1310, 1312, 1314, and 1316 can also be deployed in an appliance such as system 1400 described hereinafter with respect to FIG. 14.

As described in the above-referenced and incorporated 60/814,796 application, device 1306 preferably consolidates the following functionality at least partially into firmware resident on reconfigurable logic: an order book server; an order router; direct market access gateways to exchanges, Electronic Communication Networks (ECNs), and other liquidity pools; trading engines; an auto-quote server; and a compliance journal. An order book server can employ an options pricing engine or the results from an options pricing engine to enrich the order book data with computed theoretical fair market prices and/or implied volatilities for the options. Also, an order router can be enhanced by employing an options pricing engine or the results from an options pricing engine. For example, the order router may be configured to monitor the status of the order book. In doing so, the order router can identify where liquidity exists in the market to help drive its order routing decisions. When making such order routing decisions, knowledge of an option's implied volatility and/or theoretical fair market price may be helpful. A feed/compliance journal could also employ an options pricing engine or the results from an options pricing engine to correlate market prices with theoretical fair market prices and/or implied volatilities to identify any potential market abnormalities.

A trading engine within device 1306 can also be deployed on reconfigurable logic. An algorithmic trading engine operates to apply a quantitative model to trade orders of a defined quantity to thereby automatically subdivide that trade order into smaller orders whose timing and size are guided by the goals of the quantitative model so as to reduce the impact that the original trade order may have on the current market price. Also, a black box trading engine operates to automatically generate trades by following a mathematical model that specifies relationships or conditional parameters for an instrument or set of instruments. To aid this processing, the black box trading engine is fed with real-time market data. Thus, the black box trading engine within device 1306 can be fed with the computed implied volatility and/or computed fair market price(s) for each option so that the black box trading engine can make a decision on whether to buy or sell a given option. This combination of a black box trading engine with the accelerated options pricing functionality described herein synergistically creates incredible competitive advantages for practitioners of this embodiment of the invention in that the practitioner can conceivably take action on options available on the market before other traders even realize whether the available option represents a desirable deal or not.

An auto-quote server is similar to a black box trading engine. The auto-quote server operates to automatically generate firm quotes to buy or sell a particular financial instrument at the behest of a "market maker"; wherein a "market maker" is a person or entity which quotes a buy and/or sell price in a financial instrument hoping to make a profit on the "turn" or the bid/offer spread. By employing an options pricing engine or the results from an options pricing engine, an auto-quote server's decisions as to what bid/ask offers to place in the market can be driven at least in part by the computed theoretical fair market prices and/or implied volatilities. For example, it is conceivable that the bid/offer spread may correlate to an instrument's volatility; these and other relationships could be examined by a black-box auto-quote server that employs an options pricing engine or the results therefrom.

As described in the above-referenced and incorporated 60/814,796 application, device 1308 preferably implements an internal matching system/engine in firmware resident on reconfigurable logic, device 1310 preferably implements an order management system (OMS) in firmware resident on reconfigurable logic, device 1312 preferably implements entitlements and reporting functionality, device 1314 preferably implements management and monitoring, and device 1316 preferably implements publishing and contribution server functionality.

Figure 14:
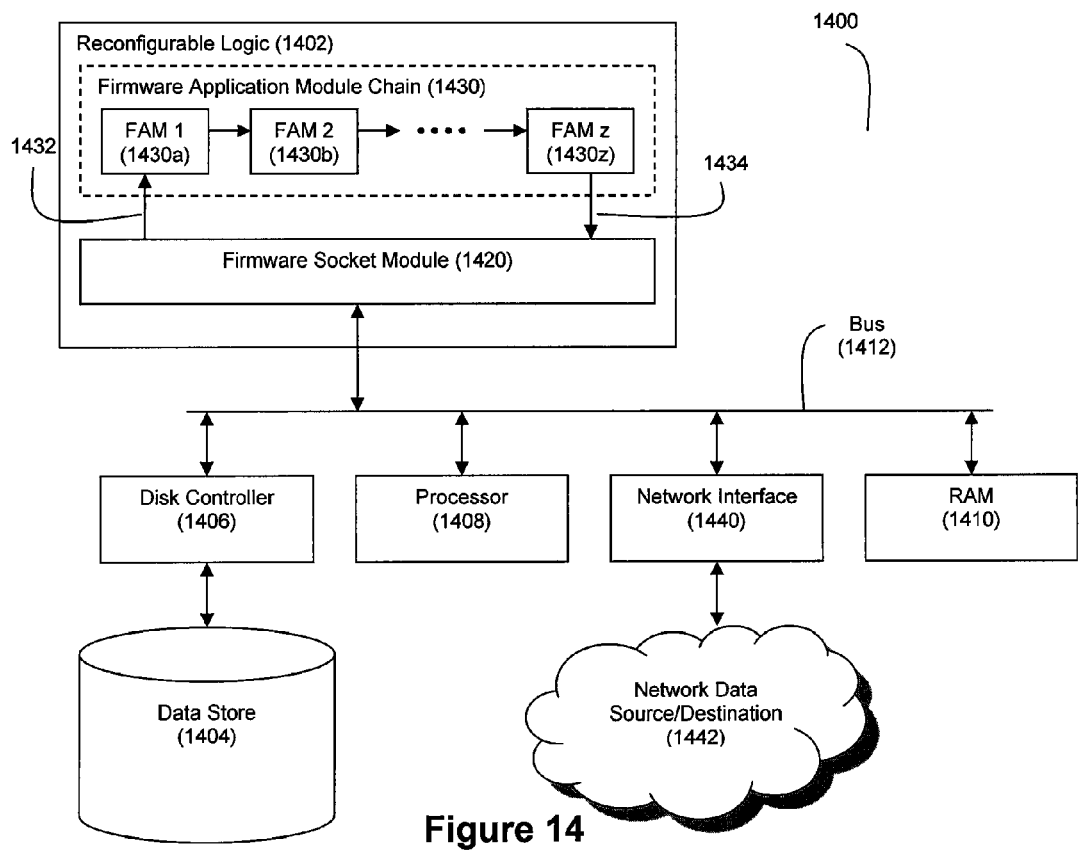
FIG. 14 is a block diagram view of an exemplary system architecture in accordance with an embodiment of the present invention on which an options pricing engine can be deployed.

FIG. 14 depicts an exemplary system 1400 in which the options pricing functionality described herein (and optionally also the other functionality described in connection with FIG. 13) can be deployed. The system 1400 can be characterized as a hardware co-processor or hardware appliance that performs high speed processing of streaming data. For e.g., the processing may include financial calculations such as the implied volatility or options price computations mentioned previously. In this system, a reconfigurable logic device 1402 is positioned to receive data that streams off of either or both a disk subsystem defined by disk controller 1406 and data store 1404 (either directly or indirectly by way of system memory such as RAM 1410) and a network data source/destination 1442 (via network interface 1440). Preferably, data streams into the reconfigurable logic device by way of system bus 1412, although other design architectures are possible (see FIG. 16(*b*)). Preferably, the reconfigurable logic device 1402 is an FPGA, although this need not be the case. For example, the reconfigurable logic device may also take the form of generalized field programmable object array (FPOA) wherein the objects may be processing elements (e.g., arithmetic units) or full processors (e.g. chip-multi-processors). System bus 1412 can also interconnect the reconfigurable logic device 1402 with the computer system's main processor 1408 as well as the computer system's RAM 1410. The term "bus" as used herein refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses. In a preferred embodiment, system bus 1412 may be a PCI-X bus, although this need not be the case.

The data store can be any data storage device/system, but is preferably some form of a mass storage medium. For example, the data store 1404 can be a magnetic storage device such as an array of hard-disk drives. However, it should be noted that other types of storage media may also be suitable for use in the practice of the invention. For example, the data store could also be one or more remote data storage devices that are accessed over a network such as the Internet, a storage area network (SAN), or some local area network (LAN). Another source/destination for data streaming to or from the reconfigurable logic device 1402, is network 1442 by way of network interface 1440, as described above. In the financial industry, a network data source (e.g., the exchanges themselves, a third party provider, etc.) can provide the financial data stream 1206 described above in connection with FIGS. 12 and 13.

The computer system defined by main processor 1408 and RAM 1410 is preferably any commodity computer system as would be understood by those having ordinary skill in the art. For example, the computer system may be an Intel Xeon system or an AMD Opteron system.

The reconfigurable logic device 1402 has firmware modules deployed thereon that define its functionality. In one instantiation, the firmware socket module 1420 handles the data movement requirements (both command data and target data) into and out of the reconfigurable logic device, thereby providing a consistent application interface to the firmware application module (FAM) chain 1430 that is also deployed on the reconfigurable logic device. The FAMs 1430i of the FAM chain 1430 are configured to perform specified data processing operations on any data that streams through the chain 1430 from the firmware socket module 1420. Preferred examples of FAMs that can be deployed on reconfigurable logic in accordance with a preferred embodiment of the present invention are described above in connection with options pricing. For example, the pipeline 250 of FIG. 2(*b*) (including the components therein as embodied by the examples of FIGS. 3 and 5) can be deployed in a FAM chain 1430 to compute an option's implied volatility. The combinatorial logic stage 622 of FIG. 6(*a*) can also be deployed in a FAM chain 1430 to compute an option's fair market price if desired by a practitioner of the invention. Furthermore, it should be noted that the lookup unit 620 and one or more of the lookup tables described in connection with FIGS. 6(*a*) and (*b*) could be deployed in the FAM chain 1430 if there are sufficient resources available on the reconfigurable logic. Similarly, all or portions of the architecture 700 described by FIG. 7 can be deployed in a FAM chain 1430 to compute an option's theoretical fair market price.

The specific data processing operation that is performed by a FAM can be controlled/parameterized by the command data that FAM receives from the firmware socket module 1420. This command data can be FAM-specific, and upon receipt of the command, the FAM will arrange itself to carry out the data processing operation controlled by the received command. For example, a FAM that is configured as the initial module 252 of pipeline 250 of FIG. 2(*b*) can be parameterized to define the values for n, r, $\epsilon$, and $\epsilon_\sigma$ and the initial volatility band boundary values $\sigma^1_1, \sigma^1_2, \ldots \sigma^1_{m+}$. In this way, a FAM that is configured to compute a specified data value for a given option can be readily re-arranged to compute a data value for a different option by simply loading new parameters for the different option in that FAM. In this manner, a high throughput can be maintained as multiple options are processed through FAM chain 1430.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. In a preferred embodiment of the system, a FAM may process commands in parallel with data streams. For example, new parameters for the next stream of data may be loaded into a parameter cache prior to completion of the current data stream. Not only will the FAM operate at hardware speeds (thereby providing a high throughput of data through the FAM), but the FAMs can also be flexibly reprogrammed to change the parameters of their data processing operations.

The FAM chain 1430 preferably comprises a plurality of firmware application modules (FAMs) 1430*a*, 1430*b*, . . . that are arranged in a pipelined sequence. As used herein, "FAM pipeline", "FAM pipelined sequence", or "FAM chain" refers to an arrangement of FAMs wherein the output of one FAM is connected to the input of the next FAM in the sequence. This pipelining arrangement allows each FAM to independently operate on any data it receives during a given clock cycle and then pass its output to the next downstream FAM in the sequence during another clock cycle.

A communication path 1432 connects the firmware socket module 1420 with the input of the first one of the pipelined FAMs 1430*a*. The input of the first FAM 1430*a* serves as the entry point into the FAM chain 1430. A communication path 1434 connects the output of the final one of the pipelined FAMs 1430*z* with the firmware socket module 1420. The output of the final FAM 1430*z* serves as the exit point from the FAM chain 1430. Both communication path 1432 and communication path 1434 are preferably multi-bit paths.

Figure 15:
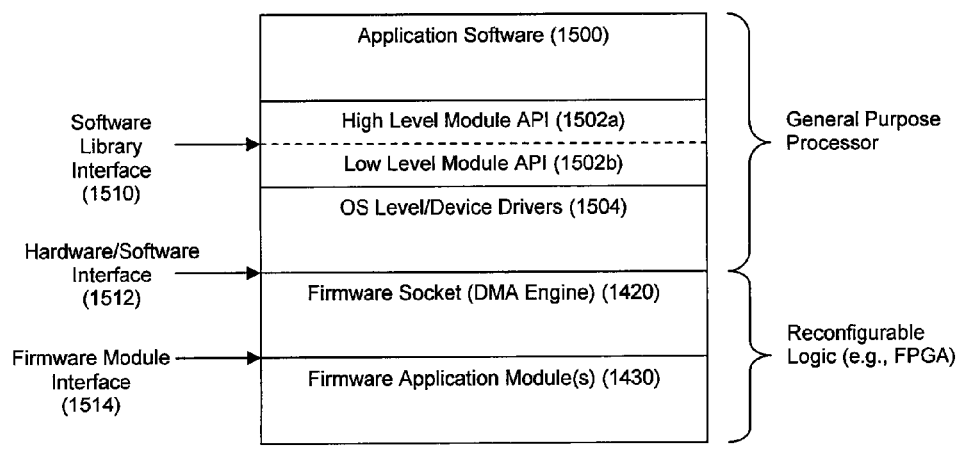
FIG. 15 illustrates an exemplary framework for the deployment of software and firmware for an embodiment of the present invention.

FIG. 15 depicts an exemplary framework for the deployment of applications on the system 1400 of FIG. 14. The top three layers of FIG. 15 represent functionality that is executed in software on the computer system's general-purpose processor 1408. The bottom two layers represent functionality that is executed in firmware on the reconfigurable logic device 1402.

The application software layer 1500 corresponds to high level functionality such as the type of functionality wherein one or more users or external programs interact with the application to define which data processing operations are to be performed by the FAMs and to define what data those data processing operations are to be performed upon.

The next layer is the module application programming interface (API) layer 1502 which comprises a high level module API 1502*a* and a low level module API 1502*b*. The high level module API 1502*a* can provide generic services to application level software (for example, managing callbacks). The low level module API 1502*b* manages the operation of the operating system (OS) level/device driver software 1504. A software library interface 1510 interfaces the high level module API 1502*a* with the low level module API 1502*b*. Additional details about this software library interface can be found in the above-referenced and incorporated patent application Ser. No. 11/339,892.

The interface between the device driver software 1504 and the firmware socket module 1420 serves as the hardware/software interface 1512 for the system 1400. The details of this interface 1512 are described in greater detail in the above-referenced and incorporated patent application Ser. No. 11/339,892.

The interface between the firmware socket module 1420 and the FAM chain 1430 is the firmware module interface 1514. The details of this interface are described in greater detail in the above-referenced and incorporated patent application Ser. No. 11/339,892.

Figure 16A:
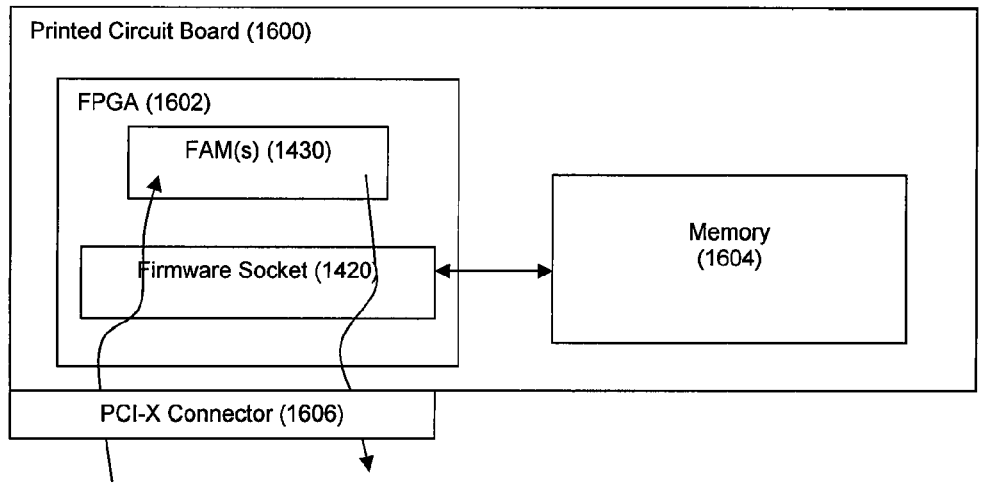
FIG. 16(a) is a block diagram view of a preferred printed circuit board for installation into a market data platform to carry out data processing tasks in accordance with an embodiment of the present invention.
Figure 16B:
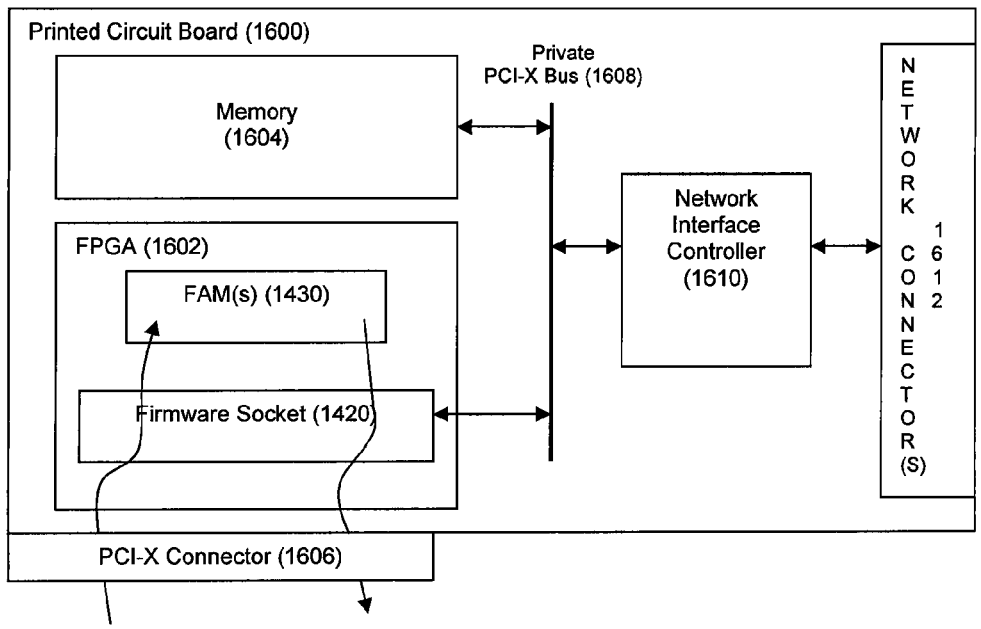
FIG. 16(b) is a block diagram view of an alternate printed circuit board for installation into a market data platform to carry out data processing tasks in accordance with an embodiment of the present invention.

FIG. 16(*a*) depicts a printed circuit board or card 1600 that can be connected to the PCI-X bus 1412 of a commodity computer system for use in a market data platform. In the example of FIG. 16(*a*), the printed circuit board includes an FPGA 1602 (such as a Xilinx Virtex 4 FPGA) that is in communication with a memory device 1604 and a PCI-X bus connector 1606. A preferred memory device 1604 comprises SRAM and DRAM memory. A preferred PCI-X bus connector 1606 is a standard card edge connector.

FIG. 16(*b*) depicts an alternate configuration for a printed circuit board/card 1600. In the example of FIG. 16(*b*), a private bus 1608 (such as a PCI-X bus), a network interface controller 1610, and a network connector 1612 are also installed on the printed circuit board 1600. Any commodity network interface technology can be supported, as is understood in the art. In this configuration, the firmware socket 1420 also serves as a PCI-X to PCI-X bridge to provide the processor 1408 with normal access to the network(s) connected via the private PCI-X bus 1608.

Figure 17:
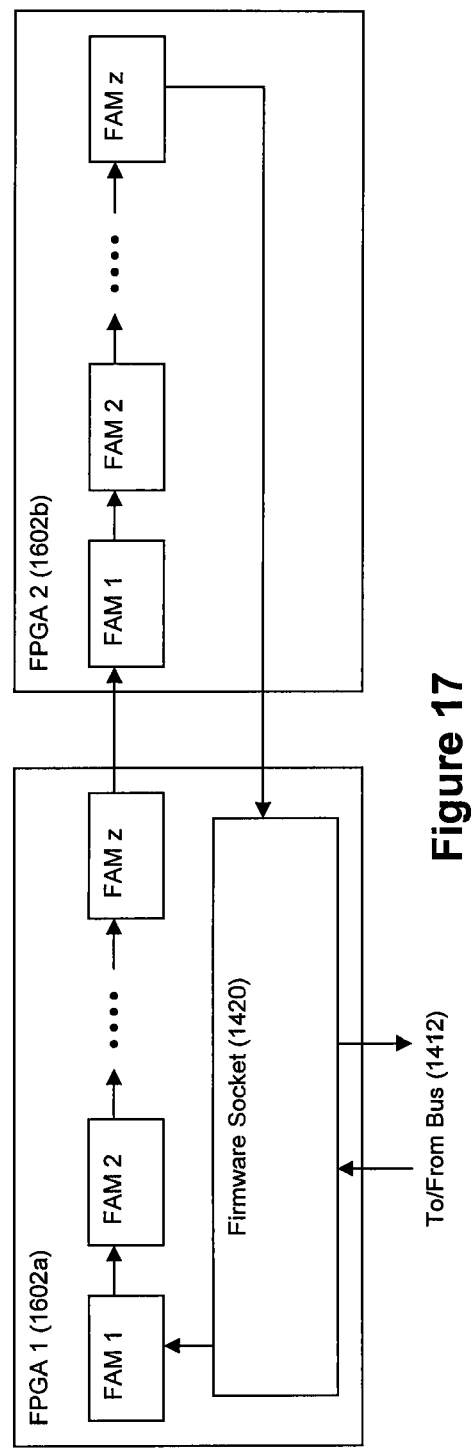
FIG. 17 illustrates an example of how the firmware application modules of a pipeline can be deployed across multiple FPGAs.

It is worth noting that in either the configuration of FIG. 16(*a*) or 16(*b*), the firmware socket 1420 can make memory 1604 accessible to the PCI-X bus, which thereby makes memory 1604 available for use by the OS kernel 1504 as the buffers for transfers from the disk controller and/or network interface controller to the FAMs. It is also worth noting that while a single FPGA 1602 is shown on the printed circuit boards of FIGS. 16(*a*) and (*b*), it should be understood that multiple FPGAs can be supported by either including more than one FPGA on the printed circuit board 1600 or by installing more than one printed circuit board 1600 in the computer system. FIG. 17 depicts an example where numerous FAMs in a single pipeline are deployed across multiple FPGAs.

As shown in FIGS. 14-16(*b*), inbound data (from the kernel 1504 to the card 1600) is moved across the bus 1412 in the computer system to the firmware socket module 1420 and then delivered by the firmware socket module 1420 to the FAM chain 1430. Outbound data (from the card 1600 to the kernel 1504) are delivered from the FAM chain 1430 to the firmware socket module 1420 and then delivered by the firmware socket module 1420 across the PCI-X bus to the software application executing on the computer system. As shown in FIG. 15, the three interacting interfaces that are used are the firmware module interface 1514, the hardware/software interface 1512, and the software library interface 1510.

Figure 18:
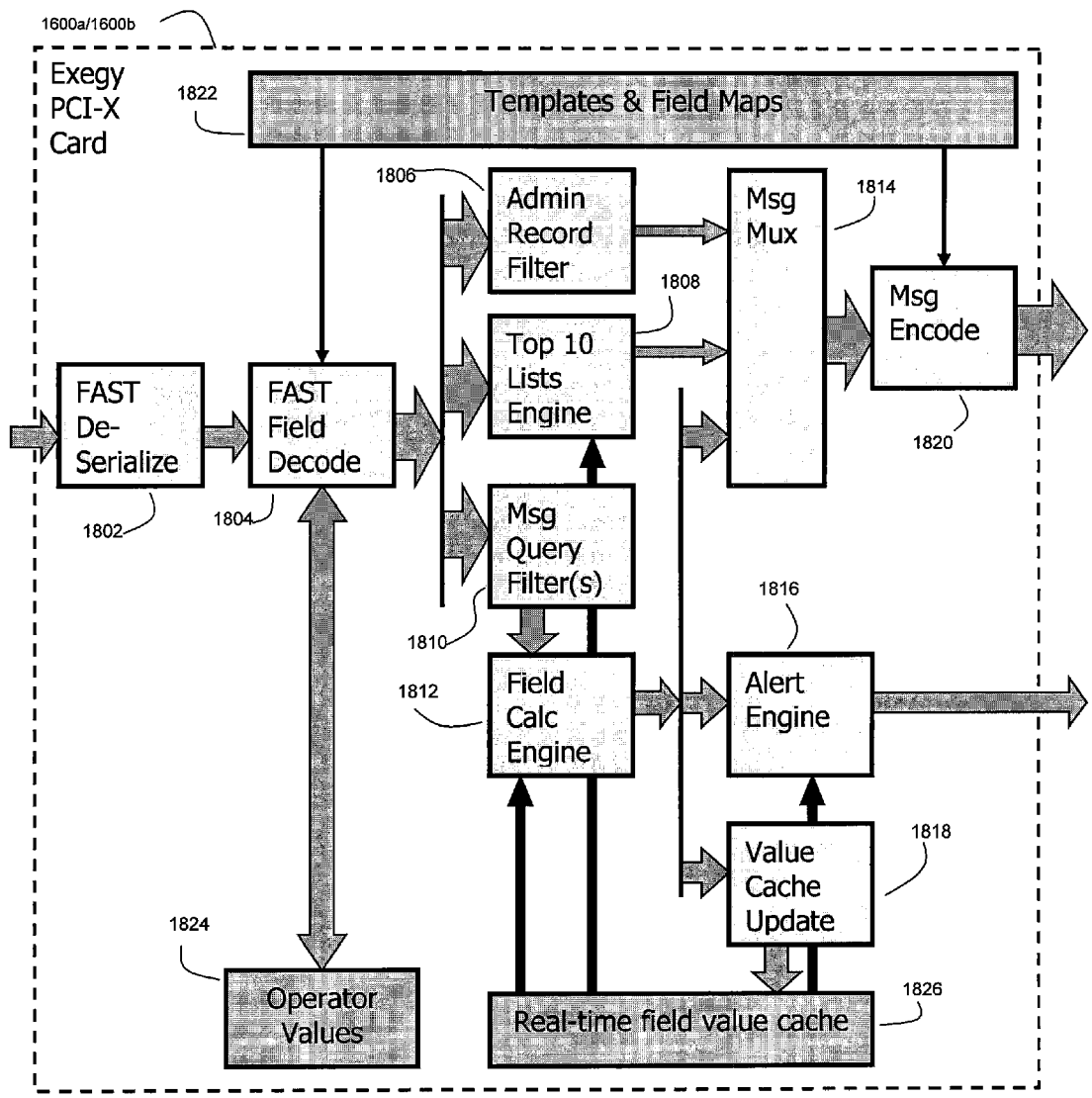
FIG. 18 illustrates an exemplary firmware application module pipeline for message processing wherein options pricing can be performed.

FIG. 18 depicts an exemplary FAM pipeline for carrying out a variety of data processing tasks on streaming financial information, wherein the options pricing functionality described herein can be deployed in whole or in part within the field calculation engine 1812. The FAM pipeline of FIG. 18 takes in a FAST message stream. FAST (FIX Adapted for Streaming) is known in the art as a message encoding scheme. The incoming FAST stream is received by FAM 1802, which deserializes the stream of FAST messages. The deserialized FAST messages are then provided to FAM 1804, which operates to decode the various fields of the FAST messages as aided by the templates and field maps in memory 1822 and the operator values in memory 1824. Thus, the output of FAM 1804 comprises the data content of the FAST message decomposed into its constituent fields. This content is then passed to a variety of parallel FAMS 1806, 1808, and 1810. FAM 1806 performs a administrative record filter on the data it receives. The administrative record filter preferably operates to pass through message types that are not processed by any of the other FAM modules of the pipeline. FAM 1808 serves as a Top 10 lists engine, as described in the above-referenced and incorporated 60/814,796 application. FAM 1810 serves as a message query filter. Message query filters allow for certain messages to be excluded from the message flow. Such filters are preferably parameterized in FAM 1810 such that filtering criteria based on the field values contained within each message can be flexibly defined and loaded onto the FPGA. Examples of filtering criteria that can be used to filter messages include a particular type of instrument (e.g., common stock, warrant, bond, option, commodity, future, etc.), membership within a prescribed set of financial instruments (e.g., an index or "exchange traded fund" (ETF)), message type, etc. In the embodiment herein wherein the field calculation engine 1812 comprises an options pricing engine, the message query filter 1810 is preferably configured to forward option messages to the field calculation engine for processing thereby.

Thus, as noted, the output of FAM 1810 (which comprises a stream of option messages) is then passed to FAM 1812, which is configured as a rule-based calculation engine to perform options pricing. FAM 1812 also preferably receives data from a real time field value cache 1826 to obtain LVC data, as does the top 10 list FAM 1808. Cache 1826 is preferably embodied by storage 1332. The output from the rule-based calculation engine FAM 1812 is then passed to parallel FAMs 1814, 1816, and 1818. FAM 1814 can serve as a message multiplexer, and receives messages from the outputs of FAMs 1806, 1808 and 1812. FAM 1820 receives the messages multiplexed by FAM 1814, and serves to encode those messages to a desired format. FAM 1816 serves as an alert generation engine, whose function is explained above, and whose output exits the pipeline. FAM 1818 serves as a value cache update engine to ensuring that cache 1826 stays current.

Figure 19:
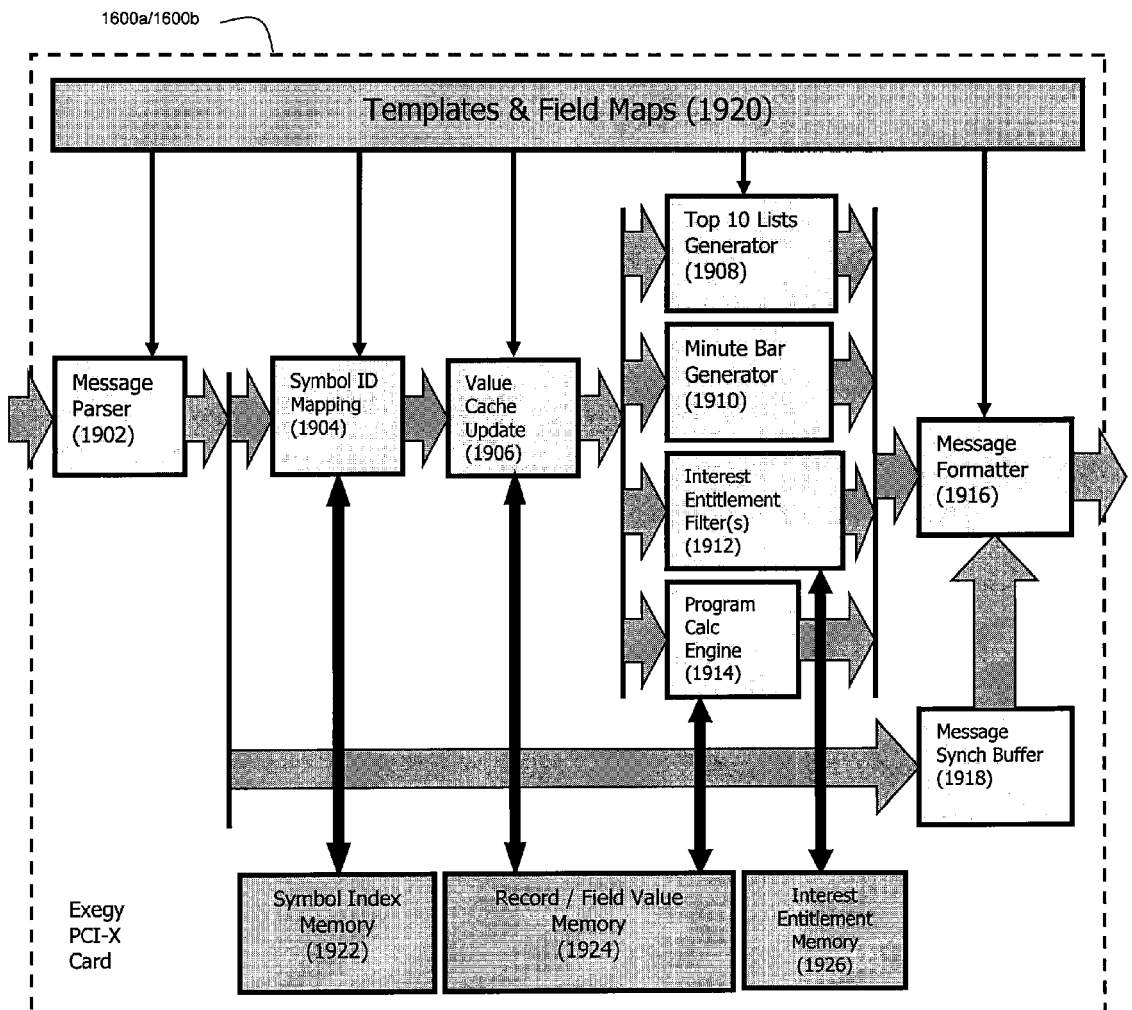
FIG. 19 illustrates another exemplary firmware application module pipeline for message processing wherein options pricing can be performed.

FIG. 19 depicts another exemplary FAM pipeline for carrying out multiple data processing tasks. FAM 1902 takes in a stream of fixed format messages and parses those messages into their constituent data fields. The output of FAM 1902 can be provided to FAM 1904 and FAM 1918. FAM 1918 serves as a message synchronization buffer. Thus, as the fields of the original parsed message are passed directly from FAM 1902 to FAM 1918, FAM 1918 will buffer those data fields while the upper path of FIG. 19 (defined by FAMs 1904, 1906, 1908, 1910, 1912, and 1914) process select fields of the parsed message. Thus, upon completion of the processing performed by the FAMs of the upper path, the message formatting FAM 1916, can generate a new message for output from the pipeline using the fields as processed by the upper path for that parsed message as well as the fields buffered in FAM 1918. The message formatter 1916 can then append the fields processed by the upper path FAMs to the fields buffered in FAM 1918 for that message, replace select fields buffered in FAM 1918 for that message with fields processed by the upper path FAMs, or some combination of this appending and replacing.

FAM 1904 operates to map the known symbol for a financial instrument (or set of financial instruments) as defined in the parsed message to a symbology that is internal to the platform (e.g., mapping the symbol for IBM stock to an internal symbol "12345"). FAM 1906 receives the output from FAM 1904 and serves to update the LVC cache via memory 1924. The output of FAM 1906 is then provided in parallel to FAMs 1908, 1910, 1912, and 1914.

FAM 1908 operates as a Top 10 list generator, as described above. FAM 1910 operates as a Minute Bar generator, as described in the above-referenced and incorporated 60/814, 796 application. FAM 1912 operates as an interest/entitlement filter, as described in the above-referenced and incorporated 60/814,796 application, and FAM 1914 operates as a programmatic calculation engine, as described above. In this embodiment, the programmatic calculation engine 1914 can employ options pricing as described in connection with any of the embodiments of FIGS. 1(*a*)-11. The outputs from FAMs 1908, 1910, 1912 and 1914 are then provided to a message formatter FAM 1916, which operates to construct a fixed format message of a desired format from the outputs of FAMs 1908, 1910, 1912, 1914 and 1918.

In performing these tasks, FAM 1904 is aided by memory 1920 that stores templates and field maps, as well as memory 1922 that stores a symbol index. FAM 1906 is also aided by memory 1920 as well as memory 1924 which serves as an LVC cache. Memory 1920 is also accessed by FAM 1908, while memory 1924 is also accessed by FAM 1914. FAM 1912 accesses interest entitlement memory 1926, as loaded from storage 1334 during initialization of the board 1600.

While these figures illustrate several embodiments of FAM pipelines that can be implemented to process real time financial data streams, it should be noted that numerous other FAM pipelines could be readily devised and developed by persons having ordinary skill in the art following the teachings herein.

Further still it should be noted that for redundancy purposes and/or scaling purposes, redundant appliances 1304, 1306, 1308, 1310, 1312, 1314 and 1316 can be deployed in a given market data platform 1300.

Furthermore, it should also be noted that a practitioner of the present invention may choose to deploy less than all of the functionality described herein in reconfigurable logic. For example, device 1304 may be arranged to perform only options pricing in reconfigurable logic, or some other subset of the functions listed in FIG. 13. If a user later wanted to add additional functionality to device 134, it can do so by simply re-configuring the reconfigurable logic of system 1400 to add any desired new functionality. Also, the dashed boxes shown in FIG. 13 enclose data processing functionality that can be considered to belong to the same category of data processing operations. That is, devices 1312 and 1314 can be categorized as management operations. Device 1304 can be categorized as providing feed handling/processing for data access, value-added services, and historic services. Devices 1306, 1308 and 1310 can be categorized as direct market access trading systems. As improvements to reconfigurable logic continues over time such that more resources become available thereon (e.g., more available memory on FPGAs), the inventors envision that further consolidation of financial data processing functionality can be achieved by combining data processing operations of like categories, as indicated by the dashed boxes, thereby further reducing the number of appliances 1400 needed to implement platform 1300. Further still, in the event of such resource improvements over time for FPGAs, it can be foreseen that even further consolidation occur, including consolidation of all functionality shown in FIG. 13 on a single system 1400.

Thus, a platform 1300 developed in the practice of the invention can be designed to improve data processing speeds for financial market information, all while reducing the number of appliances needed for platform 1300 (relative to conventional GPP-based systems) as well as the space consumed by such a platform. With a platform 1300, a user such as a trader at a work station 1204 (or even a customer-supplied application software program 1350 that accesses the platform via an application programming interface (API), can obtain a variety of information on the financial markets with less latency than would be expected from a conventional system. This improvement in latency can translate into tremendous value for practitioners of the invention.

While the present invention has been described above in relation to its preferred embodiment, various modifications may be made thereto that still fall within the invention's scope.

Figure 20A:
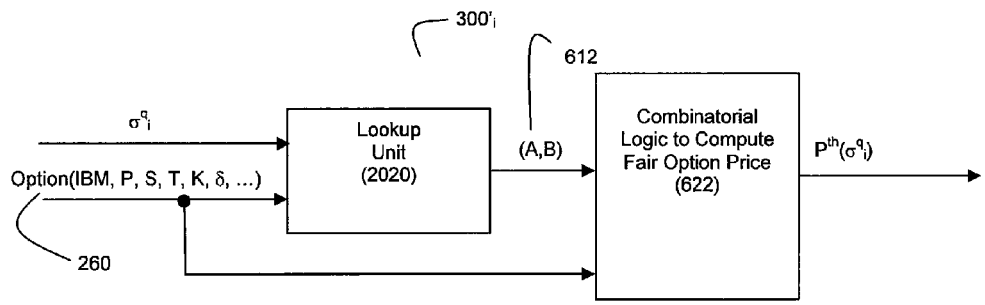
FIGS. 20(a) and (b) depict an exemplary embodiment for implementing the OPM computational unit 300 of FIG. 3 using a lookup table.
Figure 20B:
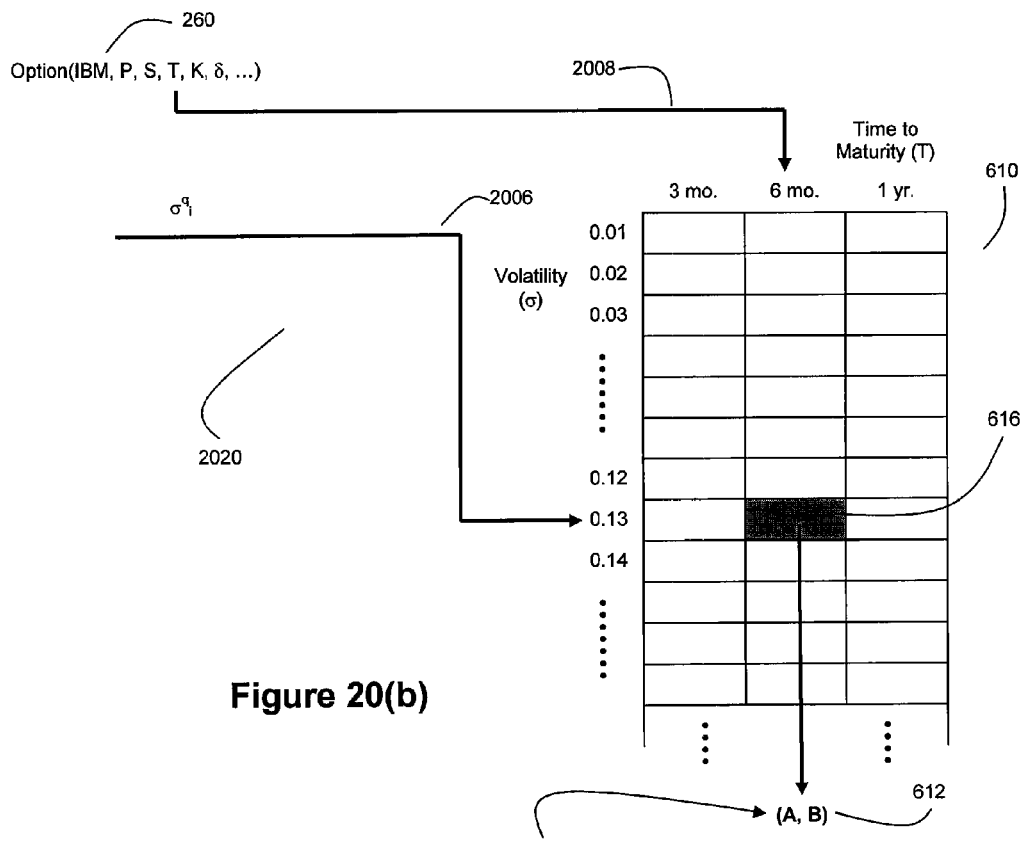

For example, it should be noted that the OPM computational units 300 of FIG. 3 can utilize a look-up table approach to computing the theoretical fair market option price for a given input $\sigma^q_i$, as shown in FIGS. 20(*a*) and (*b*). Such an OPM computational unit 300'$_i$ preferably would include a lookup unit 2020 in communication with a combinatorial logic stage 622 like that described in connection with FIG. 6(*c*). The lookup unit 2020 preferably employs a lookup table 610 such as that described in connection with FIG. 6(*b*). Lookup unit 2020 then operates to (1) receive an option message 260 and an input volatility value $\sigma^q_i$, (2) parse the option message 260 to identify an index value 2008 for indexing the lookup table 610 (preferably the value of the option's time to maturity characteristic), (3) retrieve the precomputed term(s) 612 (e.g., the (A,B) pair) located in the table entry 616 defined by the time to maturity index 2008 and the volatility index 2006. The retrieved precomputed term(s) 612 can then be passed to the combinatorial logic stage 622, which is configured to compute the option's theoretical fair market price.

As another example, it should be noted that while the embodiment of FIG. 2(*b*) depicts a plurality of pipelined computational modules 252 wherein each computational module 252 is configured to perform a different iteration of the algorithm shown in FIG. 2(*a*), the system can also be configured such that the same computational module 252 performs the computations for all iterations, in which case the output from computational module 252 will be fed back to itself for subsequent iterations. While this configuration will likely degrade the system's throughput capabilities, such a design may be desirable in view of the amount of processing resources available on a processing platform to reduce the system's required amount of computational resources. In a like manner, a hybrid approach can also be taken wherein a plurality of computational modules 252 are arranged in a pipeline 250, but where a subset of the computational modules 252 (possibly only one thereof) is configured to perform the computations for multiple iterations of the algorithm shown in FIG. 2(*a*). In such a configuration, a balance between throughput and available computational resources can be sought if the amount of available computational resources poses a challenge.

Similarly, it should also be noted that while the embodiment of FIG. 3 depicts a plurality of parallel OPM computational units 300 operating within a computational module 252, the computational module 252 can also be configured such that is configured to perform a different iteration of the algorithm shown in FIG. 2(*a*), the system can also be configured with only one OPM computational unit 300, wherein the single computational unit 300 will sequentially compute the theoretical fair option price for each of the different volatility values for a given iteration. Once again, while this design will likely sacrifice throughput, such a design may be desirable in view of the amount of computational resources available on a given processing platform. Also as mentioned above, a hybrid approach can be taken wherein a plurality of parallel OPM computational units 300 are deployed in the computational module 252, but the number of OPM computational units 300 is not sufficient to separately compute the theoretical fair market prices for each volatility value of a given iteration such that at least one of the OPM computational units 300 operates sequentially on a plurality of the different volatility values for that iteration. Preferably, the workload of volatility values for a given iteration would be evenly distributed across the plurality of sequentially operating OPM computational units 300. It should also be noted that in such a design, the combinatorial logic stage 304 would be configured with buffer space in which to store the outputs from the difference computational units 302 while the OPM computational units 300 are sequentially operating on the next set of volatility values for the given iteration.

It should also be noted that, with the preferred embodiment, the step of identifying the volatility band within which the implied volatility resides comprises defining the band from an upper and lower volatility value for which the computed theoretical fair market prices surround the option's actual purchase price. Another option for identifying the band within which the implied volatility resides is to determine the volatility value corresponding to the computed theoretical fair market price that is closest in value to the option's actual purchase price. The identified band could then be defined by adding some additional width around the determined volatility value in both directions.

Moreover, while the preferred embodiment describes that the same pipeline can be used to process both call and put options as well as both American and European options (wherein appropriate flags within option messages are used to control whether the pipeline treats a given option message as a call/put and/or American/European option), it should be noted that the system can also be configured to maintain multiple separate pipelines, wherein each pipeline is configured to a given type of option (e.g., a two pipeline system wherein one pipeline is for American options and one pipeline is for European options; a two pipeline system wherein one pipeline is for call options and one pipeline is for put options; and a four pipeline system wherein one pipeline is for American call options, one pipeline is for American put options, one pipeline is for European call options, and one pipeline is for European put options). In such an embodiment, option messages can be directed toward an appropriate pipeline based on its call/put flags and/or American/European flags.

These and other modifications to the invention will be recognizable upon review of the teachings herein. As such, the full scope of the present invention is to be defined solely by the appended claims and their legal equivalents.

What is claimed is:

1. An apparatus for computing a price for an option, the apparatus comprising:
at least one member of the group consisting of a reconfigurable logic device, a graphics processor unit (GPU), and a chip multi-processor;
the at least one member having an options pricing engine deployed thereon, the at least one member configured to receive a data stream comprising financial market data, the financial market data comprising a plurality of data messages corresponding to a plurality of options on at least one underlying financial instrument, the data messages comprising data that describes the options, wherein the at least one member comprises a plurality of parallel computational units, each of the plurality of parallel computational units configured to (1) receive a volatility value and a portion of the data stream representative of a particular option, (2) compute a theoretical fair market price for the particular option based on the received volatility value, and (3) provide the computed theoretical fair market price as an output such that the plurality of parallel computational units are configured to simultaneously compute a plurality of theoretical fair market prices.

2. The apparatus of claim 1 wherein at least one of the parallel computational units comprises a plurality of pipelined stages that are configured to operate in a pipelined manner as the financial market data streams through the at least one member, a plurality of the pipelined stages comprising a plurality of parallel computational nodes, each of the computational nodes being configured to compute a step of a stepwise option pricing model, and wherein the computational nodes are cascaded such that each successive pipelined stage is configured to receive as its input the output from at least two computational nodes in the immediately preceding pipelined stage, wherein the output of the last pipelined stage comprises the computed theoretical fair market price for the particular option.

3. The apparatus of claim 2 wherein the pipelined stages are arranged in a binomial tree of computational nodes, wherein the tree is of depth n.

4. The apparatus of claim 3 wherein the at least one member is configured to partition the binomial tree across a plurality of processing resources.

5. The apparatus of claim 4 wherein the plurality of processing resources comprise processing resources of different types.

6. The apparatus of claim 2 wherein the at least one member comprises a reconfigurable logic device.

7. The apparatus of claim 2 wherein the at least one member comprises a graphics processor unit (GPU).

8. The apparatus of claim 2 wherein the at least one member comprises a chip multi-processor.

9. The apparatus of claim 1 wherein at least one of the parallel computational units comprises a first set of pipelined stages that are configured to operate in a pipelined manner as the financial market data streams through the at least one member, wherein the first set of pipelined stages are configured to compute a plurality of financial instrument prices according to an option pricing model based on an upward multiplicative factor and a downward multiplicative factor, the upward multiplicative factor and the downward multiplicative factor being functions of the received volatility value.

10. The apparatus of claim 9 wherein the at least one parallel computational unit further comprises a second set of the pipelined stages that are configured to operate in a pipelined manner as the financial market data streams through the at least one member, wherein the second set of pipelined stages are configured to compute a plurality of probability terms according to the option pricing model, wherein the plurality of probability terms are used in the theoretical fair market price computation.

11. The apparatus of claim 10 wherein the first set and the second set of pipelined stages are arranged in parallel with each other.

12. The apparatus of claim 10 further comprising a combinatorial logic stage downstream from the first set and the second set of pipelined stages, wherein the combinatorial logic stage is configured to compute the theoretical fair market price for the particular option based on a plurality of terminal financial instrument prices computed by the first set of pipelined stages and a plurality of terminal computed probability terms from the second set of pipelined stages.

13. The apparatus of claim 9 wherein the at least one member comprises a reconfigurable logic device.

14. The apparatus of claim 9 wherein the at least one member comprises a graphics processor unit (GPU).

15. The apparatus of claim 9 wherein the at least one member comprises a chip multi-processor.

16. The apparatus of claim 1 wherein the at least one member comprises a lookup table, the lookup table configured to store a plurality of precomputed terms for use in the theoretical fair market price computation, and wherein at least one of the parallel computational units is configured to, for each of a plurality of the options, (1) retrieve precomputed terms from the lookup table using an index based at least in part upon a volatility for the underlying financial instrument for the particular option, and (2) compute the theoretical fair market price for the particular option based at least in part on the retrieved precomputed terms.

17. The apparatus of claim 16 wherein the lookup table comprises (1) a first lookup table in which a plurality of volatility values for a plurality of different financial instruments are stored, wherein the first lookup table is indexed by financial instrument, and (2) a second lookup table in which the plurality of precomputed terms are stored, wherein the second lookup table is indexed by a volatility for the underlying financial instrument and a time to maturity for the option; and wherein the at least one parallel computational unit comprises (1) a lookup unit that is configured to (i) process the data describing the option, the data describing the option comprising an identifier for the underlying financial instrument and a time to maturity for the option, (ii) access the first lookup table based on an identity of the underlying financial instrument for the option to thereby retrieve the volatility value for that underlying financial instrument, and (iii) access the second lookup table based on the retrieved volatility value and a time to maturity for the option to thereby retrieve the plurality of precomputed terms applicable to that option; and a combinatorial logic stage that is configured to compute the theoretical fair market price according to an option pricing model based at least in part upon the data describing the option, the retrieved volatility value and the retrieved precomputed terms.

18. The apparatus of claim 17 wherein the combinatorial logic stage comprises a plurality of parallel computational pipelines and an adder downstream from the parallel computational pipelines, wherein each computational pipeline is configured to compute, in parallel with the other parallel computational pipelines, a subcomponent of the theoretical fair market price based at least in part upon the data describing the option, the retrieved volatility value and the retrieved precomputed terms, and wherein the adder is configured to compute the theoretical fair market price for the option by summing the computed subcomponents produced by the parallel computational pipelines.

19. The apparatus of claim 16 wherein the at least one member comprises a reconfigurable logic device.

20. The apparatus of claim 16 wherein the at least one member comprises a graphics processor unit (GPU).

21. The apparatus of claim 16 wherein the at least one member comprises a chip multi-processor.

22. The apparatus of claim 1 wherein the data describing the options comprises a flag for identifying whether a subject option is a call option or a put option, wherein at least one of the parallel computational units comprises a first computational path configured to compute a theoretical fair market price for a call option and a second computational path configured to compute a theoretical fair market price for a put option, and wherein the at least one parallel computational units is further configured to selectively route data describing the options to the first or second computational path based on the flag for the subject option.

23. The apparatus of claim 1 wherein the at least one member further comprises a plurality of pipelined computational modules for computing an implied volatility for each of a plurality of options over a plurality of iterations, wherein each computational module in the pipeline corresponds to a different iteration of the implied volatility computation such that the computational modules in the pipeline are configured to simultaneously perform different iterations of the implied volatility computation for different options, each pipelined computational module comprising at least two of the parallel computational units.

24. The apparatus of claim 23 wherein the parallel computational units circuits of a computational module are seeded with different volatility values, wherein the parallel computational units of the computational module corresponding to a first iteration of the implied volatility computation are configured to compute a plurality of theoretical fair market prices for a band of volatility values, and wherein the parallel computational units of the computational modules corresponding to subsequent iterations of the implied volatility computation are configured to compute a plurality of theoretical fair market prices for progressively narrower bands of volatility values.

25. The apparatus of claim 23 wherein the at least one member comprises a reconfigurable logic device.

26. The apparatus of claim 23 wherein the at least one member comprises a graphics processor unit (GPU).

27. The apparatus of claim 23 wherein the at least one member comprises a chip multi-processor.

28. The apparatus of claim 1 further comprising a processor in communication with the at least one member, the processor configured to deliver the financial market data stream to the at least one member.

29. The apparatus of claim 28 wherein the at least one member comprises a reconfigurable logic device.

30. The apparatus of claim 28 wherein the at least one member comprises a graphics processor unit (GPU).

31. The apparatus of claim 28 wherein the at least one member comprises a chip multi-processor.

32. The apparatus of claim 1 further comprising a processor configured to execute a black box trading algorithm, and wherein the at least one member is further configured to feed a computed theoretical fair market price for an option to the processor, and wherein the processor is further configured to automatically generate a financial instrument trade via the black box trading algorithm based at least in part upon the computed theoretical fair market price for the option.

33. The apparatus of claim 1 further comprising a processor in communication with the at least one member, wherein the at least one member serves as an offload engine relative to the processor, the at least one member being a computational resource separate from the processor.

34. The apparatus of claim 33 wherein the processor comprises a general purpose processor (GPP) configured to execute software to manage an interface with the at least one member.

35. The apparatus of claim 1 wherein the at least one member comprises a reconfigurable logic device.

36. The apparatus of claim 1 wherein the at least one member comprises a graphics processor unit (GPU).

37. The apparatus of claim 1 wherein the at least one member comprises a chip multi-processor.

38. A method for computing a price for an option, the method comprising:

processing, by at least at least one member of the group consisting of a reconfigurable logic device, a graphics processor unit (GPU), and a chip multi-processor, an electronic data stream comprising financial market data, the financial market data comprising a plurality of data messages corresponding to a plurality of options on at least one underlying financial instrument, the data messages comprising data that describes the options, wherein the at least one member comprises a plurality of parallel computational units; and wherein the processing step comprises each of the parallel computational units (1) receiving a volatility value and a portion of the data stream representative of a particular option, (2) computing a theoretical fair market price for the particular option based on the received volatility value, and (3) providing the computed theoretical fair market price as an output such that the plurality of parallel computational units simultaneously compute a plurality of theoretical fair market prices.

39. The method of claim 38 wherein the at least one member comprises a reconfigurable logic device.

40. The method of claim 38 wherein the at least one member comprises a graphics processor unit (GPU).

41. The method of claim 38 wherein the at least one member comprises a chip multi-processor.

42. The method of claim 38 wherein the at least one member further comprises a pipeline, the pipeline comprising a plurality of computational modules arranged in a pipelined manner for computing a plurality of implied volatilities for a plurality of options based on at least a portion of the financial market data, each computational module comprising at least two of the parallel computational units;

wherein the processing step further comprises the pipeline computing each implied volatility based on the theoretical fair market prices computed by the parallel computational units using an iterative banded search within a volatility space for an option described by the data stream to identify a volatility value that serves as the implied volatility for an option; and wherein the implied volatility computing step comprises:
each computational module operating in the pipelined manner such that each computational module performs a different iteration of the iterative banded search;
each downstream computational module performing its iteration of the iterative banded search within a narrower band of volatility with respect to an option than its upstream neighboring computational module in the pipeline did with respect to that option; and
the computational modules operating simultaneously as the financial market data streams through the pipeline such that each downstream computational module in pipeline performs its iteration of the iterative banded search with respect to an option while its upstream neighboring computational module in the pipeline performs its iteration of the iterative banded search for another option.

43. The method of claim 42 wherein the at least one member comprises a reconfigurable logic device.

44. The method of claim 42 wherein the at least one member comprises a graphics processor unit (GPU).

45. The method of claim 42 wherein the at least one member comprises a chip multi-processor.

* * * * *